Nov. 8, 1955  M. M. DEAN ET AL  2,722,987
VEHICLE SUSPENSION MEANS AND BODY CONSTRUCTION THEREFOR
Filed Dec. 10, 1949  36 Sheets-Sheet 1
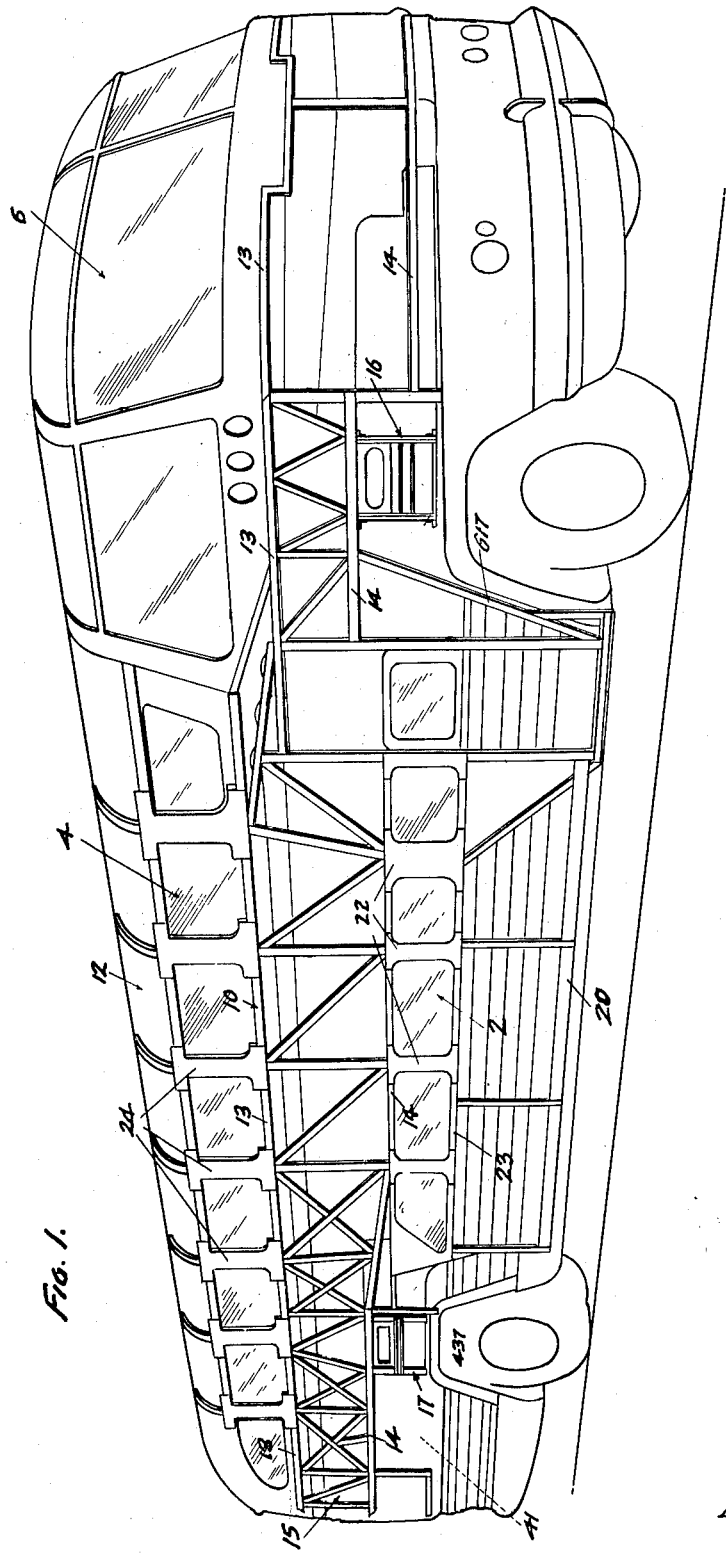
Inventors:
MILO M. DEAN.
NILS A. THUNSTROM.
NORMAN P. MARTIN.
By Harold Olsen
Attorney.

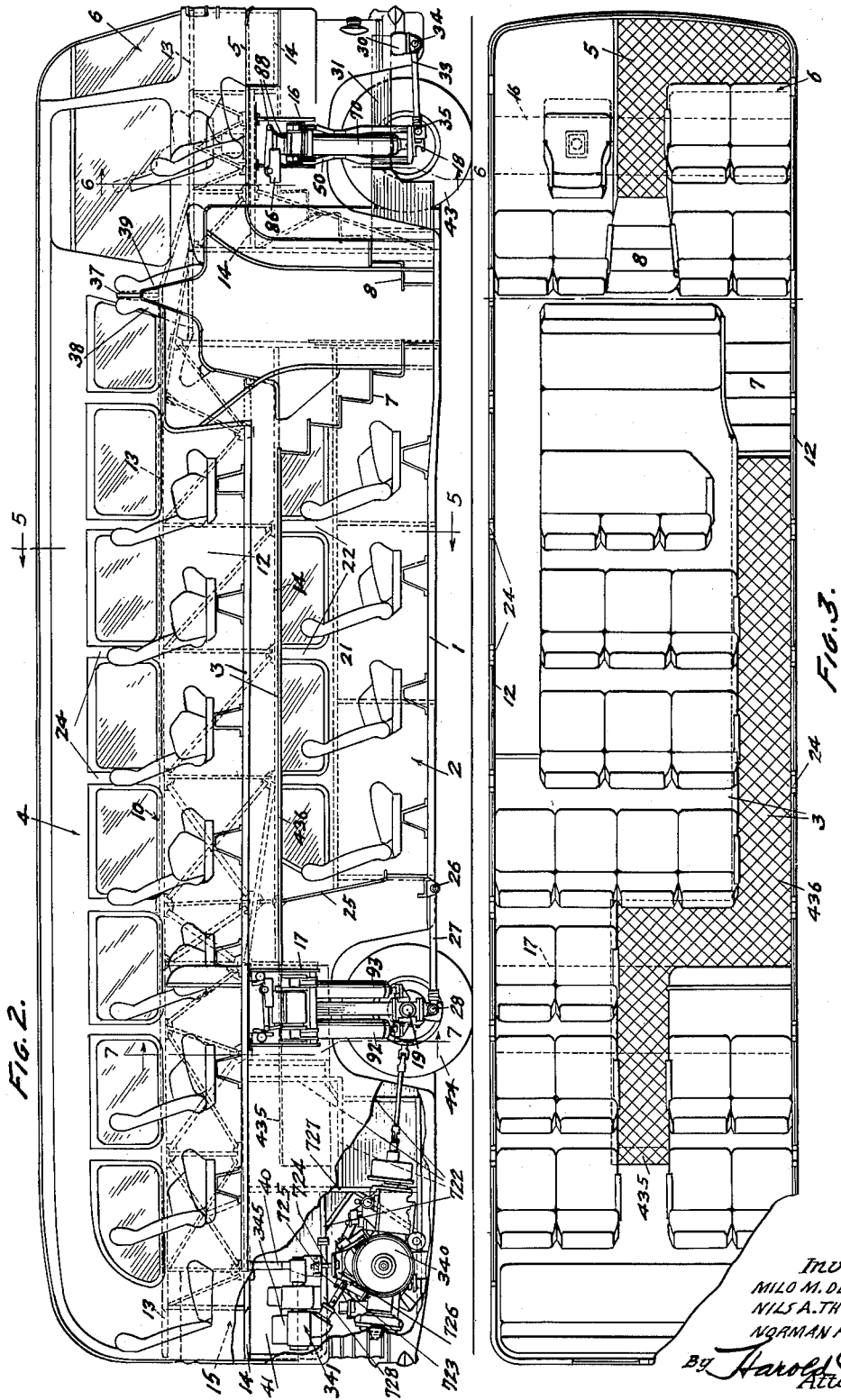

Nov. 8, 1955  M. M. DEAN ET AL  2,722,987
VEHICLE SUSPENSION MEANS AND BODY CONSTRUCTION THEREFOR
Filed Dec. 10, 1949  36 Sheets-Sheet 3
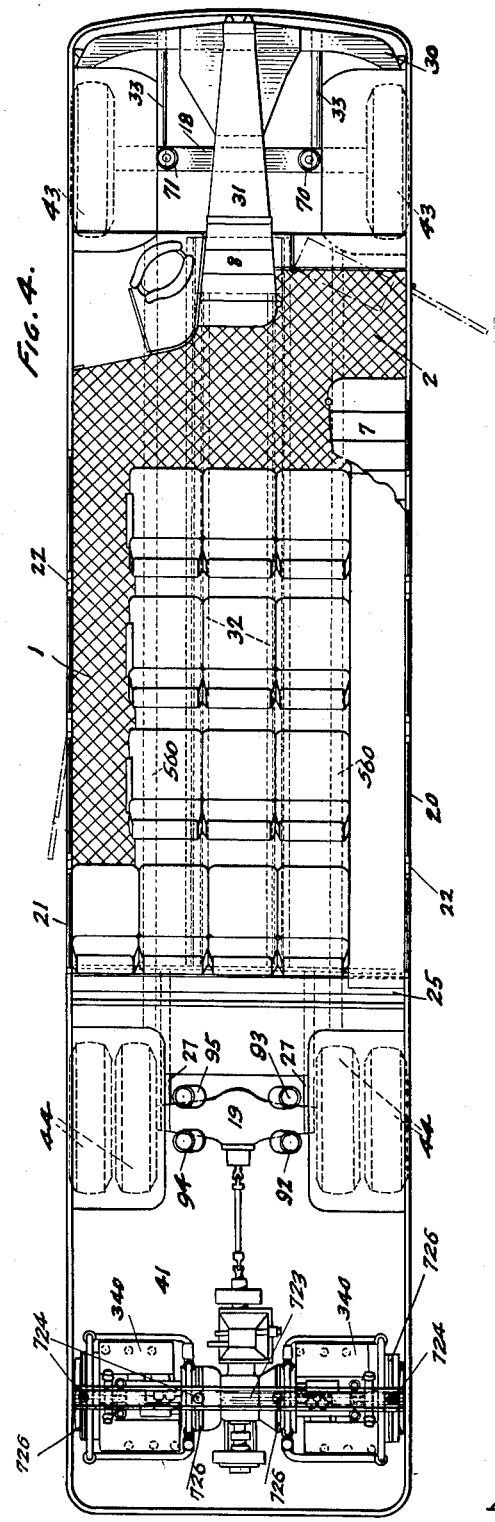
Inventors:
MILO M. DEAN,
NILS A. THUNSTROM,
NORMAN P. MARTIN,
By Harold Olsen
Attorney.

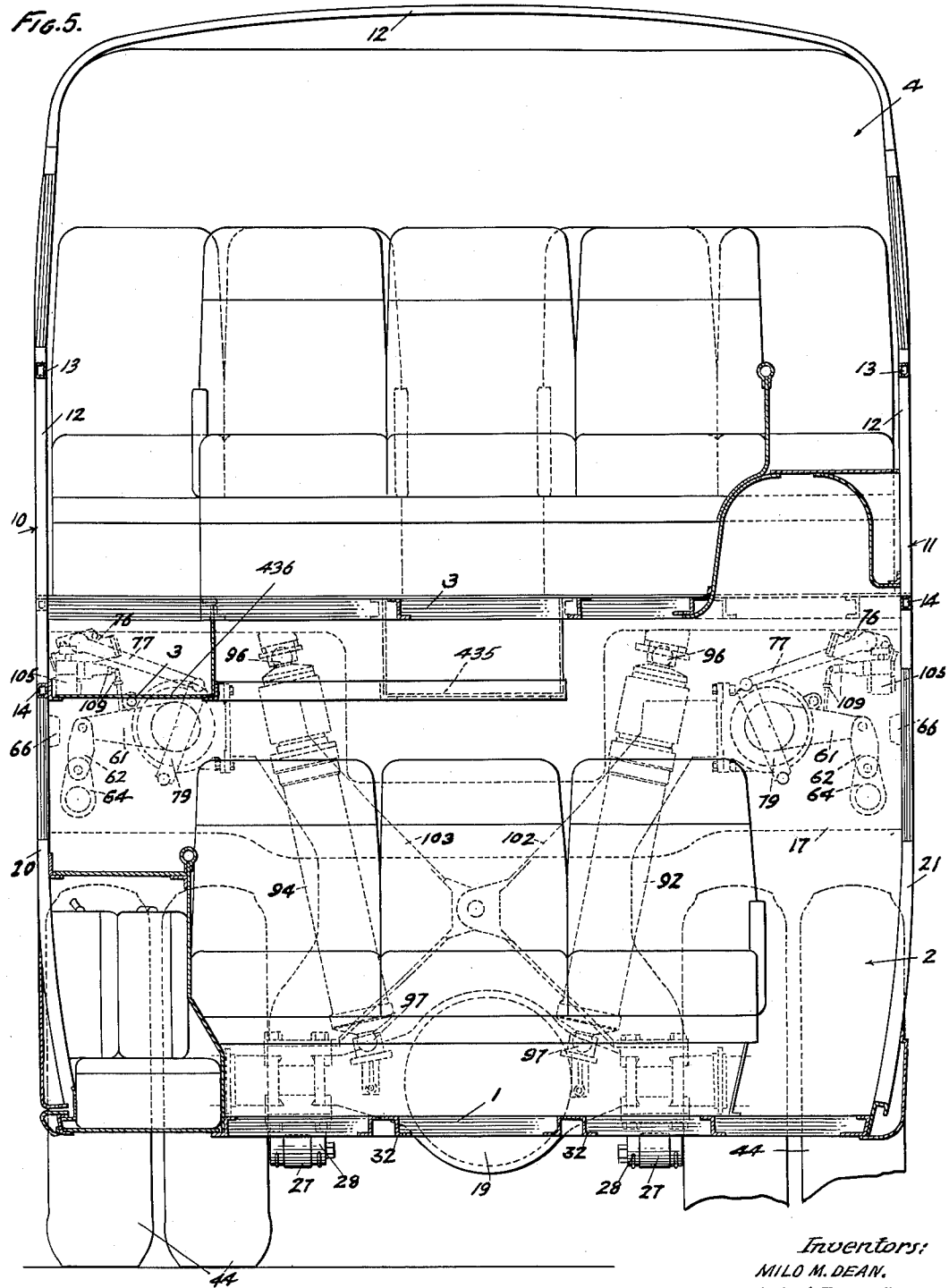

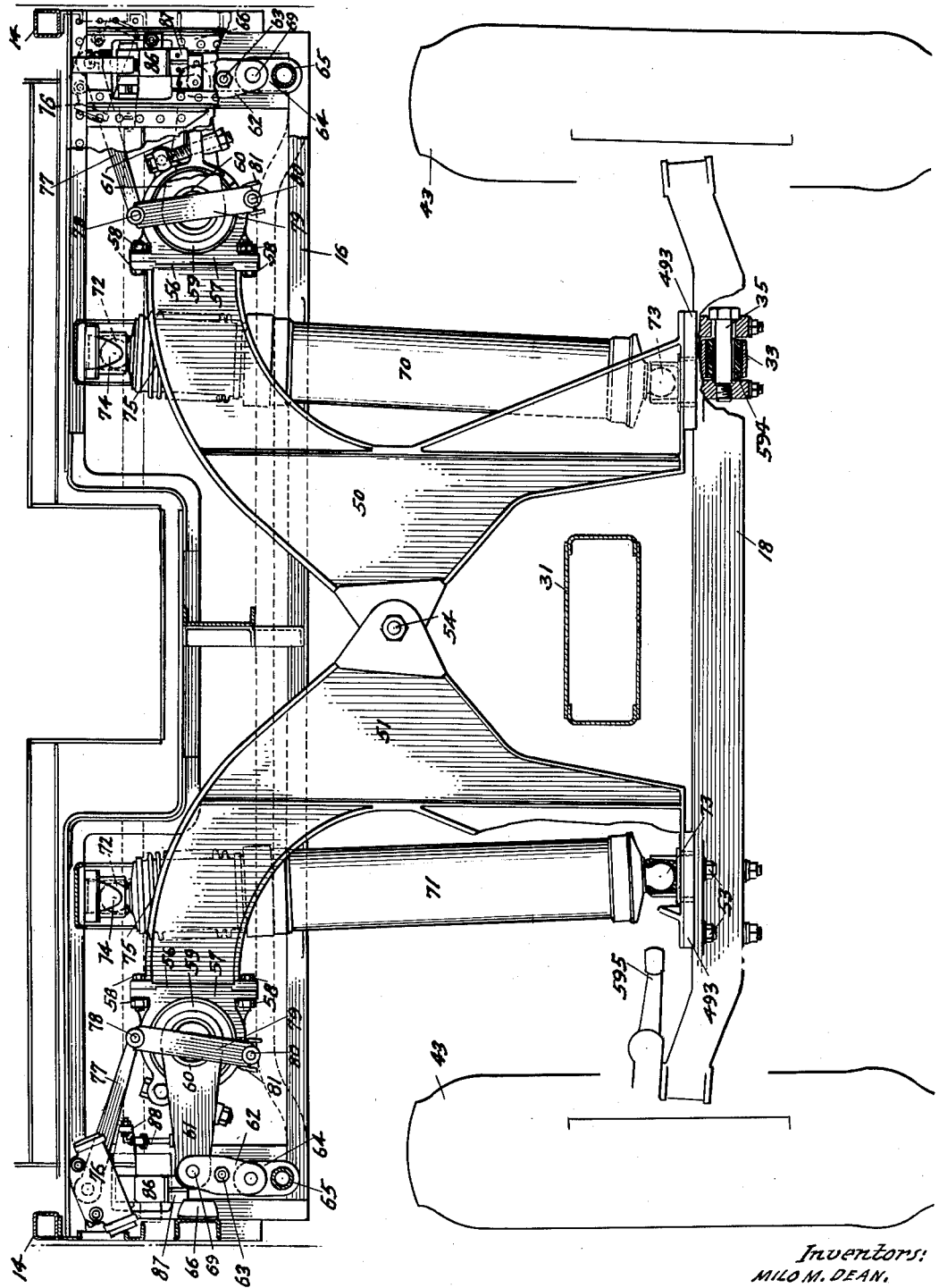

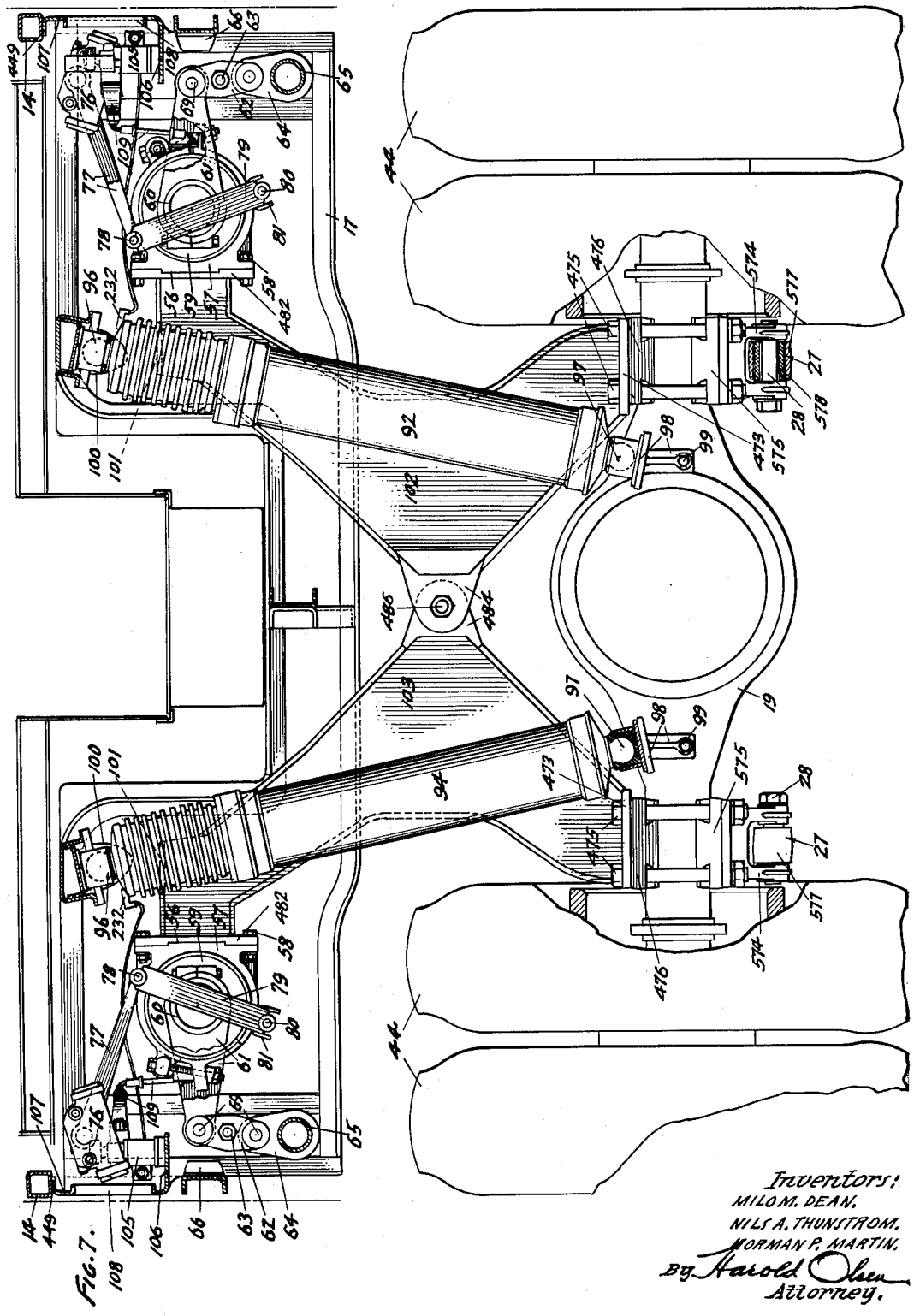

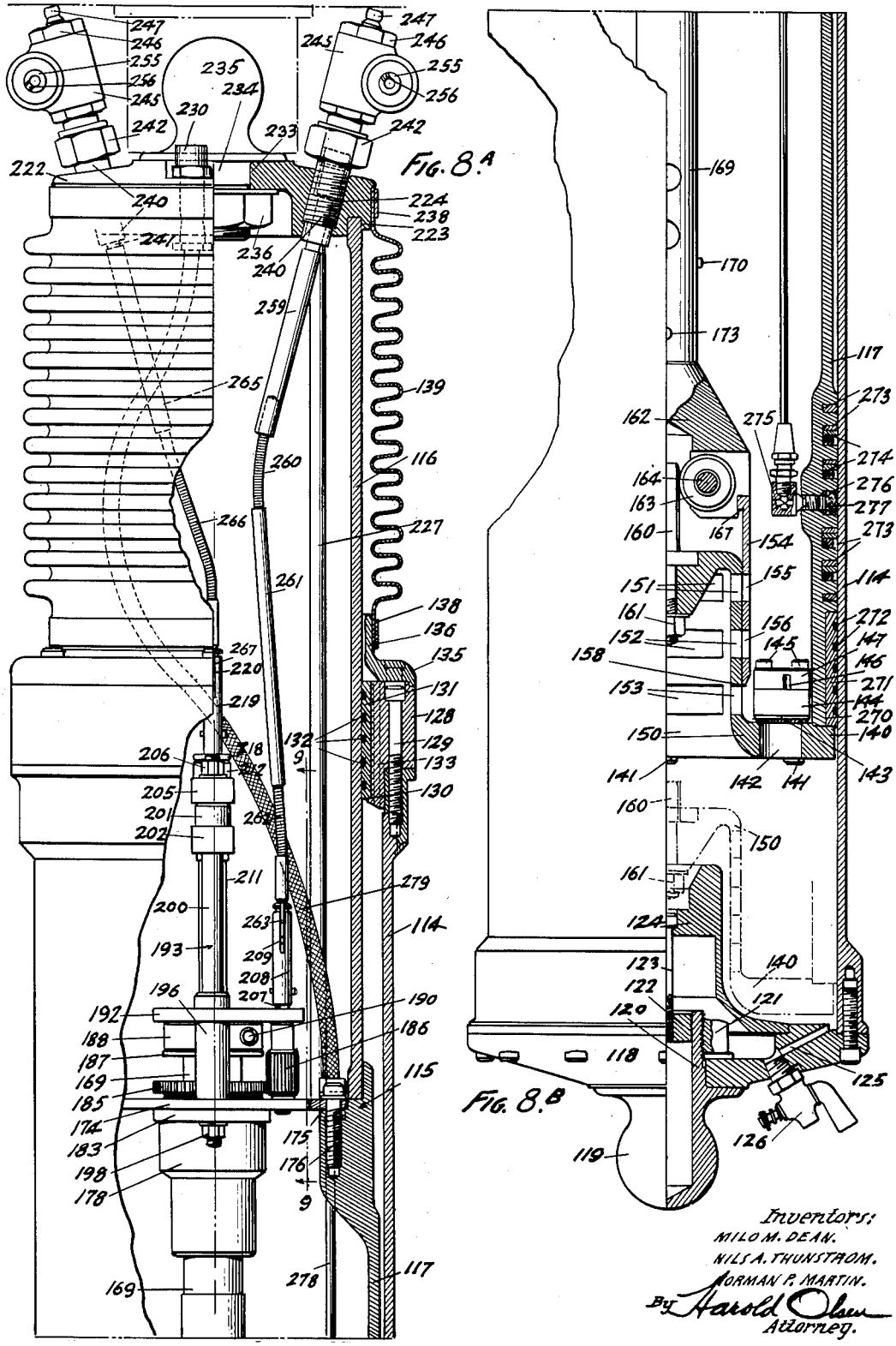

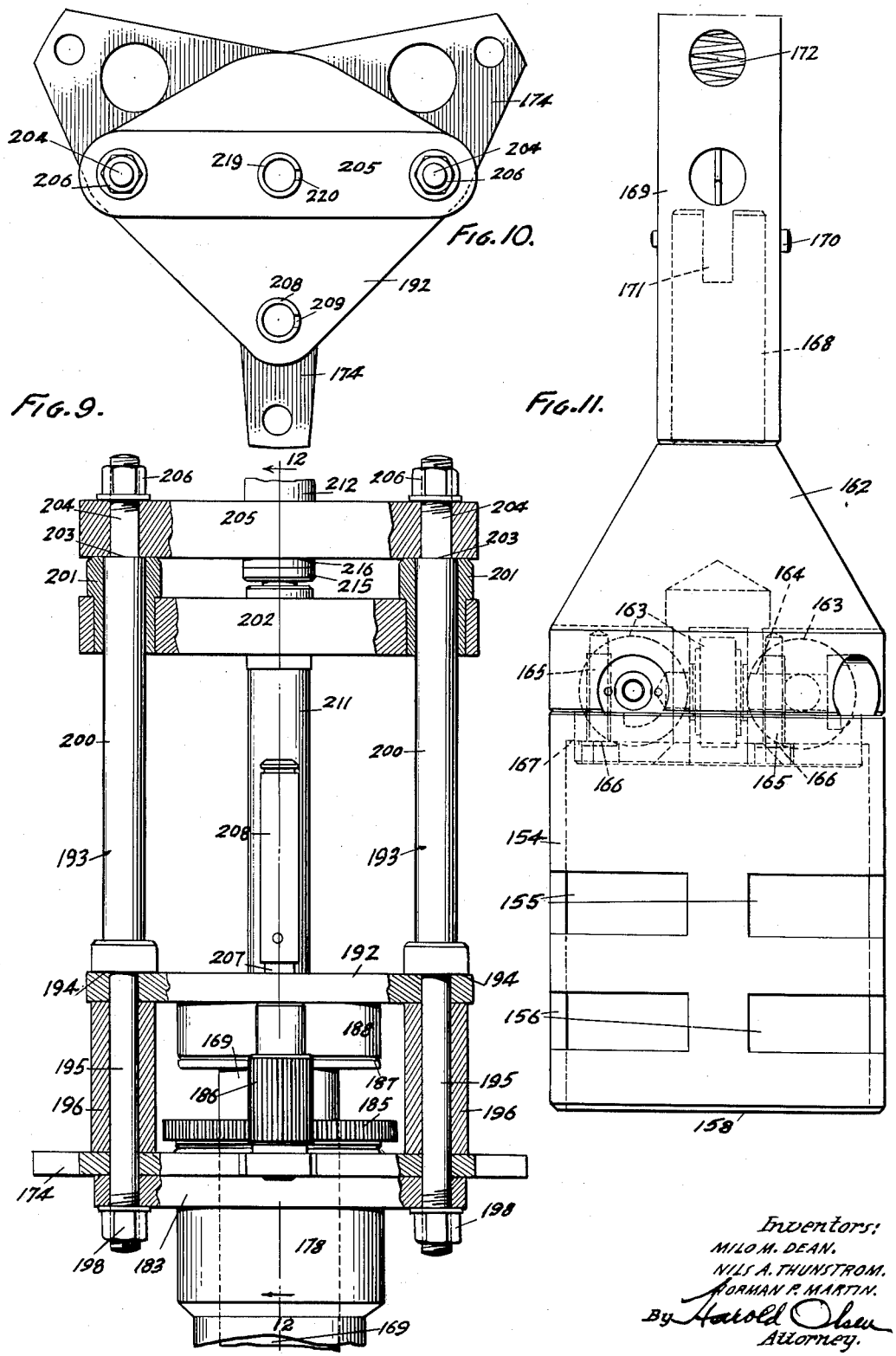

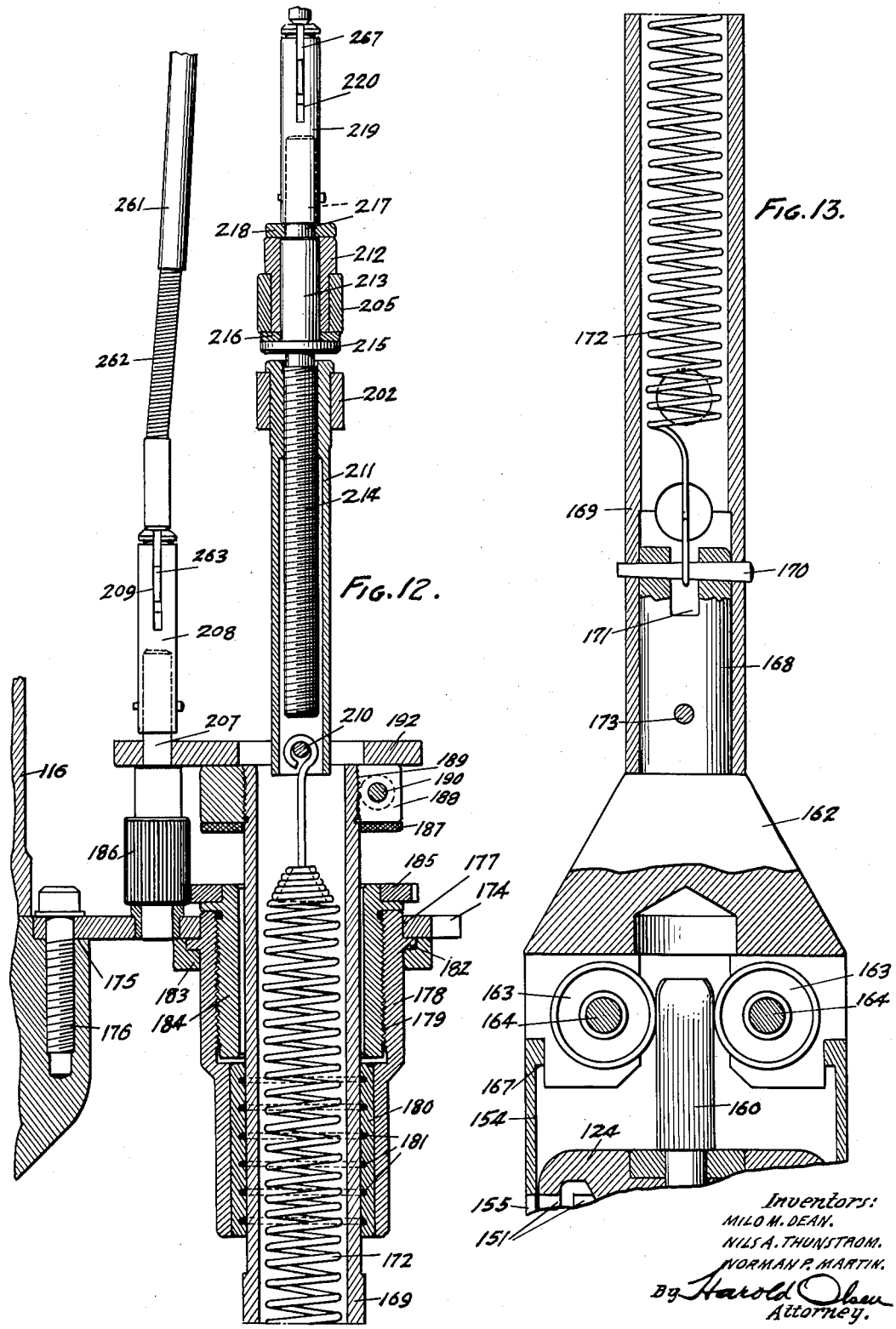

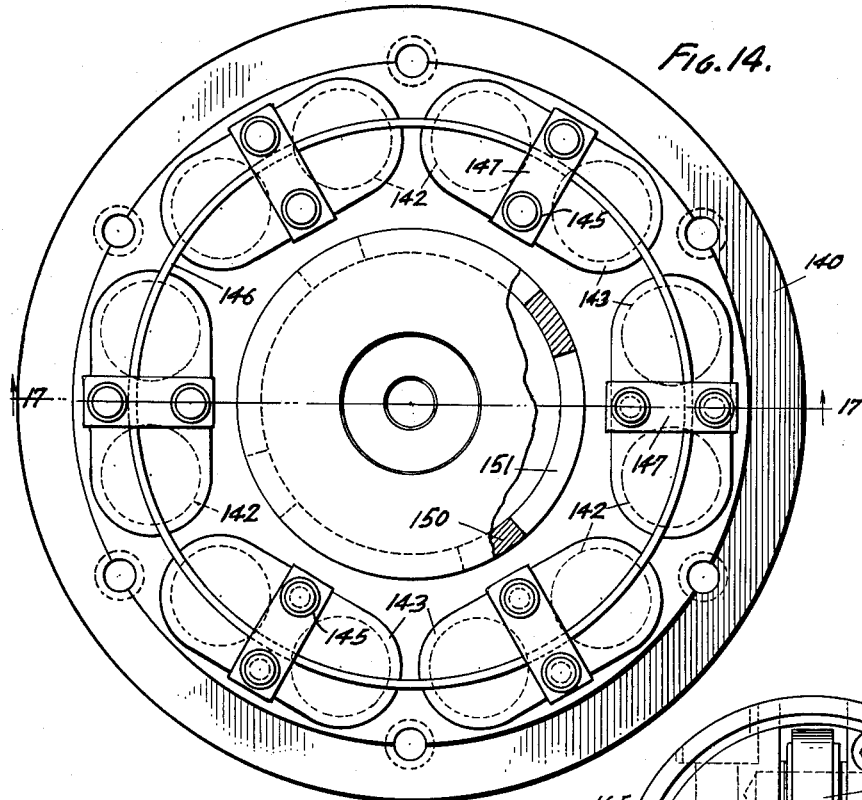
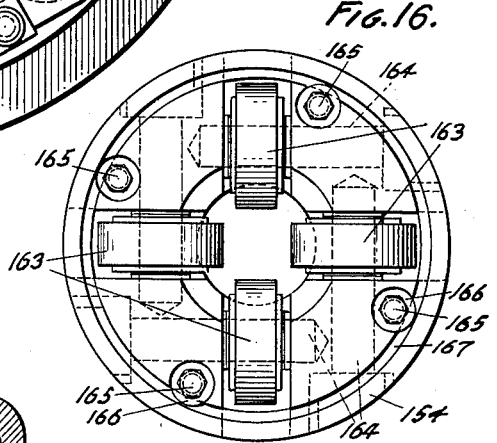
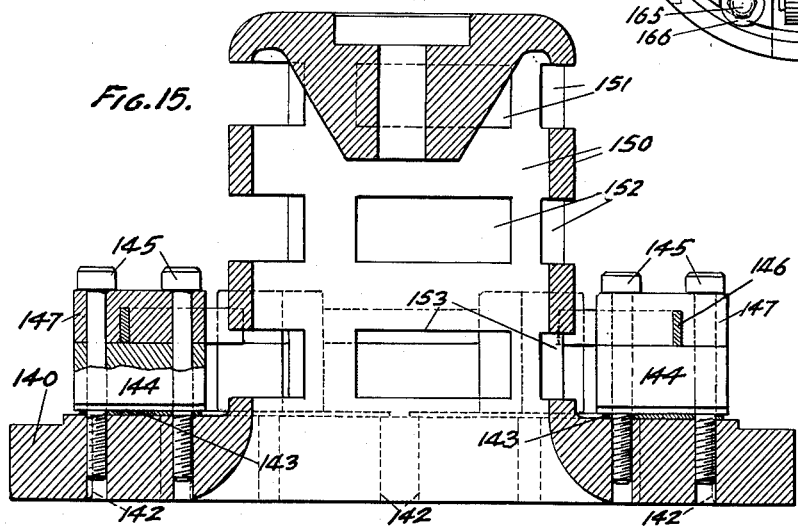
Inventors:
MILO M. DEAN,
NILS A. THUNSTROM,
NORMAN P. MARTIN.
By Harold Olsen
Attorney.

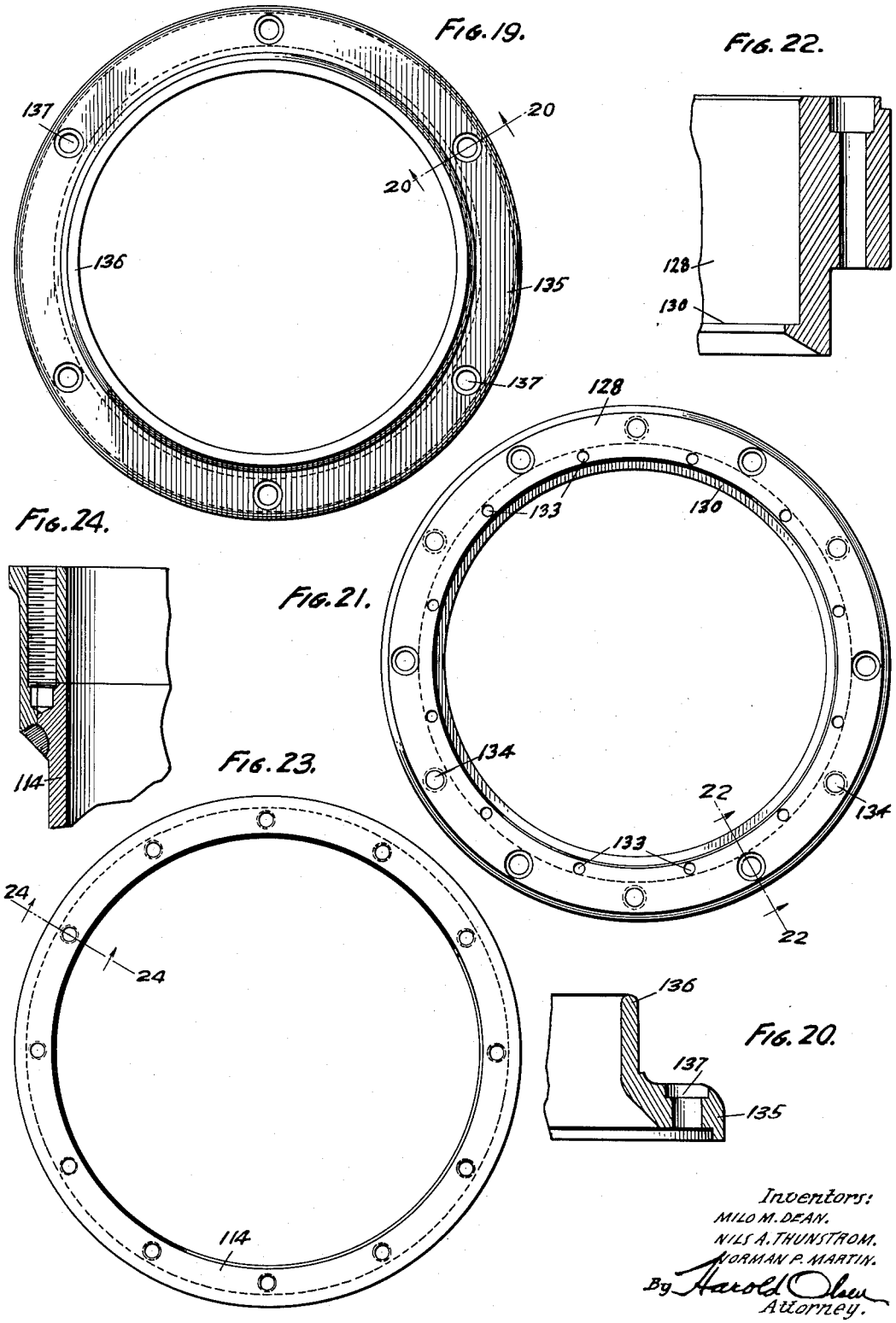

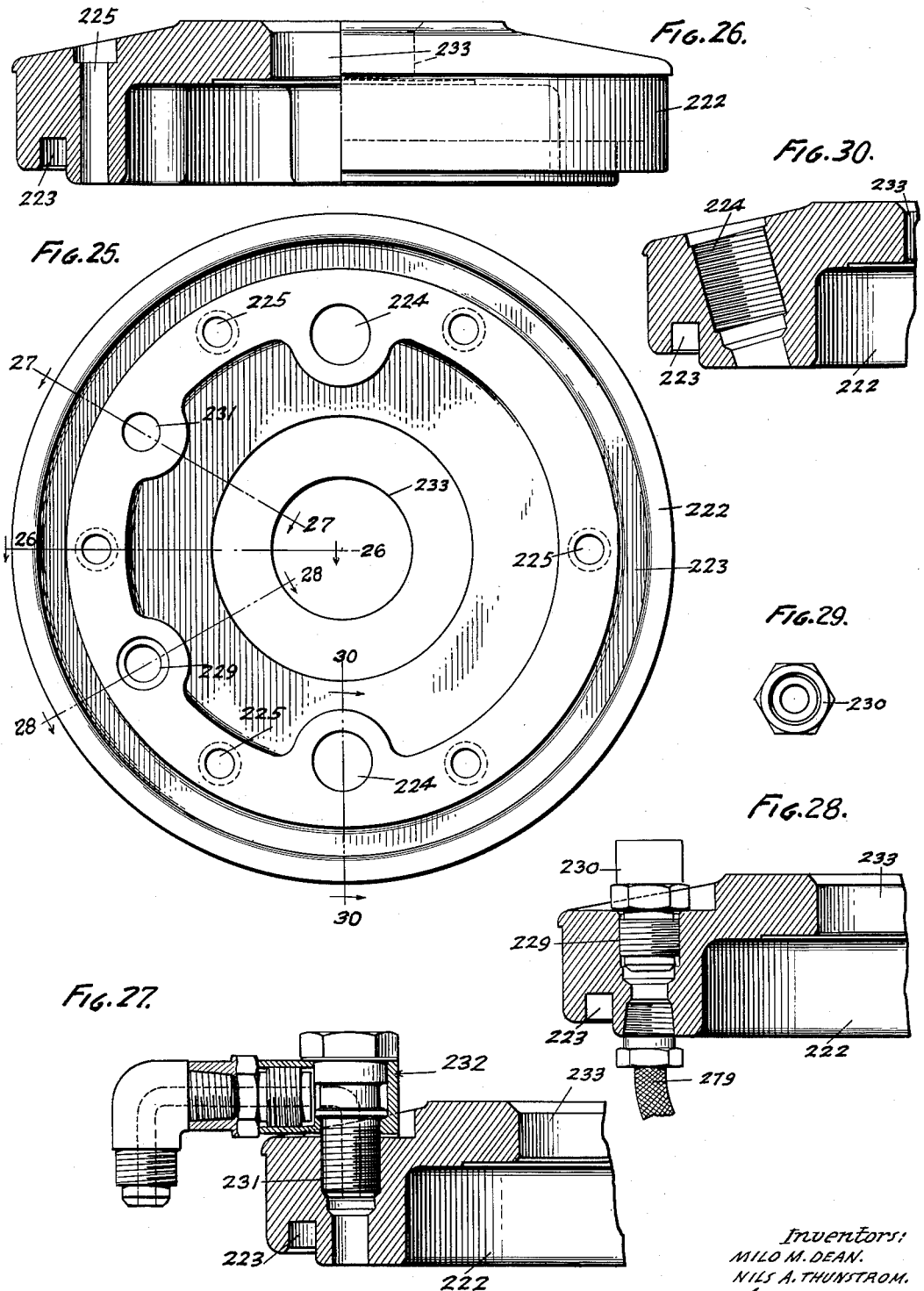

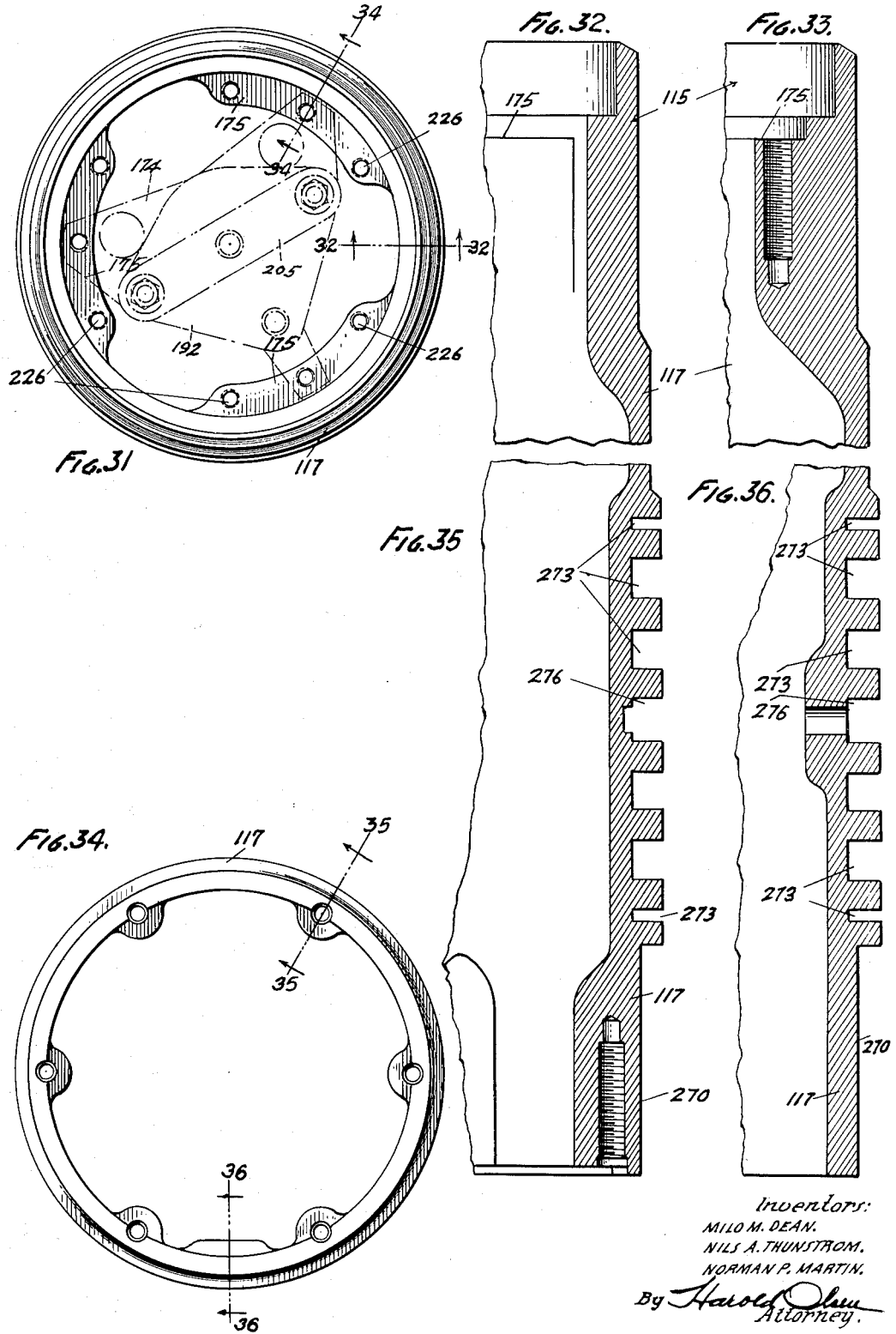

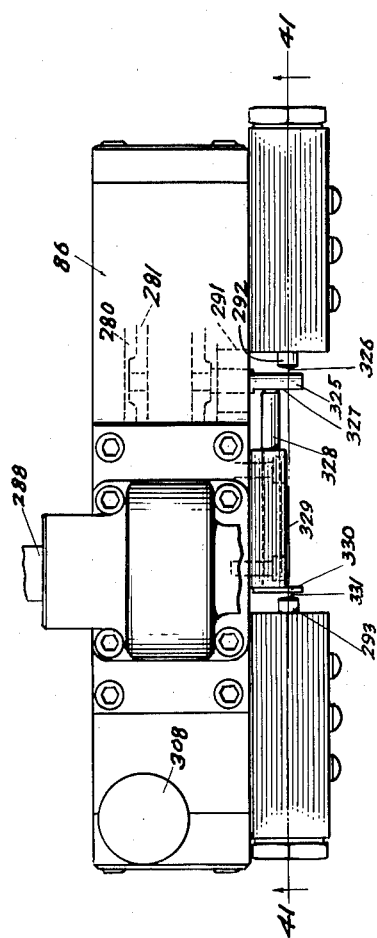
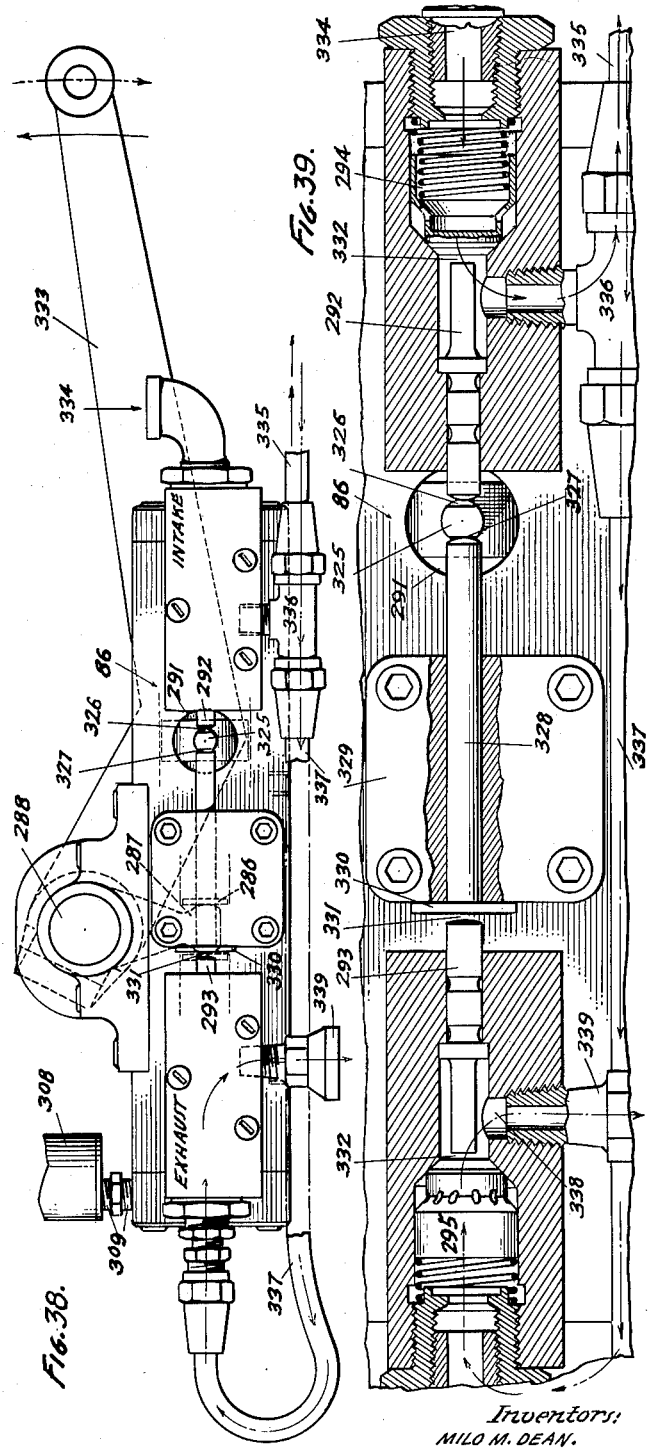

Nov. 8, 1955  M. M. DEAN ET AL  2,722,987
VEHICLE SUSPENSION MEANS AND BODY CONSTRUCTION THEREFOR
Filed Dec. 10, 1949  36 Sheets-Sheet 16
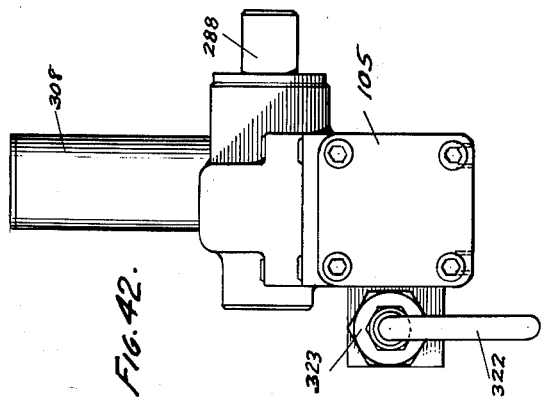
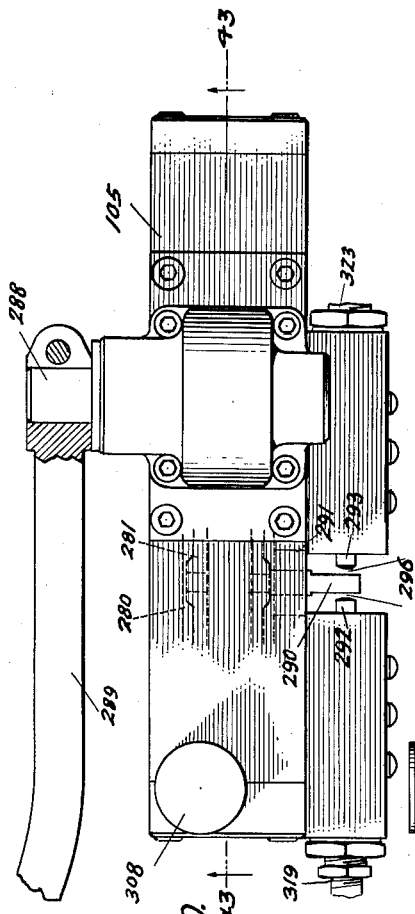
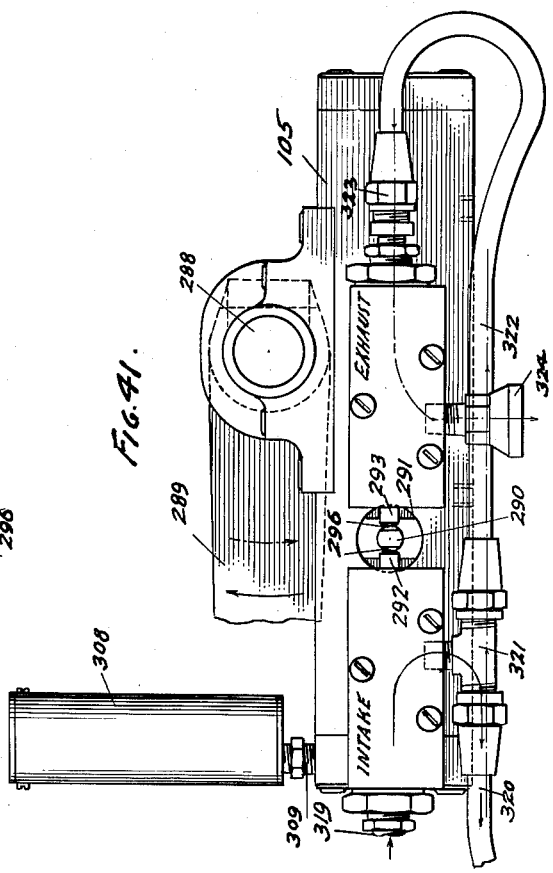
Inventors:
MILO M. DEAN.
NILS A. THUNSTROM.
NORMAN P. MARTIN.
By Harold Olsen
Attorney.

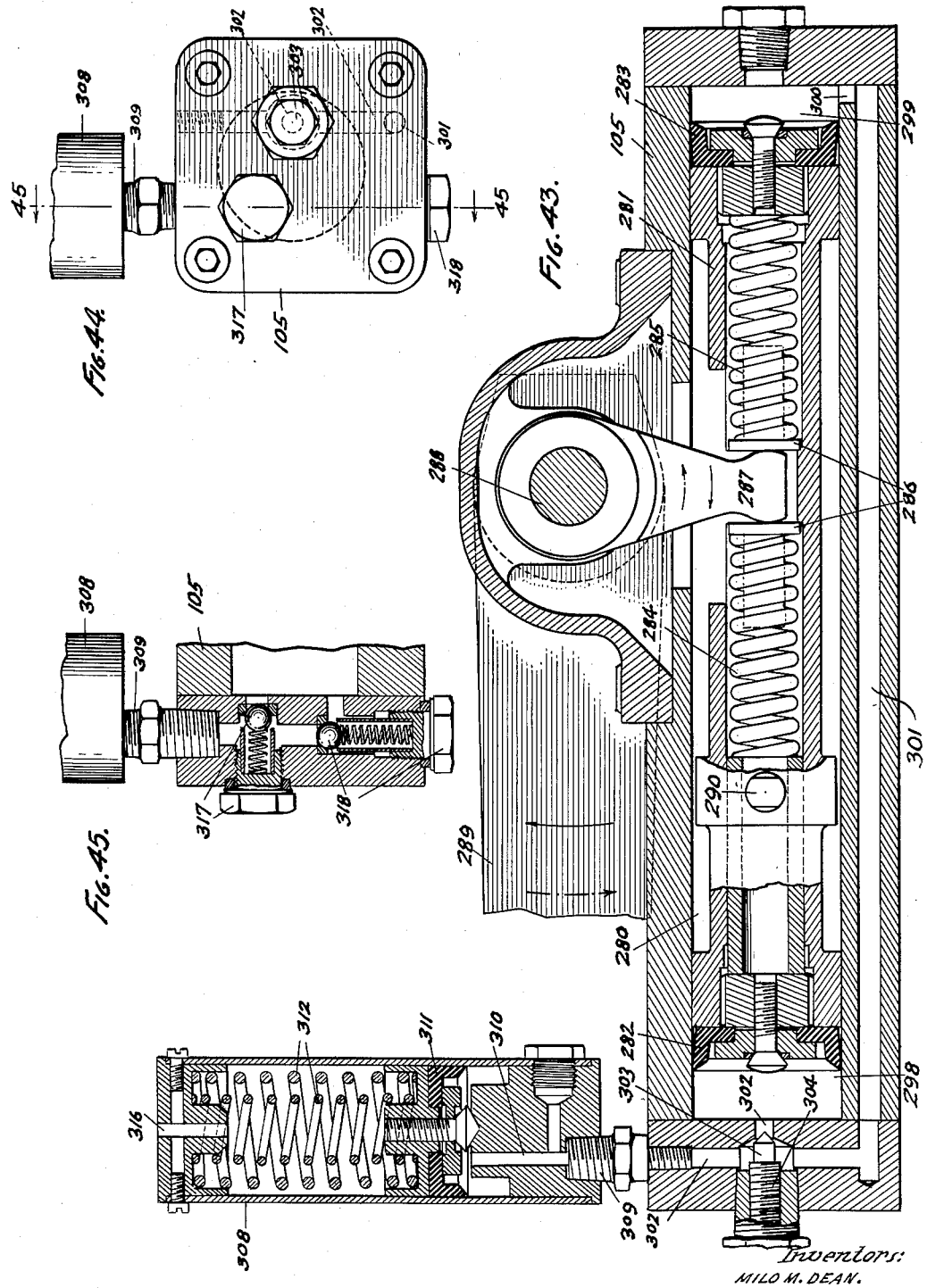

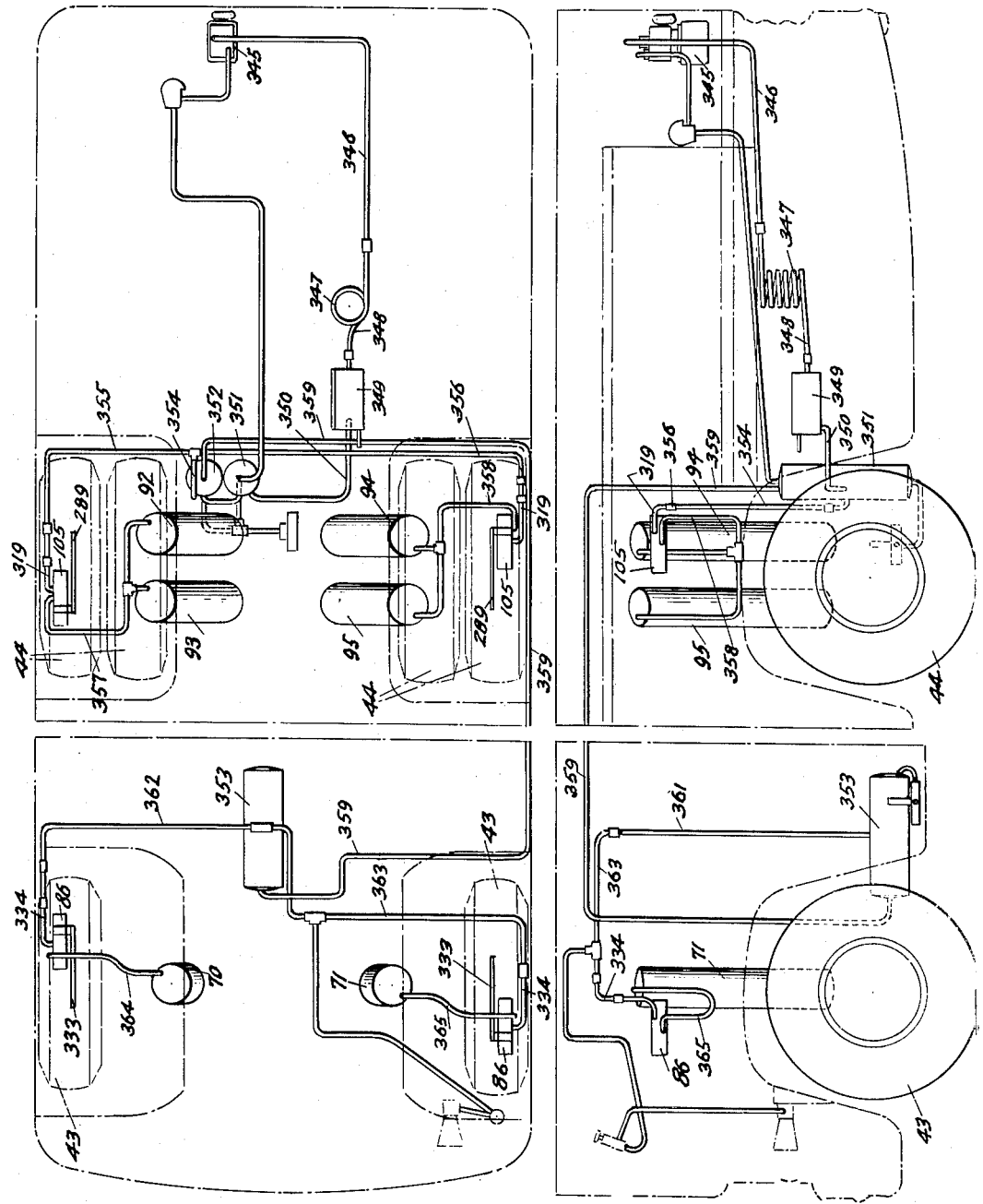

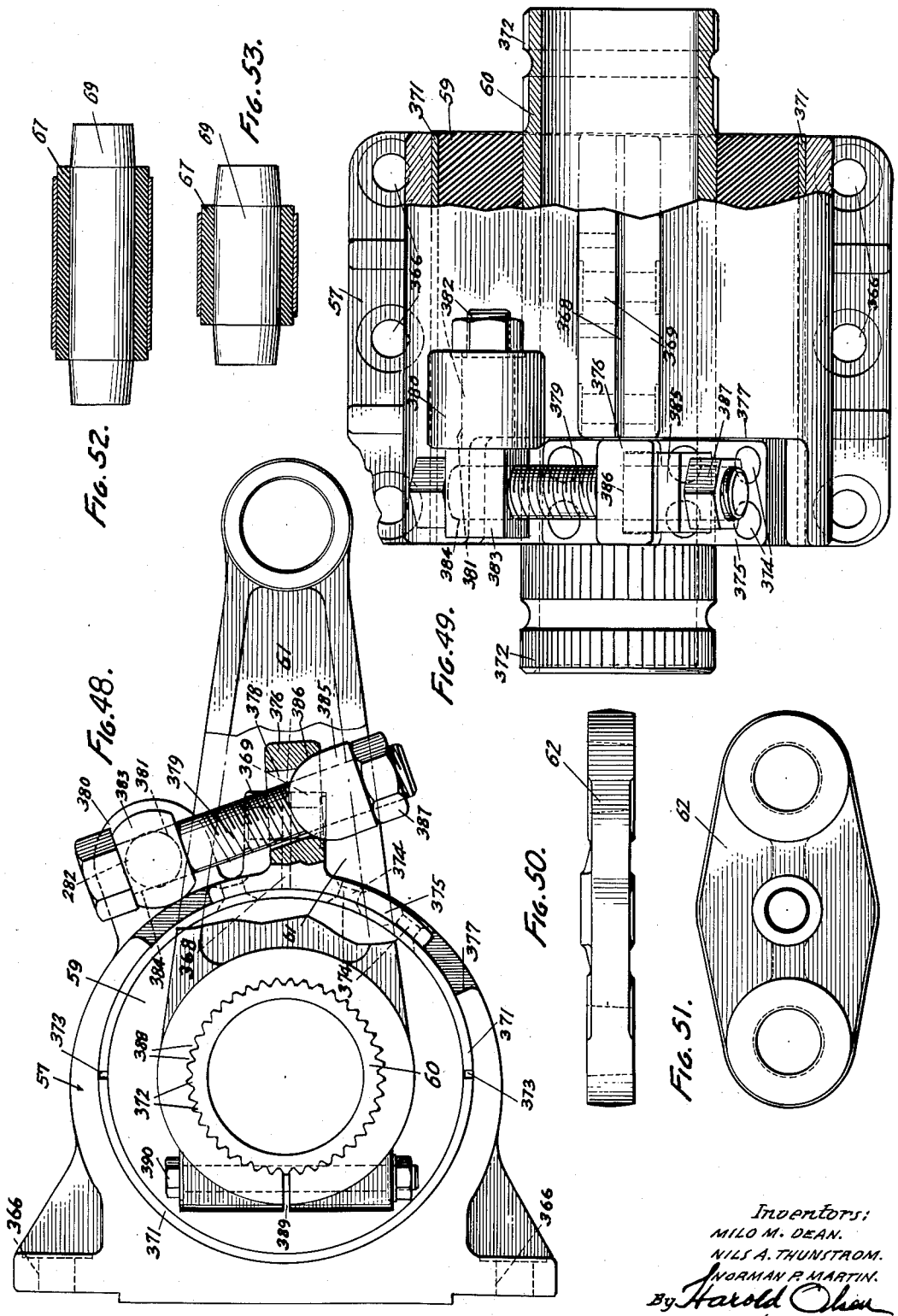

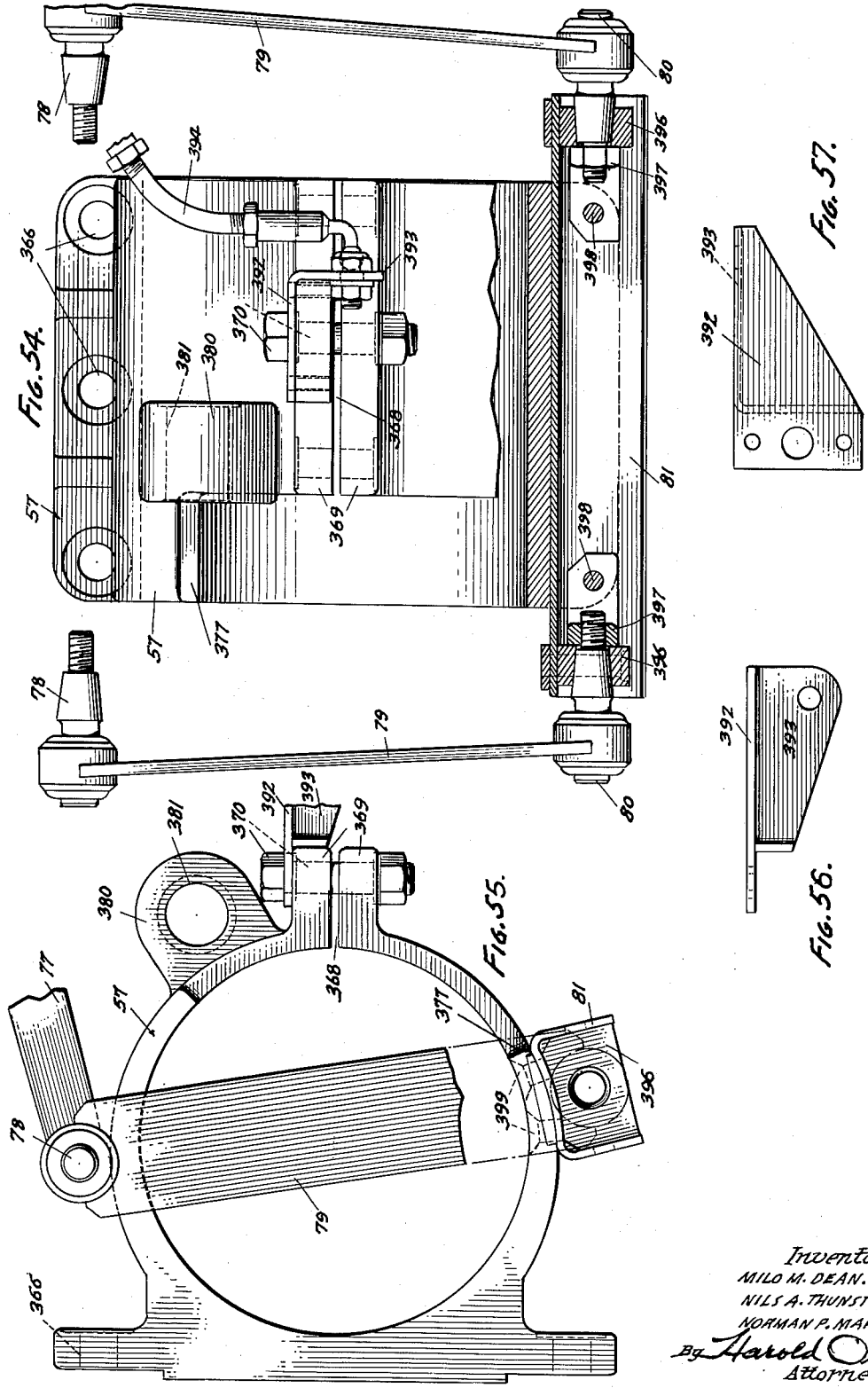

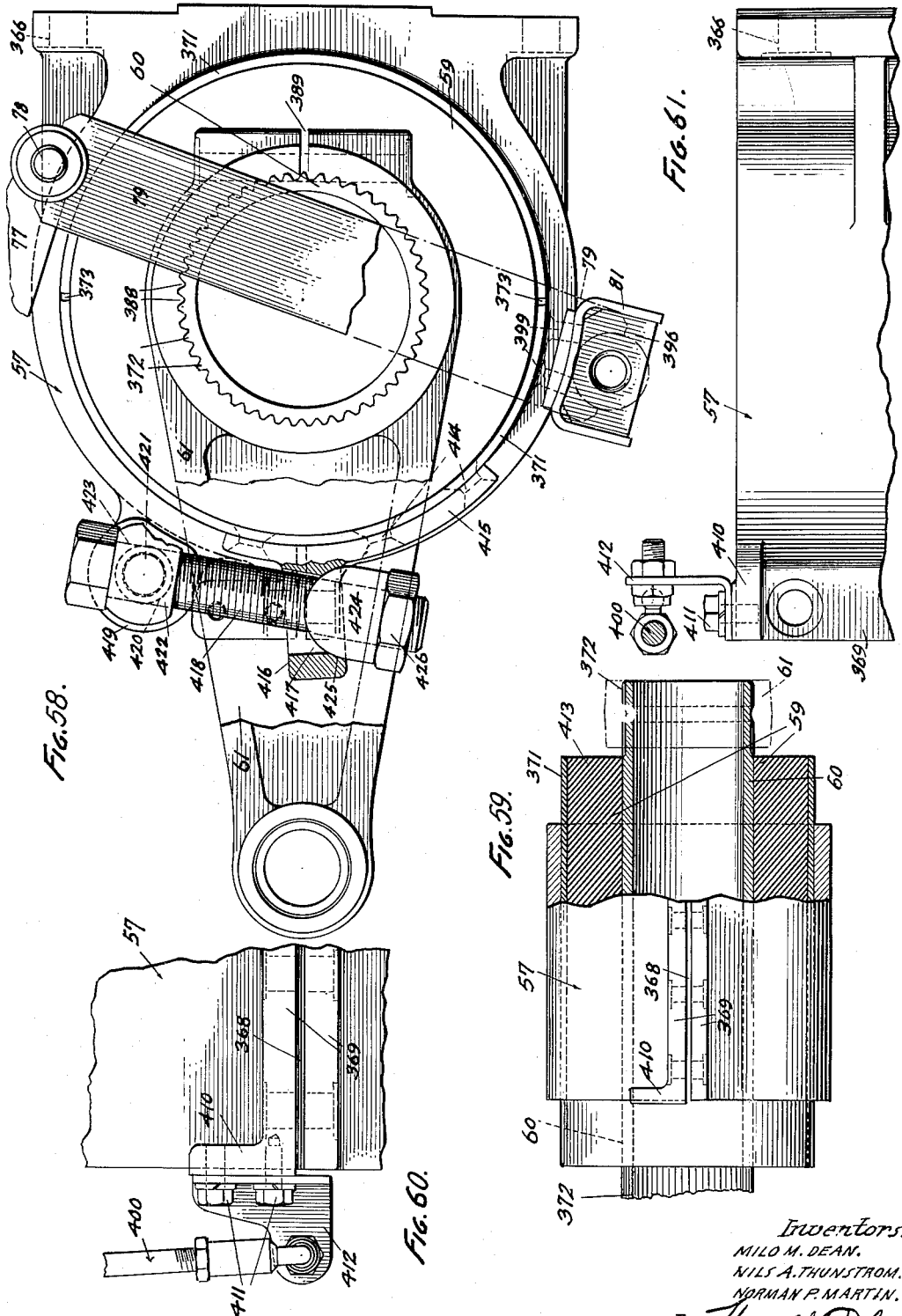

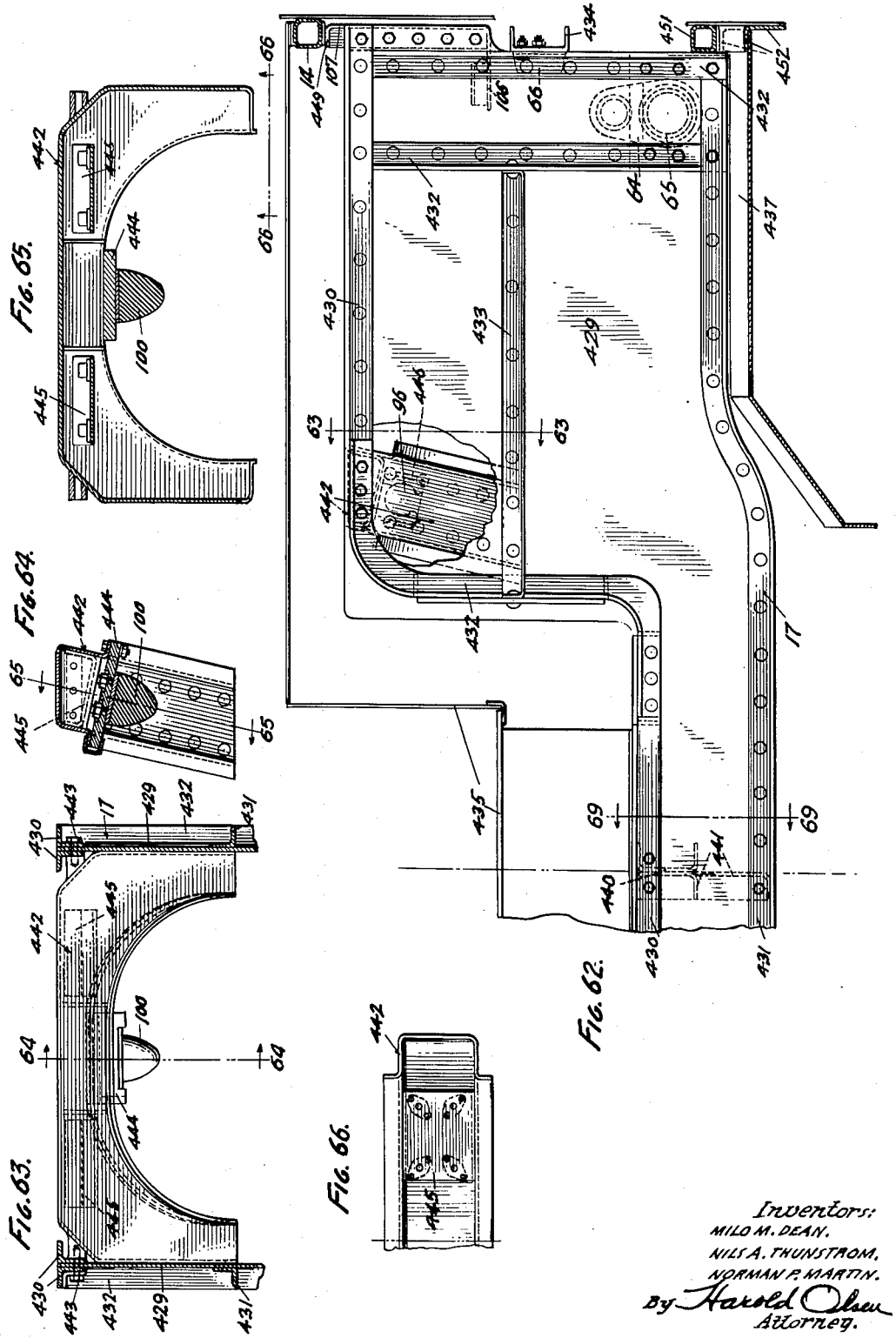

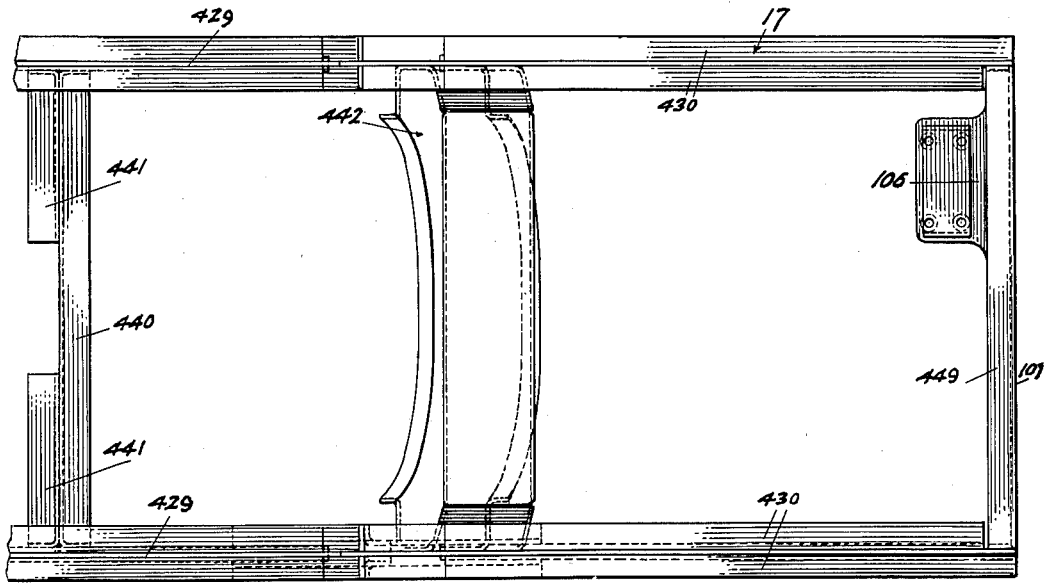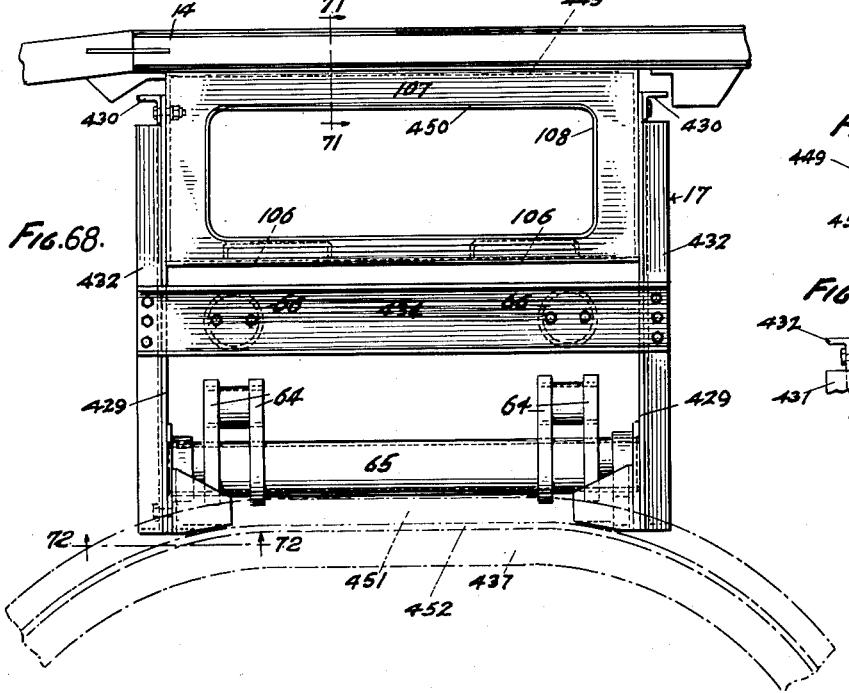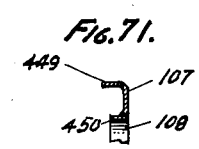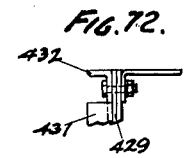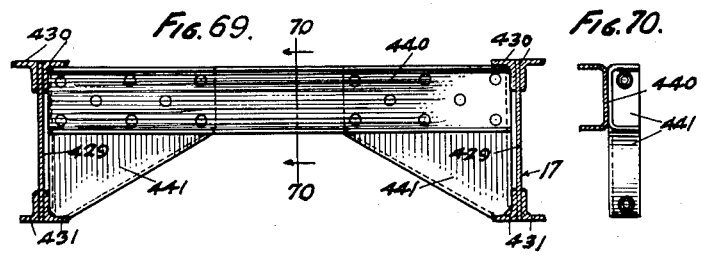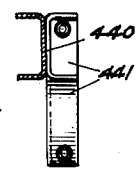

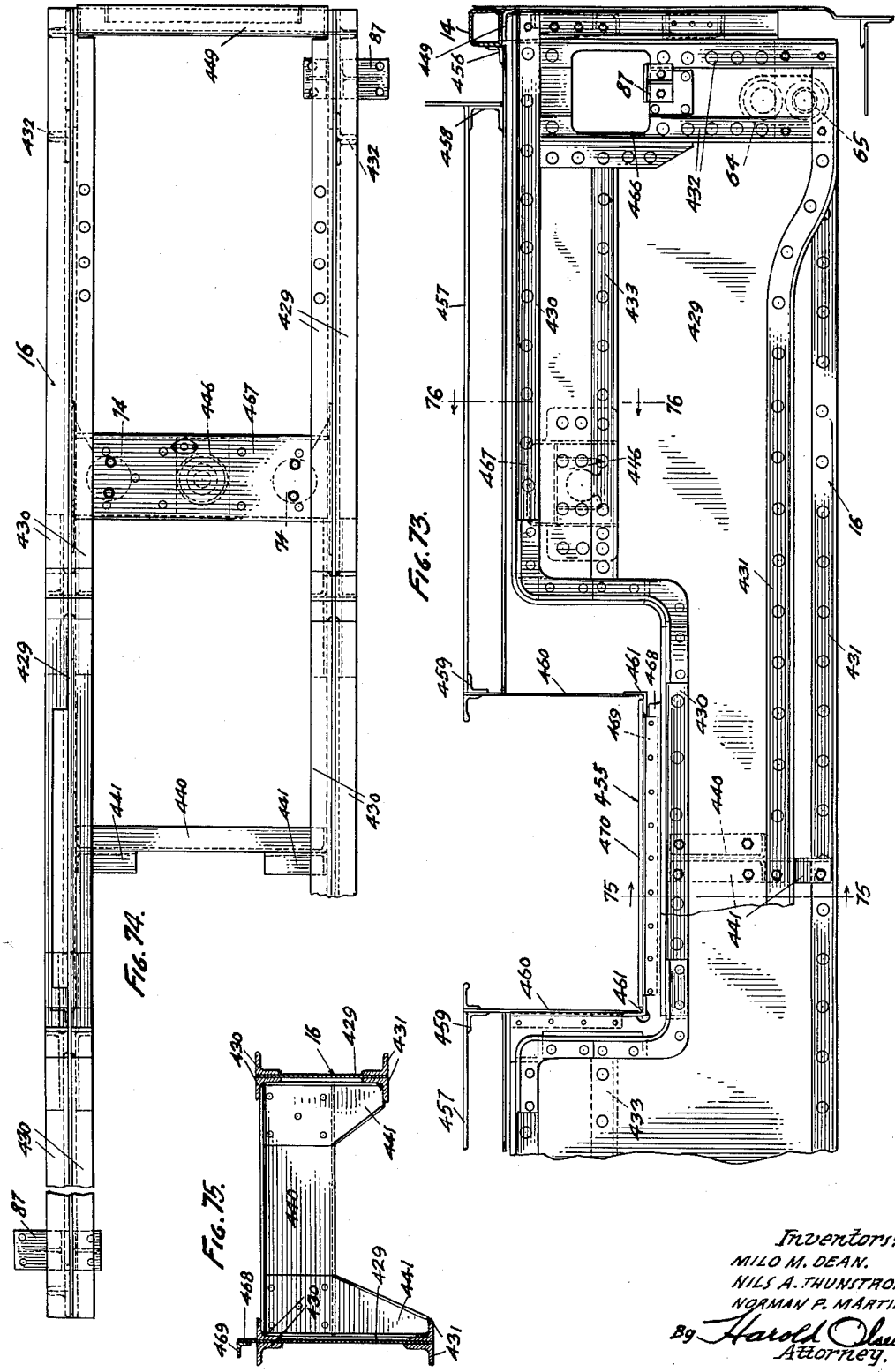

Nov. 8, 1955  M. M. DEAN ET AL  2,722,987
VEHICLE SUSPENSION MEANS AND BODY CONSTRUCTION THEREFOR
Filed Dec. 10, 1949  36 Sheets-Sheet 25
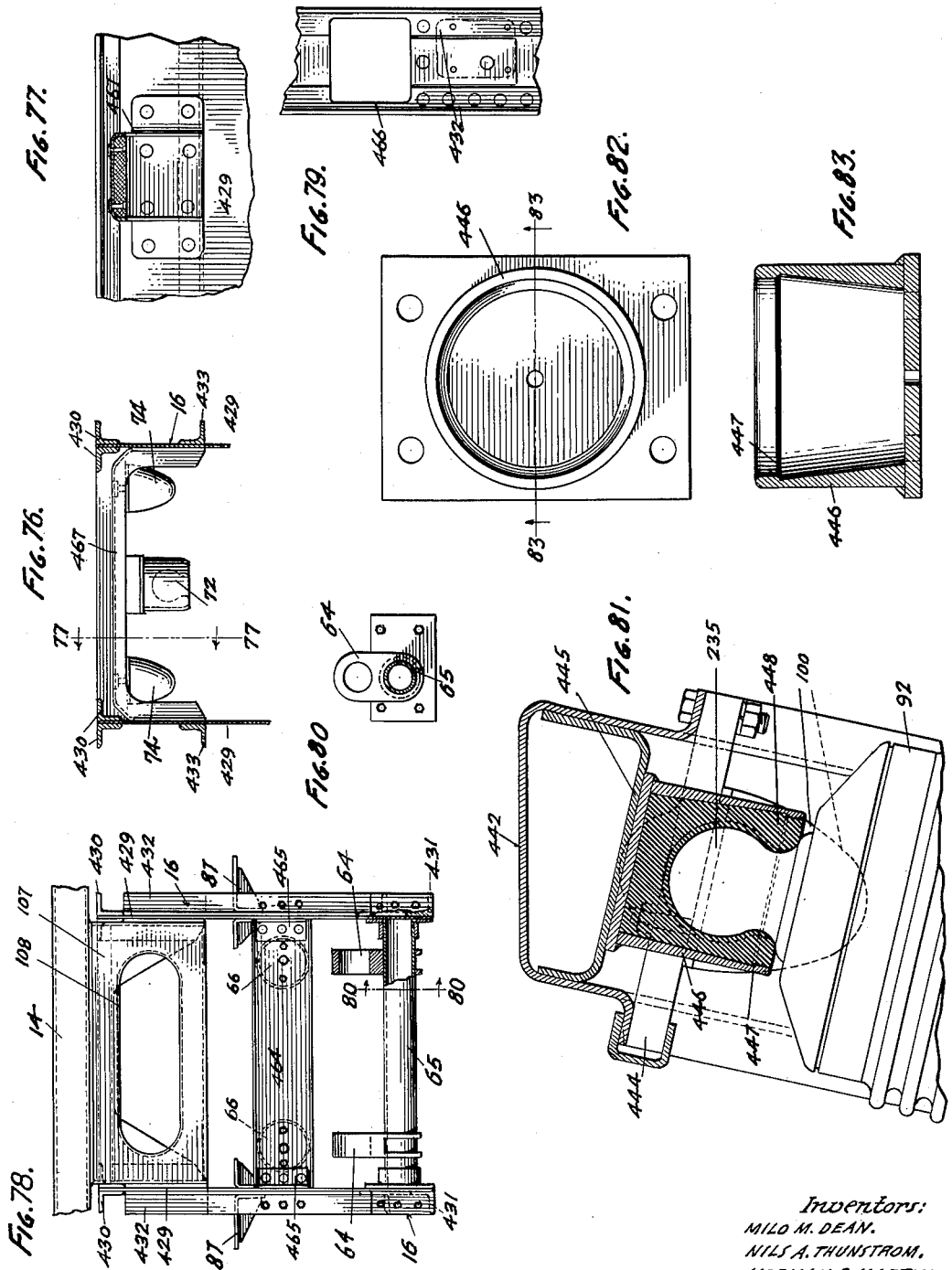
Inventors:
MILO M. DEAN.
NILS A. THUNSTROM.
NORMAN P. MARTIN.
By Harold Olsen
Attorney.

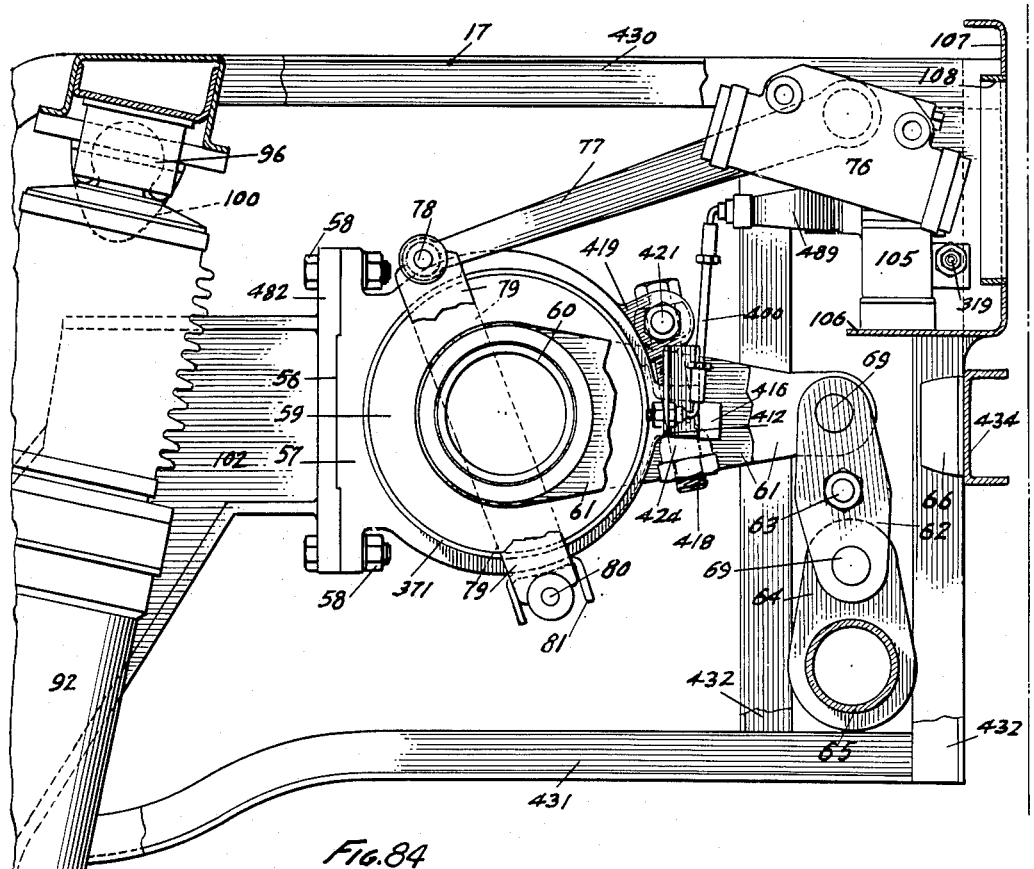
FIG.84
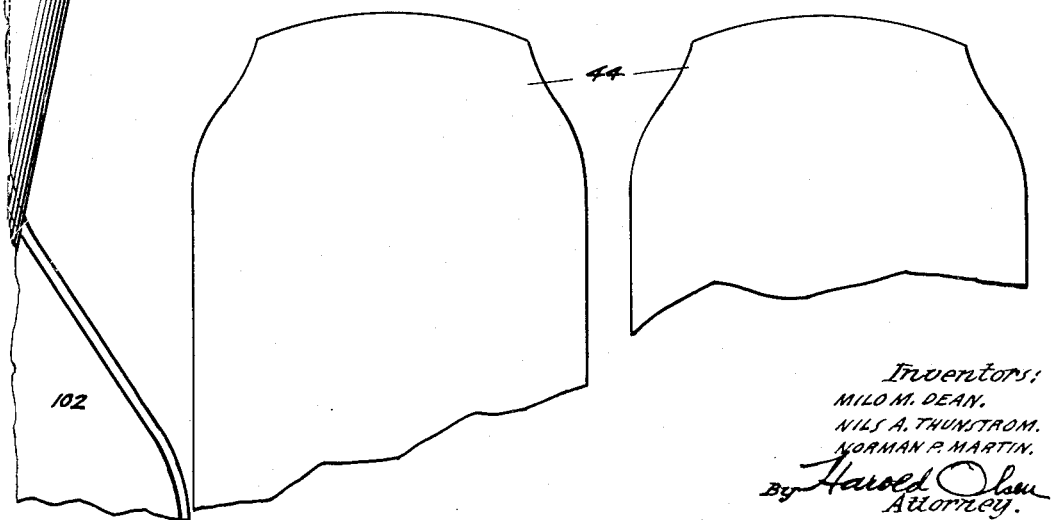

Nov. 8, 1955   M. M. DEAN ET AL   2,722,987
VEHICLE SUSPENSION MEANS AND BODY CONSTRUCTION THEREFOR
Filed Dec. 10, 1949   36 Sheets-Sheet 28
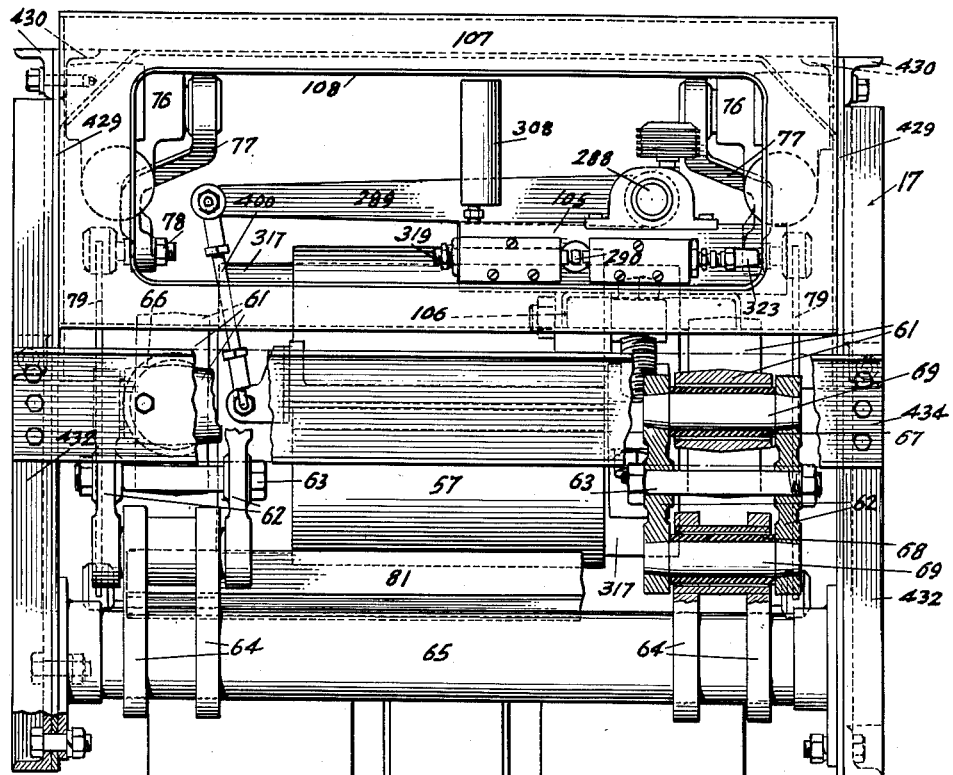
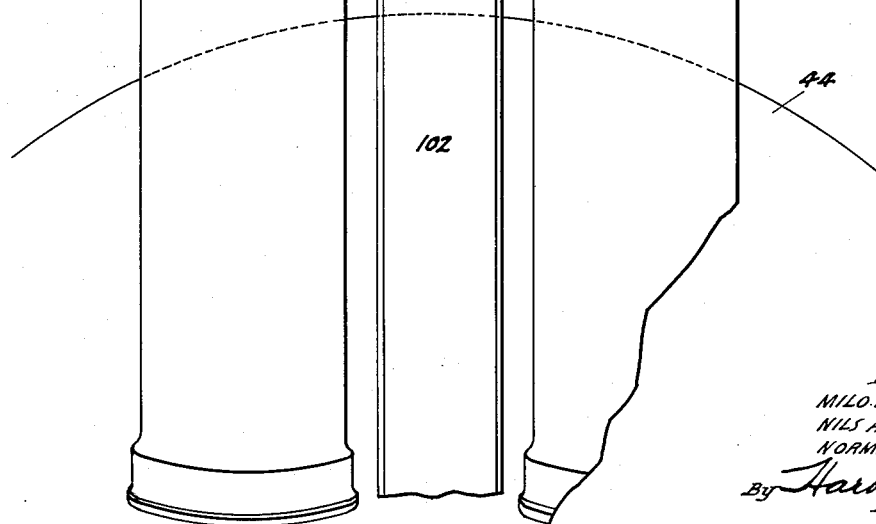
FIG. 86
Inventors:
MILO M. DEAN.
NILS A. THUNSTROM.
NORMAN P. MARTIN.
By Harold Olsen
Attorney.

Nov. 8, 1955  M. M. DEAN ET AL  2,722,987
VEHICLE SUSPENSION MEANS AND BODY CONSTRUCTION THEREFOR
Filed Dec. 10, 1949  36 Sheets-Sheet 29

Inventors:
MILO M. DEAN,
NILS A. THUNSTROM,
NORMAN P. MARTIN,
By Harold Olsen
Attorney.

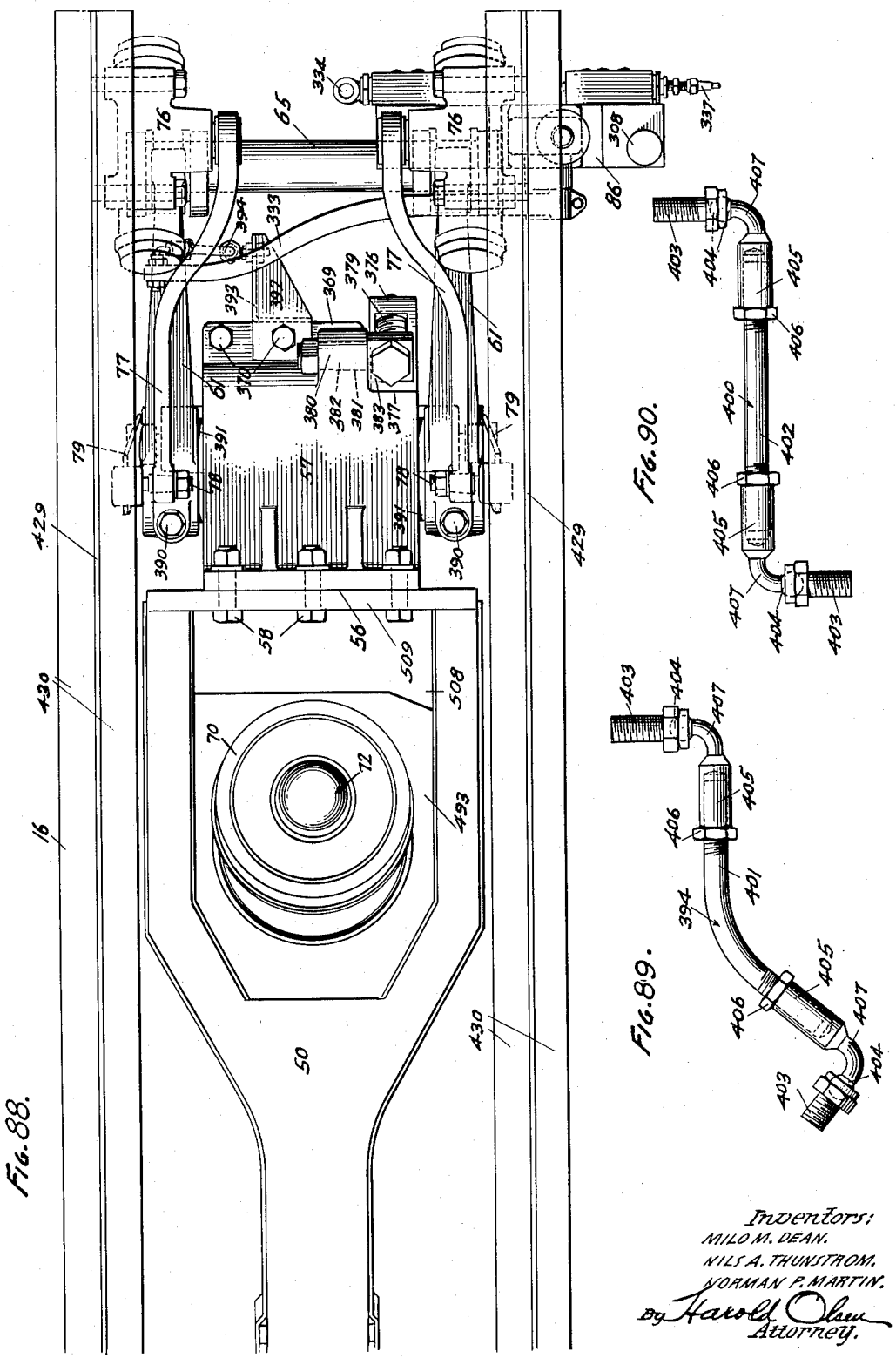

Nov. 8, 1955  M. M. DEAN ET AL  2,722,987
VEHICLE SUSPENSION MEANS AND BODY CONSTRUCTION THEREFOR
Filed Dec. 10, 1949  36 Sheets-Sheet 31
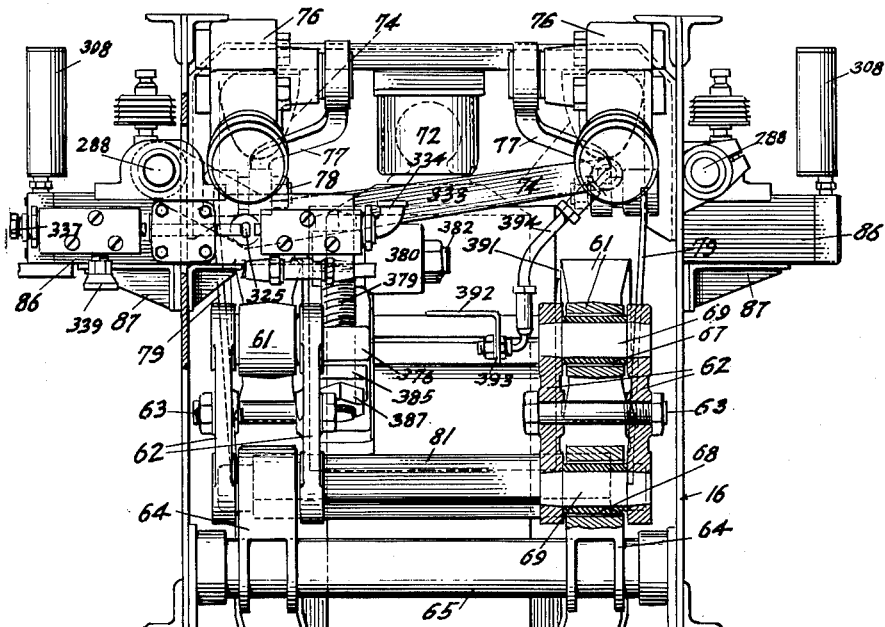
FIG. 91.
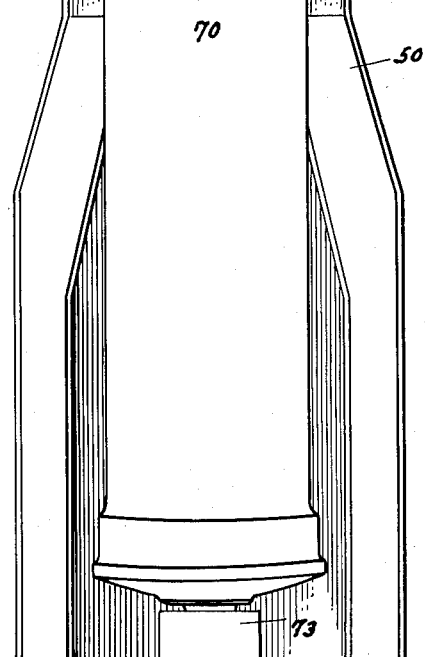
Inventors:
MILO M. DEAN.
NILS A. THUNSTROM.
NORMAN P. MARTIN.
By Harold Olsen
Attorney.

Nov. 8, 1955 M. M. DEAN ET AL 2,722,987
VEHICLE SUSPENSION MEANS AND BODY CONSTRUCTION THEREFOR
Filed Dec. 10, 1949 36 Sheets-Sheet 34
Fig. 94.
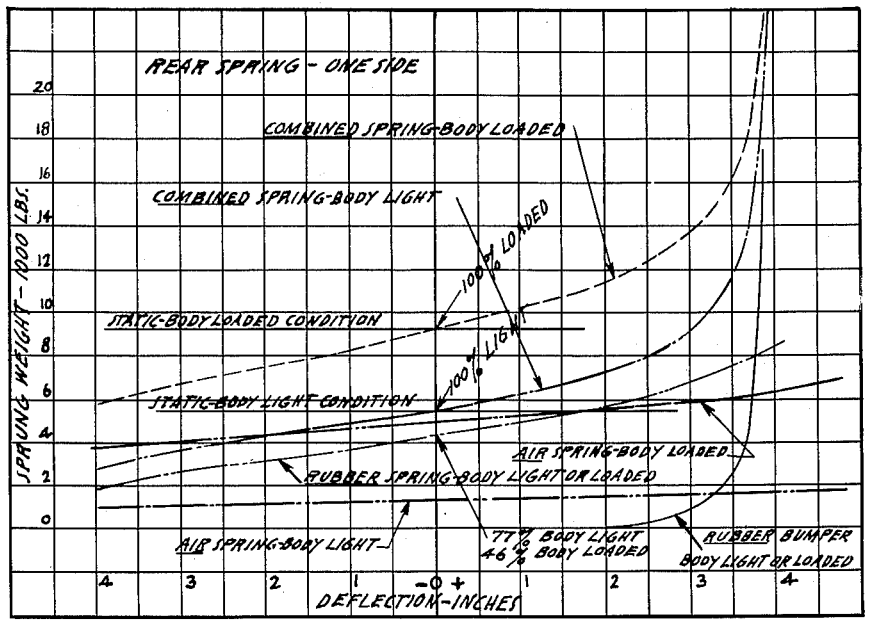
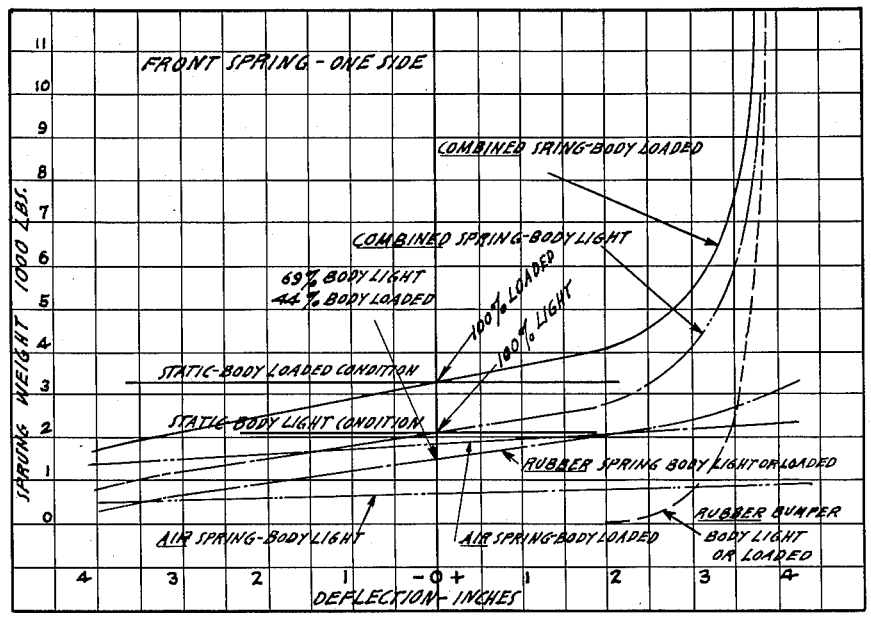
Fig. 95.
Inventors:
MILO M. DEAN.
NILS A. THUNSTROM.
NORMAN P. MARTIN.
By Harold Olsen
Attorney.

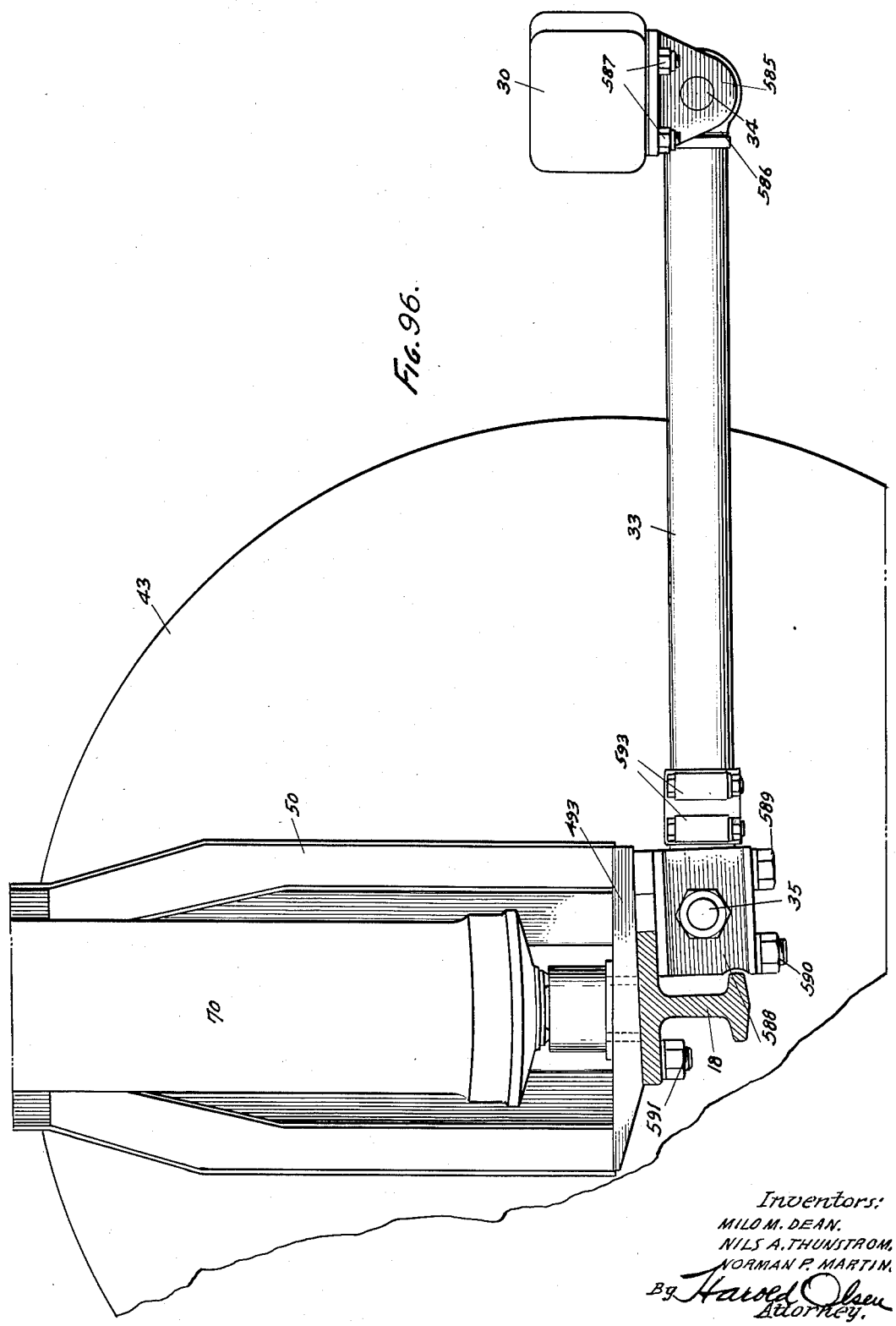

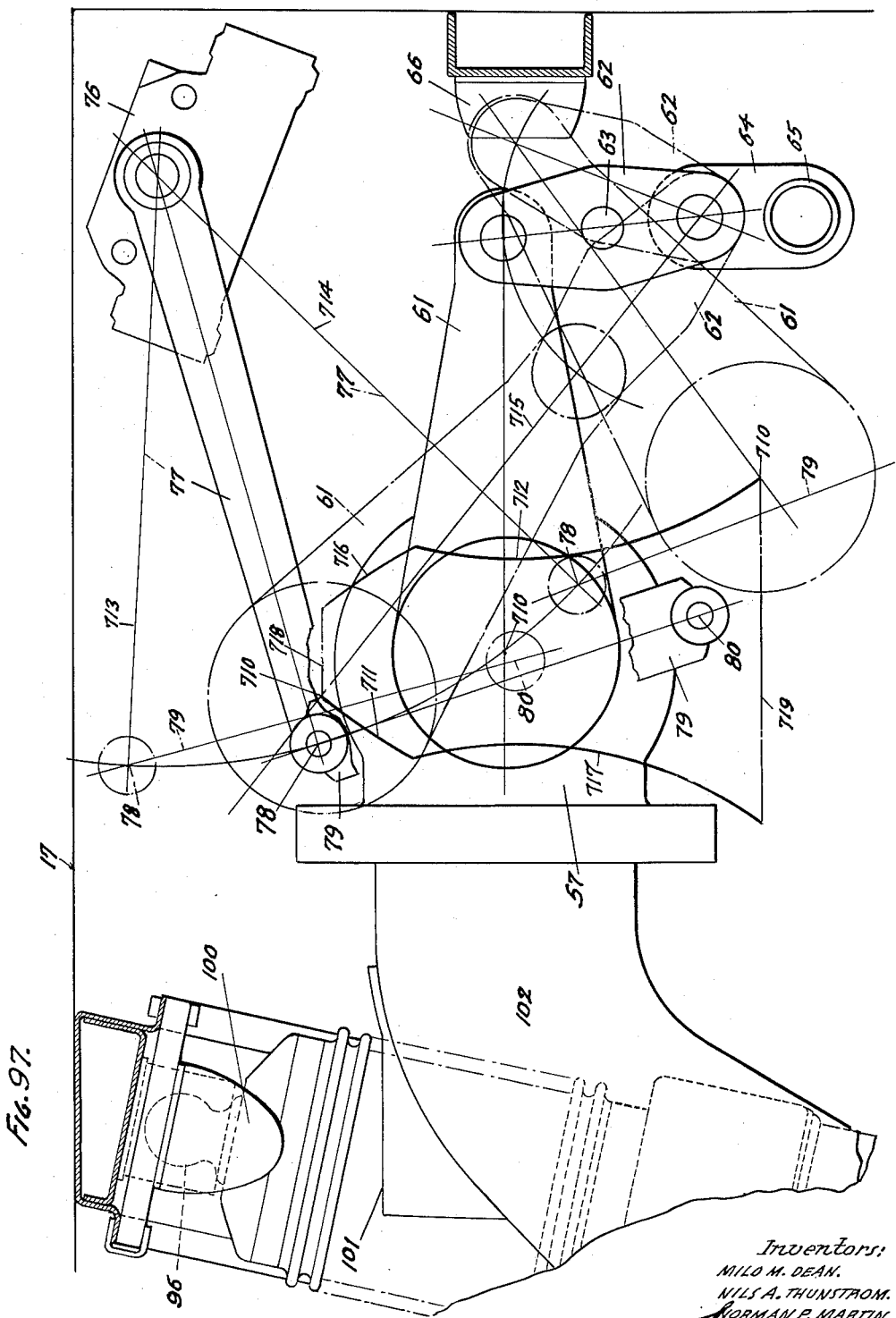

United States Patent Office 2,722,987
Patented Nov. 8, 1955

2,722,987

VEHICLE SUSPENSION MEANS AND BODY CONSTRUCTION THEREFOR

Milo M. Dean, Palatine, and Nils A. Thunstrom and Norman P. Martin, Chicago, Ill., assignors to The Greyhound Corporation, Chicago, Ill., a corporation of Delaware Application December 10, 1949, Serial No. 132,224

10 Claims. (Cl. 180—64)

This invention relates generally to improvements in automotive vehicles and is particularly directed to a suspension means for improving their riding qualities. The invention also relates to a body construction which facilitates an arrangement and operative connection of the body supporting and suspension and cushioning elements widely spaced at levels above the wheels, including connections and actions at or near the vertical center of gravity of the vehicle.

It has long been a problem in bus construction to provide adequate passenger comfort during extended periods of touring and under the varying road and load conditions encountered during such travel. A large part of the problem has been to reduce the transmission of such shocks and other discomforts to the passengers as are incident on wheel hop, on the negotiation of winding roads at relatively high speeds, and on acceleration and deceleration of the vehicle. Various kinds of spring suspension schemes have been tried in an attempt to overcome the discomforts of the kind mentioned, but to the best of our knowledge none have been decidedly successful. We have largely solved the above problems by providing means by which stability and cushioning against lateral body motions is obtained by one set of body-supporting springs, and by which additional vertical body support and cushioning is obtained by a second set of springs which automatically responds to increased load by a proportionate increase in spring rate and which can simultaneously absorb shocks incident to wheel hop.

The invention includes improvements in resilient suspension means per se, and has among its objects to provide a body-supporting and suspension device which has interacting systems of torsion springs and fluid springs, in which the torsion springs in addition to supporting their share of vertical loads of the unloaded and loaded body also act to maintain stability of suspension structure, since they are able to yieldably resist loads laterally and longitudinally as well as vertically. The torsion springs may be of rubber, and the fluid springs may be inflatable and deflatable by compressed air, selectively and coordinately controlled by body motions.

Another object of the invention is to provide a core body structure within which the suspension elements can be housed and widely spaced transversely of the vehicle to promote maximum spring reaction for a minimum of body roll, and can be at such a high level over the axles or wheels as to be near the center of gravity of the body to minimize roll moment. When negotiating a curve adequate cushioned resistance to transverse forces is obtained, and yet such transverse forces as are imposed on the body as a result of vertical movements of individual wheels do not cause undue disturbance. The solution of these problems has been accomplished by finding the proper relative location for the torsion springs by ascertaining the proper lengths of their actuating arms in relation to the body suspension points, and by inclining shackles of the right length, in a predetermined direction and in a predetermined degree, the shackles acting as transversely swingable intermediates connecting the body with the rubber torsion spring control arms, and being so arranged as to slightly change the height of the body when it swings laterally.

Another object is to provide an air spring suspension system acting with the torsion springs for supporting the body and its loads, and to provide means by which the spring rate of these air springs can be automatically varied to support more and more of the body weight as its passenger or baggage and/or freight load increases and to maintain the body in predetermined vertically spaced relation to axles and wheels. This is accomplished by regional level control valves, the integrated action of which is based upon the fluctuations in the vertical distance between body and the axle, when these persist for a predetermined period, the action being such as to substantially always maintain the floor of the body at a desired height above and in a parallel relation with the axles or wheels. The arrangement is such that any force which acts on the body to move it out of its predetermined position automatically operates the levelling control valves to change the spring rate of the air springs, as demanded, to exhaust air from one or more springs and introduce air into one or more other springs, in a selective and compensatory manner.

Another object is to provide means for locating the axles in a predetermined transverse relation to the vehicle body and definitely to hold them in that position, and this is accomplished herein by using a pair of radius rods for each axle, parallel with the long axis of the vehicle. In the case of the front axle the radius rods are carried forwardly thereof, and are arranged to have their pivotal points located as close as possible to the center of the eye of the pitman arm so as to reduce steering error. The radius rod attachments to the axles are located close to the wheels to reduce to a minimum the possible angularity of the axle in relation to the body.

Another object is to have all pins used in the spring suspension, such as shackle pins and radius rod anchor pins, rubber bushed to avoid need for lubrication; the only lubricated parts being the pistons of the air springs. The invention substantially prevents transmission of wheel hop jolts to the passengers and reduces to a minimum transmission of shocks to the passengers due to vehicle acceleration and deceleration incident to starting, stopping and speed reduction by braking action.

Other objects of this invention are: to improve riding qualities of automotive vehicles; to prolong the life of the vehicle and equipment thereof by elimination of high frequency vibrations; to minimize transmission of tire noise and jar to the body structure; to obtain equally good riding qualities with light loads as with heavy loads; to maintain within reasonably close tolerance a predetermined road clearance between the body and the road, regardless of the amount of load and/or distribution thereof; to substantially reduce the roll moment of the vehicle body; to give the body the proper lateral freedom in relation to the axles; to prevent high frequency vibration transmission from unsprung parts to the bus body; to eliminate jolts on the vehicle body due to separate wheel hop; to reduce or eliminate steering error due to erratic tracking, and yet maintain the desired freedom of movement between the axles and the vehicle body; to reduce the unsprung weight and the overall weight of the spring suspension system; to obtain an adequate self-damping spring suspension system by so relating the spring rates of two separate spring systems as to obtain self-damping interaction; and to reduce maintenance costs by elimination of spring failures, lubrication problems, etc.

Other objects of the invention are: to provide bus body cushioning means which can act at a level well above the wheel level, and near the vertical center of gravity of the vehicle; to provide a dual-suspension system for each wheel; to provide a dual-suspension system in which two kinds of springs are used; to use one kind of spring having a reasonably constant spring rate within the operating range of this spring, and to use a second kind adapted to automatically have the spring rate changed, and raised or lowered, as body load increases or decreases; to provide means by which to adjustably time the automatic action of the second kind of spring; to so operate the second springs as to maintain a substantially fixed distance between the body and the axles whatever may be the degree of body loading, or kind or degree of forces generated during vehicular motion; to carry out all of the above objects in relation to a double-deck bus structure; to provide a specific type of double-deck bus structure by which high placement and widely spread action of any suitable body-cushioning and supporting elements is facilitated; to provide a truss structure by which the suspension system can be highly placed and yet permit the engines to be suspended from a part of the body which lies above the highly placed suspension system; to use parallel systems of rubber torsion springs and compressed air springs which constantly interact to support the loaded and unloaded body, and in which the air springs increasingly assist the rubber springs in supporting the body, as body load increases; to provide for the anchorage of radius rods from parts of a body which are supported from foundation trusses which are cross-connected and bridged by beams which are above the wheels; to provide for shock absorption by rubber springs of forces generated by acceleration or deceleration of the vehicle while these springs are at the same time supporting the body; to use columns attached to and rising from the axles as means for obtaining high placement of the rubber torsion springs and their connection near the sides of the body; and to provide foundation truss structures so located as to provide passenger compartments respectively above and below them.

New and fundamental conceptions herein include: the high location of the suspension connections for the axle and body, with the connections widely spaced; the provision in such connections of means for yieldably, but with adequate damping, resisting and cushioning vertical, transverse, and longitudinal movements of the body and axles relatively to one another; the provision of two complemental or parallel spring systems, the first torsional in action and the second expandable and contractible in action; the automatic control of the expandable and contractible actions of the second part of the spring system in response to local forces which tend to increase or decrease the vertical distance of the body from the axles; the provision of two spring systems one having a constant and substantially higher spring rate than the other; the use of rubber torsion springs for obtaining relatively low spring rate, and which can absorb shocks in three directions which are perpendicular to one another; the use of torsion springs having their axes extending longitudinally of the vehicle; the use of laterally transversely extending arms with links extending downwardly and outwardly from the outer ends of the arms and connected with the body to assist in stabilizing the body against transverse motion; the use of rubber torsion springs in this combination; the application of the connections to a bus or vehicle of the double-deck type; the body structure by which the carrying out of the above conceptions are made possible and feasible; the use of hollow truss-connecting beams; the arrangement of the radius rod anchorages; and the tubular truss structures and braces and reinforcements therefor by which sufficient body rigidity is obtained for all of the purposes herein.

Objects, phases, features and advantages of our invention will also be referred to in the description of the drawings, and in said drawings:

Fig. 1 is an outside perspective view of a bus with some of the covering parts omitted to show the right-hand truss in relation to the crossbeams which support elements of the suspension and levelling means;

Fig. 2 is a somewhat diagrammatic, combined vertical longitudinal section and side elevation, showing the general relations of the principal elements of this invention;

Fig. 3 is a plan section of the upper rear and front passenger compartments of the bus, and showing the arrangement of the seats and aisles;

Fig. 4 is a plan section showing the lower passenger compartment, engine compartment, and the front and rear axles, radius rods, and air spring cylinders therefor;

Fig. 5 is a vertical transverse section of the vehicle taken approximately on line 5—5 of Fig. 2;

Fig. 6 is a vertical transverse section of the vehicle taken approximately on line 6—6 of Fig. 2, showing the suspension and leveling mechanism as associated with the front wheel;

Fig. 7 is a view similar to Fig. 6 taken on line 7—7 of Fig. 2, illustrating the mechanism associated with the rear wheels;

Figures 17, 18:
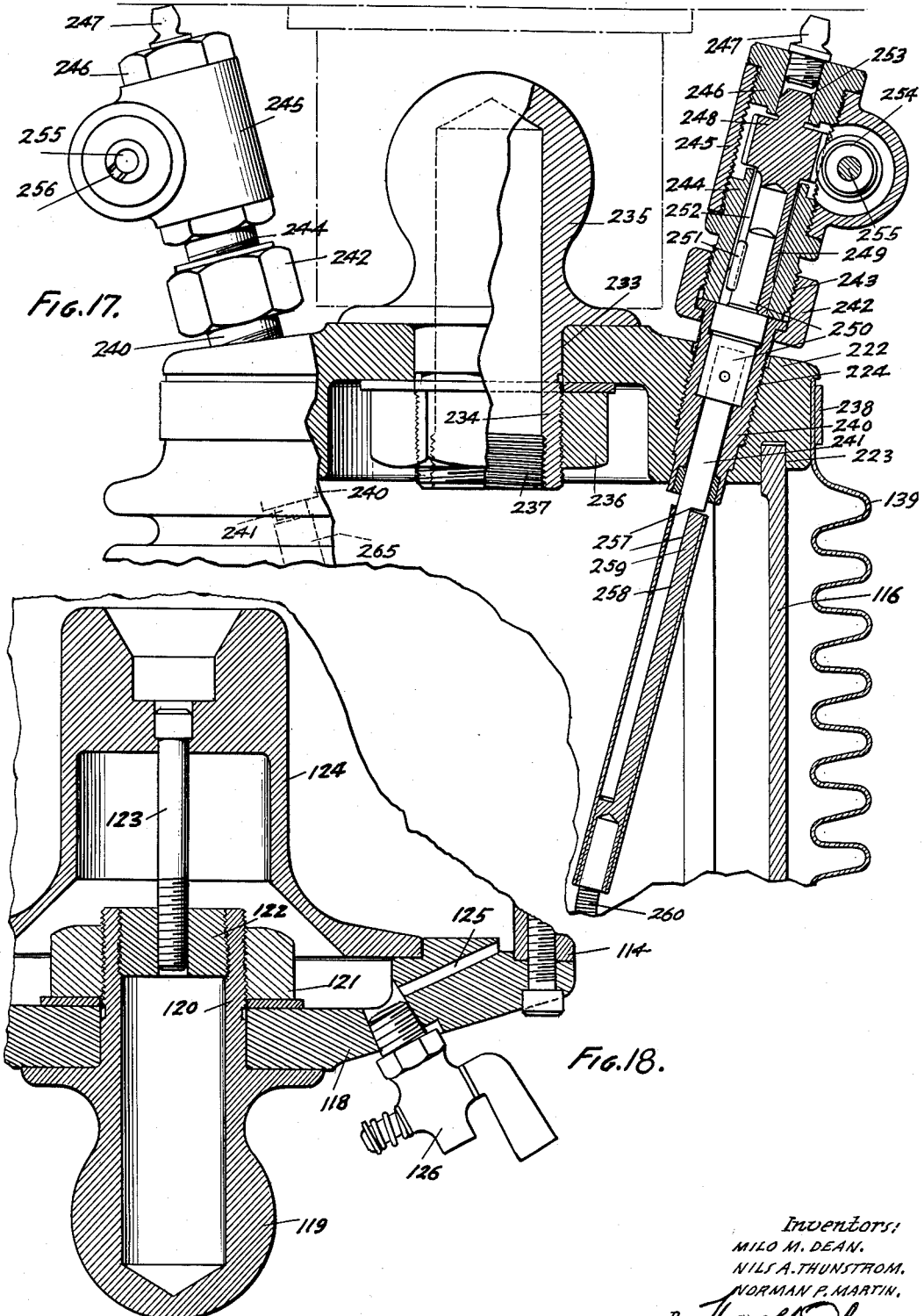
Figure 85:
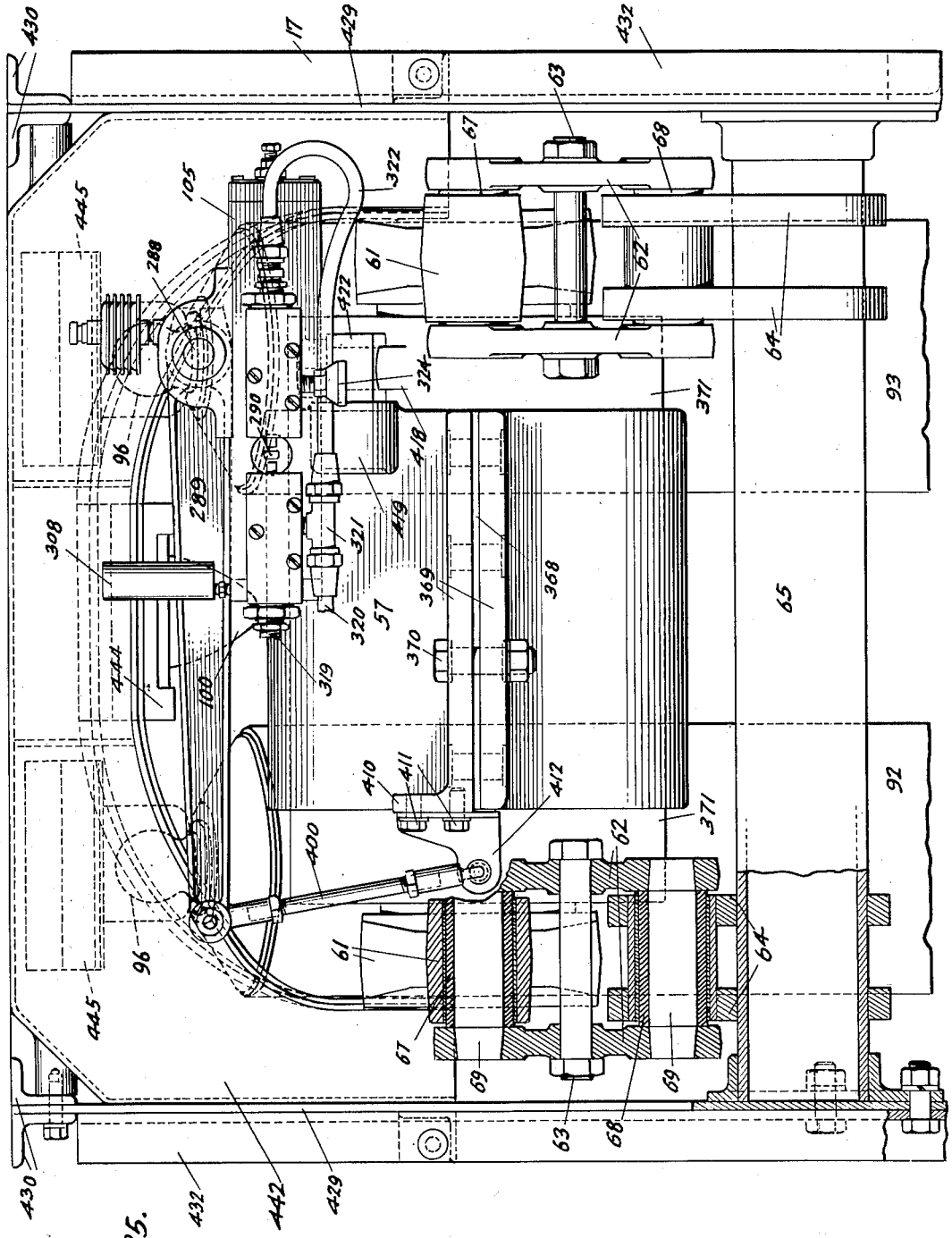
Figure 87:
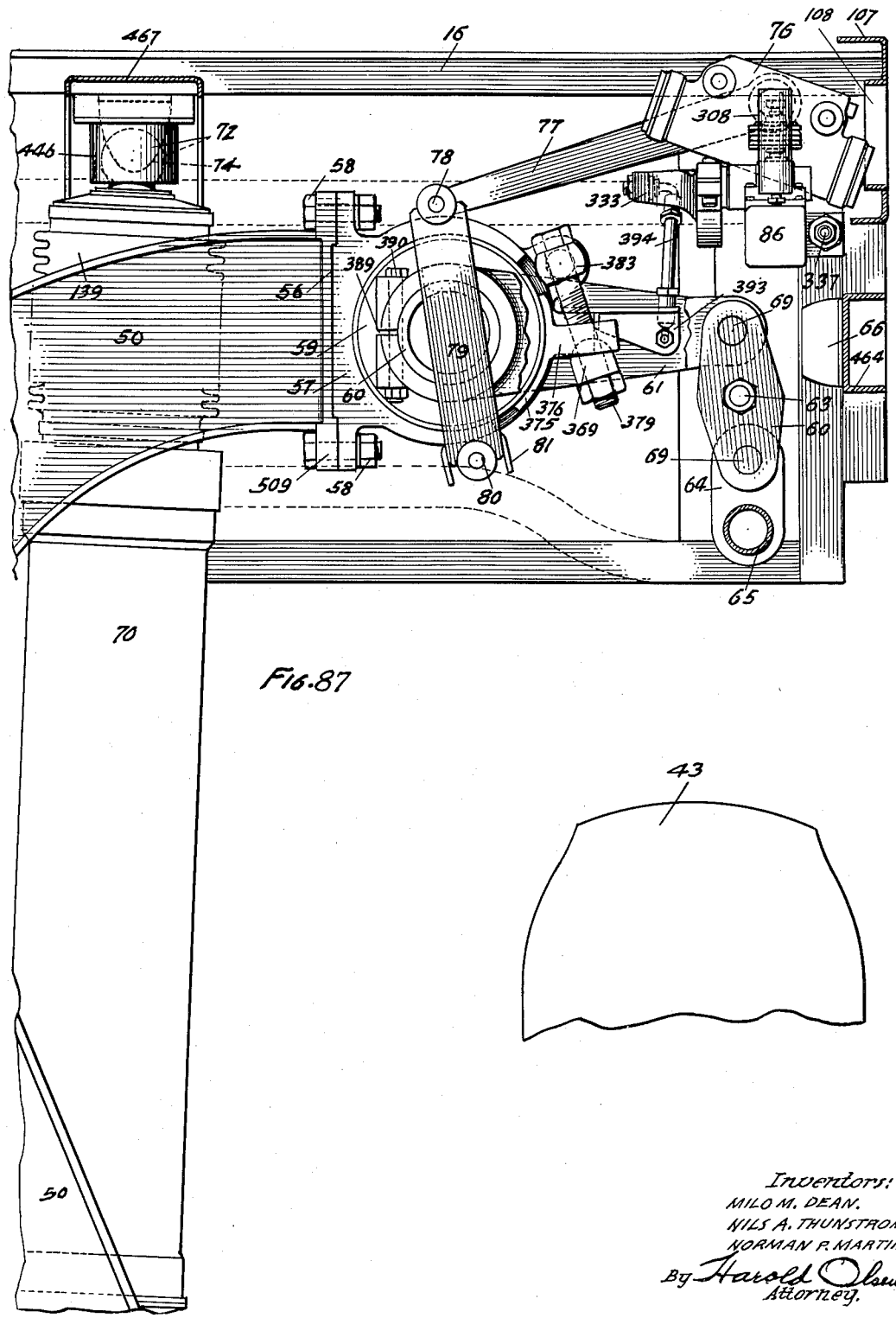
Figure 92:
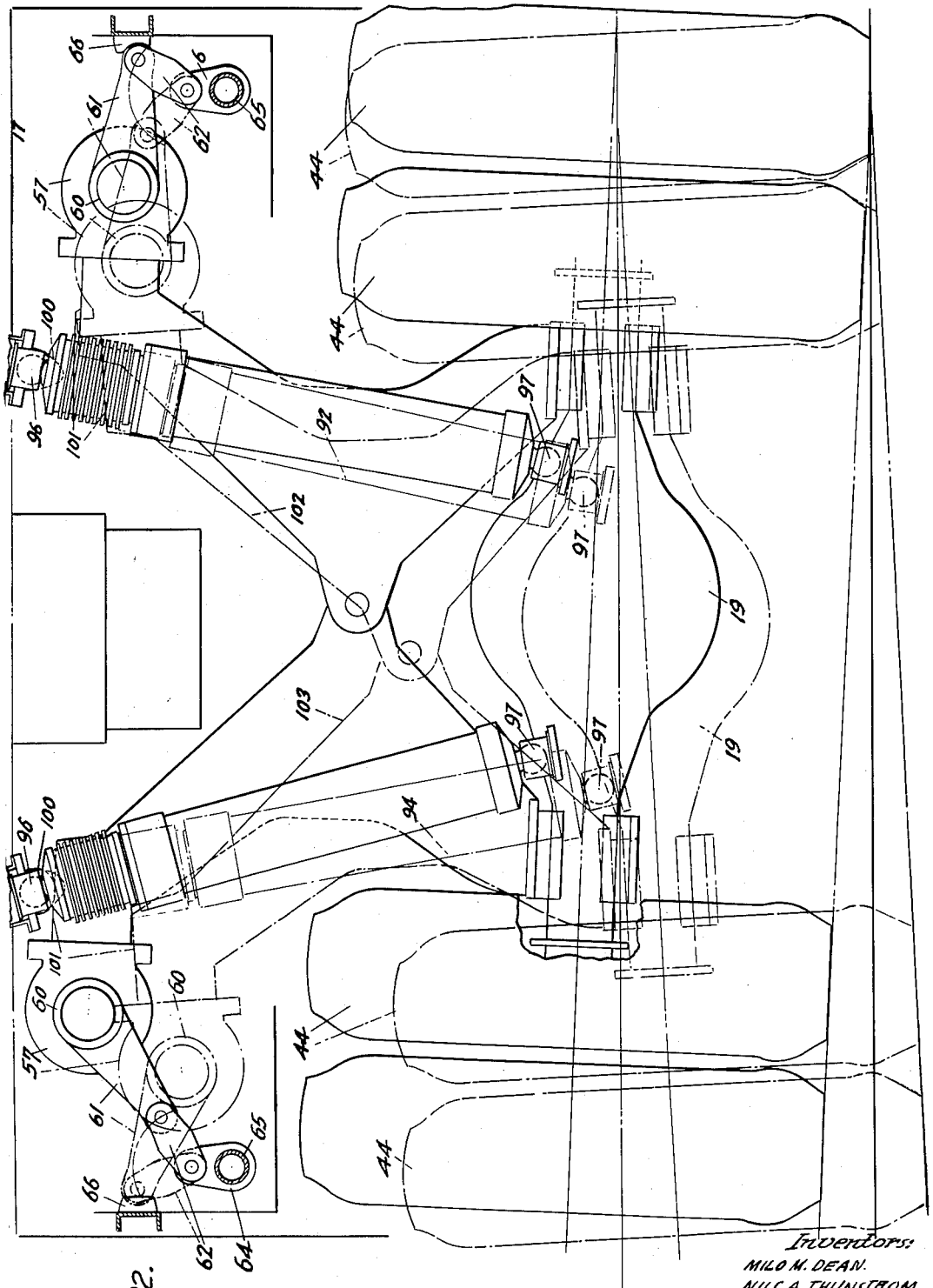
Figure 93:
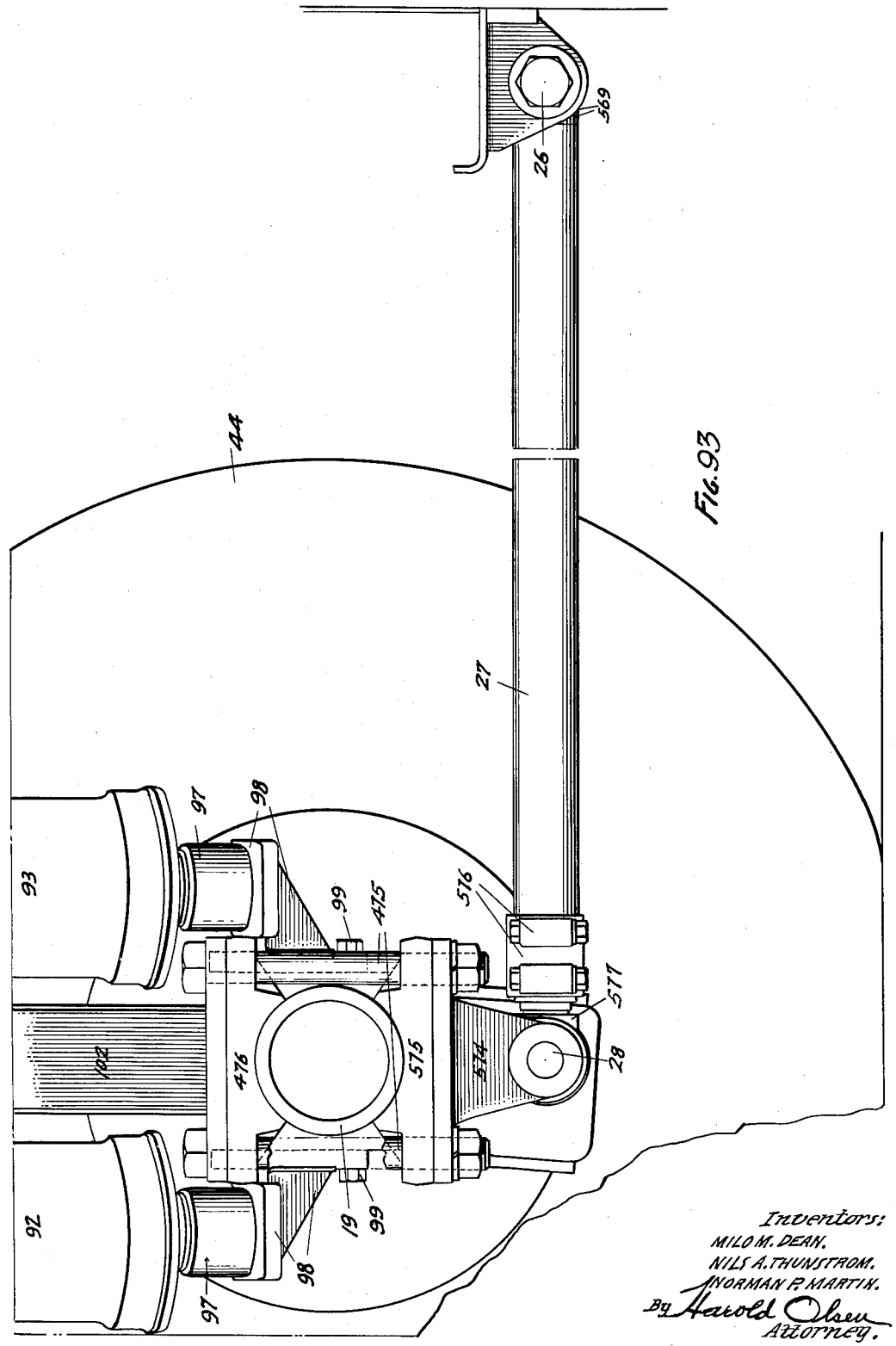

Figs. 8A and 8B together constitute a longitudinal vertical sectional view, partly in elevation, of one of the air spring structures;

Fig. 9 is an elevation of part of the inertia valve supporting and adjusting mechanism, viewed from line 9—9 of Fig. 8A, with certain parts in section;

Fig. 10 is a top plan of Fig. 9;

Fig. 11 is an elevation of the valve sleeve of the inertia valve mechanism, and of part of its supporting tube;

Fig. 12 is a vertical section of the inertia valve mounting and adjusting means taken on line 12—12 of Fig. 9;

Fig. 13 is a vertical section showing the guiding and centering means, and part of the suspension means, for the sleeve of the inertia valve;

Fig. 14 is a top plan of the piston head showing the circular arrangement of the reed valves and their relations to the inner ports of the inertia valve;

Fig. 15 is a vertical section taken on line 15—15 of Fig. 14;

Fig. 16 is a bottom view of Fig. 11 showing the guide rollers of the inertia valve sleeve;

Fig. 17 is a vertical section through the upper end of the piston showing details of part of the means for adjusting the stop sleeve through the pinion;

Fig. 18 is a detail vertical section of the lower end of the cylinder;

Fig. 19 is a top plan of a cap ring structure for the upper end of the cylinder;

Fig. 20 is a vertical section on line 20—20 of Fig. 19;

Fig. 21 is a top plan view of a bushing retainer ring for the upper end of the cylinder;

Fig. 22 is a vertical section on line 22—22 of Fig. 21;

Fig. 23 is a top plan of the upper end of the cylinder;

Fig. 24 is a vertical detail section on line 24—24 of Fig. 23;

Fig. 25 is a bottom plan of the head for the upper end of the piston;

Fig. 26 is an elevation and vertical section on line 26—26 of Fig. 25;

Fig. 27 is a vertical detail section on line 27—27 of Fig. 25 showing the air supply fitting;

Fig. 28 is a vertical detail section on line 28—28 of Fig. 25 showing the lubricating oil supply fitting;

Fig. 29 is a top plan of the fitting of Fig. 28;

Fig. 30 is a vertical section on line 30—30 of Fig. 25;

Fig. 31 is a top plan view of the upper end of the lower piston section;

Fig. 32 is a vertical section on line 32—32 of Fig. 31;

Fig. 33 is a vertical section on line 33—33 of Fig. 31;

Fig. 34 is a bottom plan of the bottom end of the lower piston section;

Fig. 35 is a vertical section on line 35—35 of Fig. 34;

Fig. 36 is a vertical section on line 36—36 of Fig. 34;

Fig. 37 is a top plan of one of the level control valves for regulating the air pressure and spring rate for an air cylinder for the front axle or wheels, with the valve tripping elements in neutral positions;

Fig. 38 is a side elevation of Fig. 37, including the air supplying and air exhausting piping connections;

Fig. 39 is a vertical longitudinal section taken on line 39—39 of Fig. 37;

Fig. 40 is a top plan view of one of the level control valves for regulating the air pressure and spring rate of one pair of air cylinders associated with the rear wheels or axle or axles, with the valve tripping elements in initial or neutral positions;

Fig. 41 is an elevation of Fig. 40, including the air supplying and air exhausting piping connections;

Fig. 42 is an elevation of the right end of Fig. 41;

Fig. 43 is a longitudinal vertical section taken on line 43—43 of Fig. 40 showing the valve trip piston metering or timing valve and the passages for the liquid controlled thereby, as well as the trip piston control lever;

Fig. 44 is an elevation of the left end of Fig. 43;

Fig. 45 is a detail vertical longitudinal section taken on line 45—45 of Fig. 44;

Fig. 46 is a diagrammatic plan view showing the air supply pipes in relation to the air springs and level control valves therefor;

Fig. 47 is a side elevation of Fig. 46;

Fig. 48 is an elevation partly in section of the rear side of the right-hand torsion spring assembly, for the front axle;

Fig. 49 is an elevation of the right side of Fig. 48, partly in section to show the rubber spring;

Fig. 50 is an edge view of one of a pair of shackles which connect each torsion spring arm with the body;

Fig. 51 is a face elevation of Fig. 50;

Fig. 52 is a detail section of one of the rubber bushings for a rear shackle;

Fig. 53 is a detail section of one of the rubber bushings for a front shackle;

Fig. 54 is an elevation of the right side of Fig. 48, partly in section, and with the rubber spring omitted, and showing the arrangement for the shock-absorber operating links, and showing the bracket for the level control valve operating link;

Fig. 55 is an elevation of the left side of Fig. 54;

Fig. 56 is a detail elevation of the link bracket of Fig. 55;

Fig. 57 is a detail top plan of the link bracket of Fig. 56;

Fig. 58 is an elevation, partly in section, of the forward side of the right-hand torsion spring retainer for the rear axle, showing the shock-absorber operating link;

Fig. 59 is an elevation of the left side of Fig. 58, with some parts omitted, showing how the rubber torsion spring projects beyond the retainer;

Fig. 60 is a partial elevation viewing the left side of Fig. 58, showing the bracket for the level control valve operating link;

Fig. 61 is a fragmentary top plan of Fig. 58 showing the bracket of Fig. 60;

Fig. 62 is a rear elevation of the rear beam structure which is disposed transversely of and cross-connects the body-forming truss elements, and overlies the rear axle, only about one half of this symmetrically formed beam being shown;

Fig. 63 is a vertical transverse section taken on line 63—63 of Fig. 62 viewing the arched structure to which two air springs and a bumper are attached;

Fig. 64 is a vertical section through the arch and rubber bumper, taken on line 64—64 of Fig. 63;

Fig. 65 is a vertical transverse section on line 65—65 of Fig. 64 through the arched structure, showing the air spring connection plates and bumper;

Fig. 66 is a bottom plan of one leg of the arch, viewed from line 66—66 of Fig. 65;

Fig. 67 is a top plan view of Fig. 62;

Fig. 68 is an elevation of the right side of Fig. 62;

Fig. 69 is a vertical transverse section of the lower middle part of the beam taken on line 69—69 of Fig. 62;

Fig. 70 is a vertical section taken on line 70—70 of Fig. 69;

Fig. 71 is a detail vertical section through the end panel taken on line 71—71 of Fig. 68;

Fig. 72 is a partial bottom plan of Fig. 68 viewing the beam from line 72—72 of that figure;

Fig. 73 is a rear elevation of part of the front beam, which cross-connects the foundation trusses and overlies the front axle;

Fig. 74 is a top plan of Fig. 73;

Fig. 75 is a vertical cross-section of the lower central part of the beam, taken on line 75—75 of Fig. 73;

Fig. 76 is a vertical cross-section on line 76—76 of Fig. 73, viewing the arch to which the top of an air spring is connected, and upon which two rubber bumpers are mounted;

Fig. 77 is a detail vertical cross section through the arch, taken on line 77—77 of Fig. 76, viewing one of the bumper supports;

Fig. 78 is an elevation of the right end of Fig. 73;

Fig. 79 is a detail elevation showing the opening outwardly through which projects the level control valve structure for the left end of the beam of Fig. 73;

Fig. 80 is a detail vertical section on line 80—80 of Fig. 78 showing the tubular cross bar and brace, and a shackle lug;

Fig. 81 is a detail cross-section through one of the arches of the rear beam, illustrating the rubber socket thrust connection for the upper ball stud of an air spring;

Fig. 82 is a plan view of one of the retainer cups for the rubber socket element of Fig. 81;

Fig. 83 is a vertical cross-section on line 83—83 of Fig. 82;

Fig. 84 is an enlarged elevation of the right-hand portion of Fig. 7 with some of the parts omitted for clarity;

Fig. 85 is an enlarged elevation partly in section of the right end of Fig. 7, with some of the parts including foreground parts omitted for clarity;

Fig. 86 is a view similar to Fig. 85, but showing some of the foreground parts which were omitted in that figure;

Fig. 87 is an enlarged elevation of the right-hand portion of Fig. 6, with some of the parts omitted for clarity;

Fig. 88 is a top plan view of the right side portion of the front beam, further illustrating the structures of Figs. 6 and 87;

Fig. 89 is a detail assembly view of one of the adjustable level control valve links for a front wheel mechanism;

Fig. 90 is a detail assembly view of one of the level control valve links for a rear wheel mechanism;

Fig. 91 is an enlarged elevation partly in section of the right end of Fig. 6;

Fig. 92 is a somewhat diagrammatic vertical transverse sectional elevation of the rear axle assembly, illustrating wheel hop action;

Fig. 93 is an elevation, showing how the lower ends of air cylinders are supported on the rear axle and how the rear radius rods are connected;

Fig. 94 is a graph illustrating the percentage of body weight carried respectively by the rear torsion springs and air springs;

Fig. 95 is a graph showing similar data for the front torsion and air springs;

Fig. 96 is a side elevation showing the radius rod connections for the front axle; and Fig. 97 is a diagrammatic view, illustrating the extreme positions of links and arms of the rear assembly, as limited by their lengths and by the bumpers, and showing the loci of motion of the torsion spring centers.

This invention is applied to a new bus structure, certain of the inventive features of which are the subject matter of separate applications which have now matured to Patent No. 2,682,928, issued July 6, 1954, and Patent No. 2,689,013, issued September 14, 1954. Some of these new structures are, however, closely related to the manner of connecting the suspension and shock absorbing and leveling elements, and radius rods of this invention, and are, therefore, claimed in combination herein. While the suspension system herein is in some respects specifically related to the new body structures and is so claimed, yet we believe that the new suspension system per se can be applied to other kinds of vehicle bodies, and, therefore, certain phases of this invention are not to be considered as limited entirely to use with the illustrated body structure. Thus certain phases of the invention herein are considered to be broader than the details of the body to which they have been shown applied, and certain other phases are specific thereto.

To assist to and facilitate an understanding of the broader aspects of our invention, the description of the drawings will first be directed only to the principal elements of the body structures, which are related to the center of gravity placement of our suspension connections and actions, and to the principal suspension elements which connect the body to the axles or to the wheels, and then the description will be directed to the many details of the various items making up combinations and subcombinations claimed herein, along with the broader phases of the invention.

Referring first to Figs. 1 to 4, inclusive, the new bus body is of the two-deck type and has a lower deck 1 and passenger compartment 2, and a rear upper deck 3 and rear upper passenger compartment 4, and a forward upper deck 5 and passenger and driver's compartment 6. The upper rear compartment is reached by a flight of stairs 7 and the upper front compartment is reached by a flight of stairs 8. Fig. 2 is somewhat diagrammatical in that all of the parts are not in the same vertical plane and in that some elements are omitted.

Referring to Figs. 1, 2 and 5, extending lengthwise of the body as foundation lateral side-defining core elements are a pair of trusses 10 and 11. The right-hand truss 10 has been shown in full lines in Fig. 1 and in dotted lines in Fig. 2, and its general relation to the certain other elements of the body can here be seen. The lower ends of the upper side wall and roof-forming elements 12 are anchored to the upper chords 13 of these trusses. The lower side wall-forming elements of the body are attached to or suspended from the lower sides of the lower chords 14. The lower chords 14 of the trusses are cross-connected by, and bridge hollow beams. These beams are highly placed hollow structures generally indicated at 16 and 17, and it is through these beam structures, thus highly placed, that the body is connected near the center of gravity of the body by the new suspension and leveling system herein. The connection with the front and rear axles 18 and 19 is made as best shown in Fig. 2. The trusses are also cross-connected by other beams and partitions. The high placed foundation trusses are extended rearwardly of the beam 17 as cantilevers, from which the engines and certain side-forming structures are suspended. Suspension of engines or other weighty elements from highly placed foundation trusses is believed entirely new in the automotive field.

The lower deck 1 lies forwardly of the rear beam and rear wheels and is supported by side frames generally indicated at 20 and 21 and these frames are cross-connected at a point which is forwardly of the rear axle, by a partition and cross-bracing structures 25, comprising upper and lower metal elements associated with a nonmetallic partition element. The rear of the lower deck 1 is connected to a metal cross-element of structure 25, and to the rear of the deck are connected as at 26 a pair of radius rods 27. The rear end of these rods is connected as at 28 to and beneath the rear axle 19. It is through this rear axle that the rear wheels are driven by engines supported from the cantilever structures above-mentioned.

The window division elements or posts 22 and 24, which define the window openings, are hollow and are made of sheet metal, and their upper and lower ends are bifurcated and straddle the corresponding chords 13, 14, as well as the supplemental chords such as sub-chord 23 and the bottom chord (not shown) of the roof structure. The upper and lower posts are vertically aligned with corresponding struts or uprights of the trusses 10 and 11, and the side frames 20, 21 are connected to the sub-chords 23 and support the lower deck. To the rear end of this lower deck and to a forward extension thereof the radius rods are connected. The suspension beams 16 and 17 are disposed forwardly and rearwardly of this deck.

The radius rods for the front axle are connected, see Figs. 2 and 4, to a crossmember 30 which is carried by beam 31, as a rigid forward extension of the lower deck 1, which extension passes over and forwardly of the front axle. The rear end of this beam 31 is secured in a manner to be more fully described, to the forward ends of two through-running channel shaped stringers 32 also shown in Fig. 5.

The pair of front radius rods 33 are connected by their forward ends as at 34 to the crossmember 30, and by their rear ends as at 35 to the front axle.

The upper chords of trusses 10 and 11 are also cross-connected near the front by a metal beam 37 against which the backs of seats 38 and 39 respectively in the upper rear and upper front compartments 4 and 6 are engaged. The beam 37 is fixed between elements of the trusses, to be described. The rear portions of the trusses 10 and 11 which extend as cantilevers to a point rearwardly of the beam 17 are cross-connected at a point near their rear terminals by a cross-beam 40 (Fig. 2). This beam 40 serves with other elements, later described, to support the engines in the rear space 41 behind the rear axle.

From an inspection of Fig. 1 it can be seen in a general way how the various sections of the body are assembled in relation to the main truss structures 10 and 11. Structural continuity below the lower chords 11 is obtained by the side frames 20 and 21, lower deck 1 and forward extension 31 and crossbeam 30. The extension 31 and beam 30 assist in the support of part of the front wall of the body which lies forwardly of the crossmember 30.

The front wheels are indicated at 43 and the rear wheels at 44. The axles are connected to the wheels in the usual manner. In this embodiment of the invention a single axle is used at the rear, but two rear axles may be used as will be explained, and our suspension and leveling construction may be applied to obtain the same unique suspension and cushioning efficiency and stability as is obtained by use with a single axle. It will be understood that when we use the expression "over the wheels" or "over the axles" we do not intend to be limited to the particular arrangement of axles and wheels shown in this disclosure. Our leveling and suspension elements are provided for each wheel or each wheel region, one of the purposes being to provide for selective local action, by our mechanism for maintaining parallelism of the body with the axles and for maintaining substantially a predetermined distance between the bottom of the body and the axles, whatever forces may be developed and exerted to disturb or change those conditions.

Referring now to Fig. 6, the suspension elements for both front and rear wheels or axles are arranged in pairs of sets, and the sets are substantially symmetrically arranged at opposite sides of the middle longitudinal vertical plane of the body or of the vehicle. In this embodiment each set comprises a torsion spring, an air spring and a shock absorber. The air springs are arranged inwardly in relation to the torsion springs, and in relation to the shock absorbing elements which modify the action of the torsion springs. The air springs also act as shock absorbers. The upper connections for all elements of the suspension system are made near the center of gravity of the body, and the connections between the torsion springs and body are made near the lateral sides of the body and over the wheels. The torsion springs supports are made in rights and lefts. For the front axle they are generally designated 50 and 51. The bottom plate of each support is secured by bolts as at 53 to the top of the front axle 18. The supports are secured together at their inner sides as at 54, and each extends upwardly and curves outwardly and is provided with a vertical outwardly faced surface 56 against which a torsion spring retainer member 57 is bolted as at 58.

Each retainer has a rubber torsion spring 59 clamped therein. The axis of each rubber spring extends lengthwise of the body. The rubber mass of each spring is traversed by and cemented or secured to a tubular shaft 60 which projects at opposite sides of the spring retainer. To each projecting part of the shaft 60 is secured an arm 61 which projects outwardly towards the corresponding lateral side of the body. To the outer end of each arm are pivoted a pair of links or shackles 62, see Figs. 86 and 87. The members of each pair of links are secured to their pivot pins by bolts 63. The lower ends of each pair of links are pivoted by pins to upstanding lugs 64, in turn rigidly secured as by welding to a rigidly secured tubular element 65 cross-bracing beam 16, which element extends lengthwise of the vehicle, as do the axes, of the rubber springs. The links 62 normally slant downwardly and outwardly to their points of pivotal connection with the lugs 64. Rubber bumpers 66, see Figs. 68 and 78, are disposed, as shown, to be engaged by the outer ends of arms 61 or by the links 62. The pivot pins 69 for the shackles have rubber bushings 67, 68.

The air spring structures are respectively designated 70, 71 and each is secured at the top to the beam 16 by a cushioned and pivotal ball and socket connection generally designated 72. Each air spring structure is secured by its bottom to the base of a corresponding spring support by a cushioned ball and socket connection generally designated 73. Rubber bumpers 74 are provided on the beam 16 and are adapted to be engaged by the upper surfaces 75 of the torsion spring supports or columns 50 and 51. The air cylinders slant upwardly and outwardly.

Referring to Figs. 6 and 88. Shock absorbers 76 are arranged, as shown, at a level above each arm 61 and are suitably secured as by bolting to the uppermost part of the beam 16. The control arms are indicated at 77 and the outer end of each arm is pivoted as at 78 to a swing-link 79. These links lie at opposite sides of each spring support 57 and of each arm 61. Each link has its lower end pivoted as at 80 to a cross-channel 81 secured to the bottom of the corresponding spring support 57.

The body supporting and spring rate functions of the air springs 70 and 71 are controlled by means responsive to relative motions between the wheels or axles and the body, to selectively coordinately increase or decrease the spring rates and body-supporting actions of either or both springs 70 and 71, conformably to variations in the amount and distribution of the load on the body. This is accomplished by valve mechanisms each of which controls the flow of air to and from one spring, or two springs in this embodiment in case of the rear axle. The casings of the valve mechanisms are generally indicated at 86, and each casing is supported on suitable shelves 87 on the beam 16. Control connections between the mechanism of the valve casings and the torsion spring retainers are here generally designated 88. Other numerals are applied to details of these mechanisms.

Referring now to Figs. 4 and 7, the arrangement of the suspension elements for the rear wheels, or rear axle or axles, is substantially like that of the elements for the front wheels or axle, except that the torsion springs are heavier, and four air springs are employed instead of two, and each control valve controls two air springs instead of one. In this case the elements are designed to carry a heavier load principally because of the substantial weight of the engines and of the elements of the ventilating system and accessory drive regulating devices, only party shown herein. All of these weighty elements are housed within the space 41 and all are supported from the cantilever portions 15 of the main trusses 10 and 11.

The rear air springs are respectively generally designated 92, 93, 94 and 95. They are pivotally connected at the tops as generally indicated at 96, to the upper part of the crossbeam 17, in the same manner as for the air springs 70 and 71. The bottoms of the rear springs are pivotally connected as at 97. The socket members are in this case mounted on brackets 98 bolted as at 99 to the front and rear sides of the rear axle housing 19. Bumpers 100 are provided on beam 17 and are adapted to be engaged by upper surfaces 101 of the spring support structures or columns 102 and 103.

The remaining elements of the suspension for the rear wheels are essentially the same as those previously described for the cushioning and suspension for the front wheels, and are generally designated by the same numerals.

The torsion spring supports 102 and 103 are connected by their bottoms to the rear axle by special means to be described in detail. The casing of the level control valve mechanism for the rear wheels is generally indicated at 105, and each casing is mounted on a shelf 106 which is part of an end panel 107. This panel has an inspection and servicing opening 108 therein. The linkages for controlling the valve mechanism of the casings 105, and which connect with a corresponding torsion spring retainer, are generally designated 109.

It will be noted that if the suspension points of the body with the arms of the rubber torsion springs are located just below the center of gravity of the body, the roll moment of the body is very substantially reduced, by this device alone. For example, in a standard bus if it is assumed that the suspension points are at the level of the axle, say 20 inches from the ground, with a center of gravity height of about 56 inches, the roll moment is predicated upon a 36 inch arm. By the device of the invention herein the suspension points if assumed, for example, to be at a level of 57 inches from the ground, and if the center of gravity of the body is assumed to be at about the 65 inch level, the roll moment will be predicated upon an 8 inch arm. Moreover, by our device the resistance to roll is increased because the suspension points, or the connecting points of the arms of the rubber torsion springs are so close to the sides of the vehicle. It is believed entirely new to elevate the suspension points of the body with the axle as we have done, and to widely locate these points near the side walls of the body.

Resistance to transverse loads, such as is experienced in negotiating curves, is offered by the spring suspension herein by means of the supporting shackles 62 which connect the body with the rubber spring controlled arms 61. The inclination and length of these shackles is so proportioned that reasonable normal operating loads are compensated for by the lift of the body as the body swings out of its normal position. In the case of excessive horizontal body movements the loads are taken up by rubber bumpers 66 mounted on the side structures of the body in opposition to the ends of the rubber torsion spring control arms. The torsion springs act to transfer rapid horizontal or lateral thrusts to the axle superstructure, to the axles and ultimately to the contact points between the tires and the road. A combination of the two previously mentioned load conditions, that is, the individual vertical wheel movement and transverse loading even when imposed simultaneously, are adequately taken care of by the spring suspension scheme herein.

Referring to Figs. 2, 4 and 7, the suspension and leveling and shock absorbing system for the rear wheels includes four air spring cylinders arranged in pairs, the members of which are disposed symmetrically at opposite sides of the longitudinal vertical middle plane of the body. In this embodiment of our invention one pair of springs is connected to and rises from the rear side of the rear axle and the other pair is connected to and rises from the front side of the rear axle. The bottom end of each air spring structure has a ball and socket connection with the axle. The members of each pair have an upwardly divergent relation, that is, each slants upwardly and outwardly from its lower point of connection with the axle. The upper end of each air spring has a ball and socket connection with the body, in this instance with a truss-connecting beam. This connection includes a bracket suitably secured to the top of the beam near the upper deck of the body. The cylinders are aligned lengthwise of the vehicle as are their lower connecting points. As viewed in plan the four lower connecting points can be considered as located at the corners of a smaller rectangle and the four upper connecting points can be considered to be located at the corners of a larger rectangle, the sides of which are parallel with those of the smaller rectangle and with the axis of the axle. All connecting points are substantially symmetrical with relation to the axis of the rear axle and to the longitudinal middle of the vehicle. These four rearwardly placed air spring cylinders, with the two forwardly placed air spring cylinders of the front axle are normally adapted to support a small portion of the unloaded body plus the equivalent of all passenger and baggage load.

*Fluid spring structure*

In this embodiment six fluid cushioning and shock absorbing springs are employed as part of the means for supporting the weight of the body and lading, and for applying a variable amount of locally and selectively applied upward thrust against the body conformably to increasing body load, and for counteracting the tendency of one side or region of the body to be lowered more than the opposite side, as when there is uneven weight distribution, or when braking and accelerating, and when the vehicle is negotiating curves. Four of these fluid operable body supporting elements are herein used on the rear axle and two of them are used on the front axle, but the number may be varied. They are used in pairs the members of which are symmetrically arranged at opposite sides of the longitudinal middle of the vehicle.

The construction of each fluid spring is substantially the same. Each spring structure is pivotally connected at opposite ends respectively with the axle or axles and with the body by means of ball and socket joints, see Figs. 6 and 7. These springs are air-filled, and in effect constitute air column supports for the body.

Referring to Figs. 8A and 8B, the springs in this embodiment are air-filled, and the amount and pressure of the air is varied for certain purposes, but not varied for other purposes. Each structure is composed of a cylinder 114 having a two-part tubular piston 115 reciprocable therein. These two tubular elements together form a chamber which is divided into an upper chamber of large capacity and a lower chamber of small capacity. The piston is made in two sections, upper and lower, respectively designated 116, 117. The upper section lies partly within and partly outside of the cylinder 114 and is pivotally connected by a ball and socket joint to a corresponding crossbeam 16 or 17.

Referring to Figs. 8B and 18, the cylinder head is indicated at 118 and has secured thereto a ball stud 119 having an exteriorly threaded tubular shank 120 traversing the head and secured by a nut 121. Held by threads within this shank is a plug 122, having a threaded bore receiving the threaded end of a screw 123 which secures an upstanding tubular structure 124 to the head as shown. This structure receives the tubular portion of a valve structure of the piston head in the manner shown in dot and dash lines in Fig. 8B, when the piston is in its lowermost position. The part 124 is used to obtain a high compression rate in the lower chamber. The cylinder head 118 is secured by six bolts to the bottom of the cylinder, and said head has a drain passage 125 leading to a circular depression from which fluid such as excess lubricating oil and condensate is drained by a suitable drain cock 126. The upper end of the cylinder, see Figs. 8A, 21 and 22, has fitted therein a bushing retainer ring 128 secured by six screw bolts 129, as shown. The ring provides an interior ledge 130, and within the retainer and having its lower end abutting this ledge is a bushing cylinder 131 having five equally spaced graphited grooves 132. The ring 128 also has extending therethrough a circular row of vertical openings 133, and also has a circular row of threaded openings 134. The upper section 116 of the piston 115 slides within the bushing cylinder.

Referring to Figs. 8A, 19 and 20, secured to the top of the retainer ring 128 is a cap-ring structure 135. This ring has an upright flange 136 and is secured to ring 128 by screws passing through openings 137 and into openings 134 of retainer ring 128. Secured to the flange 136 by a clamping ring 138 is the lower end of a bellows-like covering 139 which serves to protect that part of the upper section 116 of the piston which projects above the cylinder 114.

The lower section 117 of the piston, see Figs. 8B, 14 and 16, has a head 140 which has a valve mechanism believed to be unique in this art, and which is adapted to perform a shock absorbing function in conjunction with the body supporting function of the air spring. The piston head is secured by six bolts 141 to the bottom of the piston. The head has a circular shoulder which the bottom interior of the lower section of the piston fits, as shown. The head has a set of twelve vertical ports 142 passing therethrough, as part of a first valve mechanism. Pairs of ports are guarded on the upper side by a check valve 143 herein sometimes referred to as a reed. These reeds permit flow through the ports only when the piston moves down, or the cylinder moves up. These valves are in the nature of flap valves, in which the reeds are the flap elements. The reeds are composed of thin sheet steel, the thickness of which has been somewhat exaggerated in the drawing. Each reed is clamped at a point between its pair of openings by a block 144 held by two screw bolts 145. A circular guard ring 146 is clamped by second blocks 147 through which the bolts 145 also pass, and this ring 146 limits the upward movements of the opposite valving or flap portions of the reeds. These check valves open only on downstroke of the piston or on upstroke of the cylinder, and close on the upstroke of the piston, or downstroke of the cylinder. Thus on the appropriate stroke the fluid can quickly escape from the lower side of the piston head to the upper side. It is to be noted that the piston head 140 divides the cylinder into a small lower chamber and a large upper chamber, which two chambers can have a pressure differential, upon operation of a valve mechanism, later described.

Referring to Figs. 8B, 11, 14 and 15. The piston head has integral therewith an upstanding tubular extension 150 which is part of a second valve mechanism, and this extension has therein three circumferential sets of three ports each. The members of the upper set are designated 151, the members of the middle set 152 and the members of the lower set 153. The ports are controlled by a ported sleeve valve 154 which slides vertically on the tubular extension 150, and this sleeve has two circumferential sets of three ports each. The members of the upper set being indicated at 155 and the members of the lower set at 156.

The sleeve 154 of this second valve mechanism is responsive to the action of inertia, and in this embodiment is adapted to close when the rapid downstroke of the piston suddenly ceases. By this means the ports are momentarily closed to prevent immediate upward or recoil motion of the piston, or of immediate movements of cylinder and piston in opposite directions. The two valve mechanisms therefore also perform a shock absorbing function. The inertia valve sleeve ports are initially positioned as in Fig. 8B in register with the two upper sets of ports of the extension 150, to establish communication between the upper and lower chambers. In this position of the piston head the sleeve valve 154 is in its uppermost position and its lower end 158 is disposed at the upper side of the lowermost series of the three circumferential ports 153 of the upright tubular extension 150 of the piston head. On inertia action the sleeve may move to its lower limit, to close fully all three sets of circumferential ports 151, 152 and 153.

Means is provided for vertically adjusting the sleeve 154 for fully opened or partly closed initial registration of the sleeve ports with the ports of the extension 150. There is also provided means for varying the degree of response of sleeve valve to inertia action, to close more easily or less easily. Thus we provide for a differential adjustment in relation to inertia action, as well as for differential port volume adjustment.

The sleeve 154 is centered for reciprocation by means of rollers engaging an upstanding guide stud 160 held in an opening of the thickened top wall of the extension 150 by a nut 161. The sleeve 154 is secured to a head 162, see Figs. 11, 13 and 16. This head has four rollers 163 therein each on a journal bolt 164. The head is secured to the sleeve by four bolts 165 threaded into the head, each bolt traversing a washer 166 and forcing it against an interior circumferential shoulder 167 of the sleeve 154. The head has a shank 168 which fits into the lower end of a valve sleeve control tube 169. A pin 170 secures the shank to the tube. The upper end of the shank is slotted as at 171 to provide a recess. The pin 170 traverses the tube, shank and recess, as shown, and provides an anchoring element for the lower terminal of a suspension spring 172 for the sleeve 154. The tension of this spring can be adjusted to vary the degree of response to inertia forces. A second pin 173 secures the shank 168 in the tube 169.

The means for mounting and controlling the tube 169, and the means for obtaining tension adjustment of the spring 172 are best shown in Figs. 8A, 9, 10 and 12. This entire mechanism is supported on a plate 174. This plate is detachably secured against ledges 175 of the upper end of the lower section 117 of the piston by means of screws 176. The structure of the upper end of the lower piston section 117 is shown in Figs. 31 to 33, inclusive. The lower end of the upper piston section 116 abuts a circumferential ledge of the bottom section 117 which lies peripherally of the ledges 175, and the sections are suitably connected as by welding, the lower end of the upper piston section 116 being disposed within the lower piston section.

Referring to Fig. 12, the base plate 174 has an opening 177 in which is fitted the upper portion of a bearing tube 178 interiorly threaded as at 179. Fitting in the tube is a bearing bushing 180 having six graphited grooves 181, and slidably receiving valve tube 169. The bearing tube 178 has an exterior flange 182, the top of which abuts the lower side of the base plate 174. A clamp plate 183 is held by bolts as shown in Fig. 9, and non-rotatably secures the bearing tube 178 in operative position. Within the bearing tube is a tubular exteriorly threaded stop nut 184 having its threads engaging with the threads 179 of the tube 178, and having secured at its top, above the bearing bushing, a spur gear 185 by which the stop nut is rotated to raise or lower it. The gear is rotated by a pinion 186 in a manner to be described. The degree of downward translation of the tube 169 under the action of inertia is limited by the engagement of a fiber washer 187 on the tube with the top of the stop nut 184. This washer is backed by or abuts a split nut 188 in threaded engagement with external threads 189 of the tube 169. A clamping screw 190 holds the nut 188 against accidental rotation. The fiber cushion washer 187 engages the upper end of the gear 185 or the adjustable stop nut 184 to limit movement of tube 169 when inertia action moves said tube downwardly.

The spring 172 normally holds the upper end of the tube 169, or the upper face of the split nut 188 in engagement with a stop plate 192, rigidly secured to base plate 174 as shown in Fig. 9. The spring 172 urges the tube 169 upwardly, and the stop plate 192 is so placed that when the upper end of the tube 169 engages the plate 192, the ports of the valve sleeve 154 register with the ports of extension 150, as shown in Fig. 8B. The stop plate 192 is held by two diametrically disposed tie-rods 193. Each rod has a shoulder 194 which engages the top of the stop plate 192 and has a bolt 195 below this shoulder that traverses an opening in the plate 192, then traverses a spacer sleeve 196, then traverses base plate 174 and passes through clamp plate 183 and has a clamping nut 198. Each tie-rod 193 also has a guiding portion 200 which passes through a bushing 201 of a horizontal slide 202. Each tie-rod also has a shoulder 203 and above this shoulder a bolt 204 which traverses a crossmember 205 held against the shoulder 203 by a nut 206. The pinion 186 is journalled in plates 174 and 192 and has a journal extension 207 having a tubular fitting 208 pinned thereto. This fitting has a longitudinal slot 209 adapted to slidably receive the terminal fin of means in part accessible from the outside of the piston for rotating the pinion to adjust the threaded stop nut 184 axially or vertically.

The upper end of th spring 172 is attached to a crosspin 210 of a tube 211 which is carried by and fixed to the cross-slide 202. Rotatably mounted in a bushing 212 of the crossmember 205 is a screw shaft 213 having threads 214 engaged with interior threads of the tube 211. The screw shaft is held against translation in the crossmember 205. For this purpose the shaft has a flange 215 engaged with a washer 216 which, in turn, engages the bottom of crossmember 205. The shaft has an extension 217 above the crossmember 205, and a washer 218 on the extension engages the top of member 205. The extension 217 has a tubular fitting 219 pinned thereto. The bottom of this fitting engages the top of the washer 218. The fitting has a longitudinal slot 220 adapted to slidably receive a terminal fin of means, in part accessible from the outside of the piston, see Figs. 8A and 17 for rotating the shaft 213 to raise or lower the tube 211 to vary the tension of the spring 172 for correspondingly varying the response of the tube 169 and sleeve valve 154 to inertia forces.

Referring now to Figs. 8A, 12, 17, and Figs. 25 to 30, inclusive. The means for adjusting the stop 184 and the means for adjusting the tension of the spring 172 are supported by the head 222 which closes the upper end of the upper section 116 of the piston 115. It is also through a fitting in this head that air pressure is admitted to the air cylinder or air spring, and lubricant oil is also introduced into the cylinder through a fitting carried by this head 222. The head is circumferentially grooved as at 223 to receive the upper end of piston section 116. The head has diametrically disposed threaded openings 224 converging downwardly and inwardly. These openings are for the valve and spring adjustment fittings to be described. The head also has openings 225 for six tierods 227 which connect with six threaded openings 226 of ledges 175 of the lower section 117 of the piston, see Fig. 31, to clamp the head in place. The head also has a threaded opening 229 for an oil fitting generally designated 230 and has an opening 231 for an air supply fitting generally designated 232. The head also has an opening 233 and fitted therein is the shank of a ball stud 235 by which the piston is pivotally connected to a corresponding truss connecting crossbeam as shown in Figs.

6 and 7. The stud 235 is secured by a nut 236. The shank is internally threaded as at 237 for a plug 122, when a ball stud is used as in Fig. 18, at the bottom of the cylinder. The ball studs are thus interchangeable. The upper end of the bellows covering 139 is clamped to the head 222 by band 238.

Referring to Figs. 8A and 17, screwed into each threaded opening 224 is a bearing sleeve 240 having a shaft 241 rotatable therein. The sleeve has a union nut 242 in threaded engagement as at 243 with a tubular bearing member 244 in turn threaded into a gear casing 245 having a threaded bearing cap 246 at the upper end, closed by a threaded plug 247. A gear 248 has a tubular journalling extension rotatable in the bearing member 244, and the shaft 241 has pinned thereto a shaft connection 250 having a key 251 slidably engaging in a slot 252 of the tubular journal 249. The gear 248 has a journal extension 253 in the bearing cap 246. In a lateral chamber of the gear casing 245 is a worm gear 254 meshing with the gear 248 and this gear 254 is carried by a journal 255 which has a key slot 256 (Fig. 8A) by which it can be rotated for rotating the shaft 241. Half of the shaft 241 is cut away as at 257 to fit slidably but non-rotatably into a semicylindrical socket 258 of the tube 259. This tube, see Fig. 8A, has fixed to its lower end a short flexible shaft 260, in turn connected to a stiff shaft 261 in turn connected to a short flexible shaft 262. The lower end of shaft 262 is connected to a fin or key 263 which slidably but non-rotatably fits the slot 209 of fitting 208 on the shaft of the piston 186. When journal 255 is rotated pinion 186 is rotated.

In the other opening 224 is arranged a structure similar to that just described. The shaft 241 on this side is also cut away to slidably fit into a semicylindrical socket of a tube 265, which is connected at its lower end to a flexible shaft 266, the lower end of which is connected to a fin or key 267 which engages in slot 220 of fitting 219. When journal 255 on the left side of Fig. 8A is rotated, screw shaft 213 is rotated and tube 211 is moved to vary the tension of the spring 172.

Referring to Fig. 8B, the lower portion of the lower section 117 of the piston is provided at the bottom with a circumferential groove 270 in which is fitted a piston ring or sleeve 271 having five graphited grooves 272. The section 117 also has six grooves 273 having suitable piston rings 274 therein. Lubricant is supplied through a fitting 275 supplied by an oil pipe. The fitting delivers to grooves 276 filled with suitable packing 277. Referring to Figs. 8A and 28, an oil pipe 278 connects fitting 275 with a fitting in plate 174, and this fitting is connected by flexible oil supply hose 279, with oil fitting 230 of the head 222. Any suitable source of oil supply can be connected with fitting 230. The length of the hose 279 is sufficient to allow proper excursion of the piston without breaking the hose or its connections.

The ports 142 supplement the ports of the inertia valve to assure quick upward flow of air from the lower to the upper chamber when the cylinder or the piston suddenly move toward one another as, for example, during wheel hop. The reed valves are so made as to offer relatively little resistance to upflow, but promptly cut off flow when the cylinder and piston move away from one another.

The action of the reed valves may be changed by substituting reeds of varying flexibilities and the adjustment of the tension of the spring 172 can so condition the sleeve of the inertia valve as to require more or less forceful inertia action to close or partly close the ports. The inertia valve acts as a momentary check on the upward motion of the piston, following rapid downward motion of said piston.

The reed valves open on downward piston movement or on upward cylinder movement. They close on upward piston movement and on downward cylinder movement. Thus they are closed at the instant when the inertia valve closes to momentarily prevent all air flow from the upper to the lower chamber. The sudden stopping of the down motion of the piston as its downward motion is arrested by the compressed air in the combined piston and cylinder chambers, causes the inertia valve to close, because it continues its downward motion after the piston motion has been suddenly stopped. Thus the inertia valve continues to move after piston motion has ceased and the valve closes. Upward motion of the piston is now momentarily prevented or retarded because both the reed valves and the inertia valve are closed, thus creating a rebound control effective to the extent of pressure differential achieved between the upper and lower sides of the head 140. But shortly thereafter, as the inertia valve movement catches up with the movement of the vehicle body, the inertia valve opens and allows equilization of pressure on both sides of the piston head 140. This cycle is repeated for every down and up motion of the piston or body. For all degrees of pressure in the air spring down motions of the piston or up motions of the cylinder are substantially unopposed so as to obtain the desirable spring rate, predicated on the low compression ratio of the air chamber, i. e., the relatively small change in active volume at even maximum piston movement.

The spherical rubber mountings of the cylinders at top and bottom protect them from transverse loading. The compression ratio of the air spring is low for normal axle movements to insure a comfortable spring rate, with increased compression ratio and higher spring rate toward the limits of spring travel. The inertia valve causes damping on rebound.

Preliminary adjustment of the inertia valves may be made while the vehicle is moving, and proper roads can be selected and used as a basis for adjustment to obtain the proper average action under various load and road conditions. The valves can be adjusted experimentally in relation to wheel hop and in relation to the "feelings" of the riders. Experimental adjustments of the compressed air control valve mechanisms directed to the same end can be made while the vehicle is on the road.

The air pressure in the air spring cylinders is accurately automatically adjusted conformably to the weight and distribution of the passenger and baggage load. As the passenger load increases generally or locally, more air is automatically introduced into the cylinder, and as the passenger load decreases, the amount of air in the cylinder is decreased. Moreover, because of the four point arrangement of the spring systems, and the provision of means automatically and independently responsive to local conditions in each of the four wheel regions, a predetermined spacing can be maintained between the body and the axles and wheels, and the body can be maintained in substantial parallelism with axle and wheels. In addition, by having the suspension points at or very near to the vertical center of gravity of the vehicle, and as near the sides of the vehicle as possible, great gain in stability is obtained.

Since the reeds are detachably clamped, they can be easily disassembled, and other reeds having greater or less flexibility, can be substituted. Greater or less resistance to movements of the piston may thus be had. Although passage of air through the ports controlled by the sleeve valve is relatively free except when inertia action closes the sleeve controlled ports, the reed valves always resist in a predetermined degree the passage of air when the piston moves downwardly or the cylinders move upwardly.

We believe it entirely new to provide variable rate air springs which can perform as shock absorbers during wheel hop, either between air pressure change periods, or during such pressure change periods, incident on body movements which tend to vary the distance spacing between the body and the axle. This shock absorbing action can therefore occur whether the air in the springs is under higher or lower pressure. Moreover, it is believed new in a device of the above nature to provide means accessible from the exterior of the air spring for adjustably varying the degree of shock absorbing action. This adjustment can be made for test purposes, just as the adjustment of the timing valves of the compressed air control mechanism can be made for test purposes.

*Level control valves*

Referring to Figs. 37 to 47, inclusive, and to Figs. 6 and 7. The control of air spring pressures and spring rates is such as to constantly maintain a substantially fixed distance between the axles and body and to maintain parallelism between axles and body. This is accomplished principally by means of the level control valves now to be described. There are herein four of these air control mechanisms, one for each wheel, so that selective action at four points can be had in response to what may be termed local conditions, to effect a coordinated over-all parallelism. Changes in distance between axle and body are transmitted in a manner to affect the control valve to cause it to supply more or less air to restore the body to normal positions in relation to the axles. Thus whether the body load is symmetrically or unsymmetrically distributed, or the load is the greatest or least, the body will be maintained at substantially the same height and in parallelism with the axles.

One of the level control valve structures for the rear axle is shown in Figs. 40 to 45, and the structure of one of the front control valves is shown in Figs. 37 to 39. Functionally the two structures are substantially identical, but they differ structurally partly because of the difference in mounting requirements in relation to the axial dimensions of the beams, and because it is required that the valves be made in rights and lefts, see Figs. 46 and 47. The rear beam 17 is of greater axial width than the front beam 16 so that in the former the valve structures can lie entirely within the beam while in the latter the valve structures partly project outside of the beam. Nevertheless, for both beams the suspension connections are made within the beam and, in this embodiment, near the center of gravity of the vehicle.

Referring to Fig. 43 which may serve for explaining the hydraulic action of valve trip-pin control for the level control mechanisms for both front and rear axles. The casing 105 has a cylinder bore 280, having slidable therein a double-head tubular piston 281, the heads of which are respectively designated 282, 283. Within the piston are two springs 284, 285 adapted to move the piston when either is compressed by movement of an arm, controlled by up and down movements of the body or axles. Each spring has a pin slidable therein each pin having an abutment plate 286. Between these plates and contacting both is a piston operating arm 287 connected to a shaft 288, journalled in a suitable bearing of the casing 105 and projecting as shown in Fig. 40, and having a level control arm 289 fixed thereto. This arm is connected to means on the torsion spring retainer generally designated 109, see Fig. 7. The corresponding linkage for the front axle level control is generally indicated at 88, see Fig. 6. The piston has a valve trip-pin 290, which passes outwardly through an opening 291, see Figs. 39 and 41, and is adapted to engage valve operating stems to open intake and exhaust valves, which close automatically. This pin, as well as the hollow piston, is shown in neutral position and in this position is spaced about .020 of an inch from the ends of the valve actuating stems 292, 293 respectively for the intake valve 294 and the exhaust valve 295. The same numerals are used in all figures to designate the valve operating stems and the valves controlled thereby, even though the valves have only been shown for the front level control mechanism in Fig. 39. Likewise, the same numerals are used for the piston 281 of both front and rear valve trip-pins, although the details of the hydraulic system are only shown for the rear control in Figs. 43 to 45, inclusive. For the rear valve the spaces between the trip-pin and valve actuating stems are designated 296.

Chambers 298, 299 beyond opposite ends of the cylinder 280 are connected by passages 300, 301 and 302. The passage 302 is controlled by a metering or timing valve of the needle type 303 adjustable by means of threads 304. This timing valve regulates the rate of liquid flow to and from the chambers 298, 299, and therefore regulates the rate of motion of the piston and its valve trip-pin 290, as urged by the arms 287, 289.

The valve actuating pin 290 can be made to cycle from maximum air demand to maximum air exhaust positions in ten to twelve seconds. In the present embodiment the total over-all movement of the pin is about one-half inch, which corresponds to an over-all motion of the arm of about nine inches. The over-all movement of the arm may be completed in a fraction of a second, depending on the duration of vertical wheel movement. Thus the forces which tend to change the spacing between body and axles must persist for a predetermined time period to effect a change in the spring rate of the air cylinders. When the valve actuating pin is in neutral position there is a clearance of about .020 inch on each side between it and the valve actuating stems 292, 293. This corresponds to a variation of plus or minus .160 inch in distance between the vehicle body and axle. When the valve actuating pin moves to the left in Figs. 40 to 43, the intake valve is opened and air is delivered to the air springs or spring. Thereafter when the pin 290 moves to the right and across the neutral position, the supply of air to the cylinder is shut off and the exhaust valve is open, and the air is exhausted or partly exhausted from the spring or springs. The above figures are approximate and apply only to the present embodiment, and no limitation of the invention is intended by their use as an example. They are given only to illustrate the delicacy of control.

Referring to Fig. 43. An oil make-up tank 308 is mounted on the casing 105 and communicates with the passages 302, 301 through a connection 309 and passage 310. This tank has a piston 311 therein which is urged by springs 312 in a direction to yieldably maintain oil pressure in the system. An opening 316 allows escape of air from and entry of air into the spring chamber.

Referring to Fig. 45. High and low pressure check valve mechanisms are provided, and are respectively generally designated 317, 318. Valve 317 only opens to the make-up tank when pressure becomes too high as when due to high temperature. Valve 318 opens only when leakage occurs or when temperature is extremely low. The intake or supply pipe to the intake valve 294 is indicated, in Fig. 41, at 319. The supply pipe leading to the air spring from the intake valve is indicated at 320. This pipe 320 is connected to one side of a fitting T–321 to which compressed air is delivered after admission by intake valve 294. To the opposite side of the fitting T–321 is connected an exhaust pipe 322 which leads to the exhaust valve 295 through a suitable connection 323. When the exhaust valve 295 is opened the air passes through the valve and passage to and outwardly through an exhaust muffler 324, as a sheet metal housing which has suitable fibrous material, not shown, therein retained by a perforated plate, not shown. This muffler not only reduces noise but prevents entry of dirt into the valve housing.

Now referring to Figs. 37 to 39, inclusive showing one of the level control valve mechanisms for the front wheels. The lever-controlled piston in the casing 86 and valve trip-pin 290 are controlled by the same kind of mechanism as is shown in Fig. 43, and the make-up tank of Fig. 43 and the structures of Figs. 45 and 46 are used here and are referred to by the same numerals. The valve trip-pin is however here designated 325, the valve stems are designated 292, 293 as before. The trip-pin 325 is carried by a piston 281 as in the first case. The intake and exhaust valves are here also respectively designated 294, 295, but it will be noted that the positions of the valves have been reversed since the intake valve is at the right end in Fig. 39 and at the left end in Fig. 41. It will be understood that all four valve mechanisms are so operated as to selectively supply air to corresponding air springs to limit downward movement of the body due to increased load and to exhaust air from those springs when it is not longer needed. The air supply is so controlled as also to maintain parallelism between the body and axles. In this case one side of the trip-pin 325 is, in its neutral position, spaced as at 326 from the outer end of the intake valve stem 292, but its opposite side is in contact as at 327 with an intermediate exhaust valve operating stem 328 which slides in a bearing 329. The opposite end of 328 has a disk 330 which is spaced as at 331 from the outer end of the exhaust valve opening stem 293. It is also noted that the inner ends of the stems 292, 293 when in neutral position are spaced as at 332 from the corresponding valves. The spacings and actions of the trip-pin 325 on the valve actuating stems is here the same as the trip-pin 290 for the rear valve. The lever for operating shaft 288 is here designated 333, and this lever and its linkage with the torsion spring retainers has been previously generally designated 88, see Fig. 6. The compressed air supply pipe to the intake valve is designated 334. The supply pipe leading from the intake valve to the air spring is indicated at 335 and is connected to one side of a T-fitting 336 to which air pressure is delivered after passing through the intake valve 294. The opposite end of the T is connected to an exhaust pipe 337 which leads to the exhaust valve 295. When the exhaust valve opens, exhaust air passes through the valve to a passage 338 and outwardly through an exhaust muffler 339.

Now referring to the diagrammatic illustration of Figs. 46 and 47. We here show the relations of the level control valves to respective air cylinders and to the compressed air supply connections between the compressed air source and between the control valves and the cylinders. The air compressor is indicated at 345 and is shown somewhat diagrammatically. See also Figs. 2 and 4. It may be of two-cylinder type and may be driven from engines 340 through a speed regulating engine-driven device 341 illustrated diagrammatically herein but shown in detail in a copending application now matured to Patent No. 2,682,928, issued July 6, 1954.

Air delivery is from the top of the compressor 345 through a hose 346. The hose connects with one end of a cooling coil 347 and the opposite end of a coil is connected by a pipe 348 with one side of a carbon trap 349. The opposite side of the trap is connected by pipe 350 with a reservoir or storage tank 351. A second tank is shown at 352 and a third tank at 353. From the tank or tanks 351, 352 air is distributed through various pipes for various purposes, but we are here immediately concerned with a pipe 354 leading from the side of the tank 352 and which by branches 355, 356 delivers respectively to the intake pipes 319 of the rear right-hand and left-hand level control valves, see Fig. 41. These valves are associated with the casings 105 diagrammatically represented in Figs. 46, 47. From the right-hand level control valve 105 a pipe 357 and its branches deliver air to the two right-hand air cylinders 92, 93, which are connected with the rear axle or rear wheels and with the body. From the left-hand level control valve a pipe 358 and its branches supply compressed air to the left-hand air cylinders 94, 95.

From the top of the tank 352 a pipe 359 leads forwardly to deliver to the front storage tank 353 from which air is supplied to the level control valves 86 for the two cylinders 70, 71 which are associated with the front axle. For this purpose a pipe 361 leads from tank 353, and its branches 362, 363 deliver compressed air respectively to the intake pipes 334 of the front right and left-hand level control valves 86. From the delivery side of the right-hand control valve 86 a pipe 364 connects with the right cylinder 70 and a pipe 365 similarly connects the delivery side of the left-hand level control valve 86 with the left-hand cylinder 71. In Fig. 46 the level control arms or levers 289 and 333 for the valves have been shown diagrammatically, and it is to be noted that some of these arms extend rearwardly from their shafts 288, and some extend forwardly from the shafts 288. The arrangement is such that increased body loading in the region of any one of the four valve stations will move the trip-pins 290 and 325 in a direction to open the corresponding intake valves to counteract downward motion of the body. The reverse actions occur when body loading is decreased, and the pins 290 and 325 are moved in a direction to open the corresponding exhaust valves.

*Torsion springs and retainers therefor*

The general arrangements of the torsion springs and their suspension arms and shackles are shown in Figs. 6 and 7. All rubber torsion spring retainers have substantially the same construction, but the retainers for the rear axle suspension structure are, in this embodiment, heavier and stronger than those for the front axle. This is partly due to the fact that engines and some accessories are suspended from that part of the trussed structure which extends rearwardly of the rear crossbeam 17, and to the fact that various accessories are also suspended from the trussed structure including an accessory speed regulating device, as previously stated.

Referring to Figs. 48, 59 and 54 to 57, inclusive, the tubular retainers for one of the front springs is designated 57 and preferably is made as an aluminum casting. The inner side of the body of the retainer has flanges the outer surfaces of which are bolted against the upright outer face 56 of a support member 50 or 51. These flanges have openings 366 adapted to receive bolts 58 as shown in Figs. 6 and 7. The retainer is split as at 368 and has flanges 369 through openings in which clamping bolts 370, see Figs. 54, 57, pass to constrict the retainer to bind and hold against rotation the outer tubular casing segments 371, surrounding and bonded to the outer surface of the rubber spring mass. The spring has the central tube or core 60 of metal which projects beyond the rubber mass at opposite sides. The terminal portions of the core 60 are fluted as at 372. This core 60 is surrounded by the cylindrical mass of rubber 59 which serves as a torsion element of the spring. The inner surface of this cylindrical mass is bonded to the outer surface of the core 60 and the outer surface of the mass is bonded to the inner surfaces of the cylindrical sheet metal casing segments 371. The two semicylindrical segments 371 form a tubular cover and are frictionally non-rotatably held by compression of the retainer. These segments are slightly spaced as at 373. This rubber stock preferably has the qualities possessed by a material known in the trade as 40 durometer, but of course the stock must be selected to suit the particular requirements. The outer surface of one of the segments 371 has attached thereto by rivets 374 an arcuate plate 375 having a radial lug 376, and the wall of the retainer is provided with an opening 377 to allow rotative adjustment of the plate. The lug has an opening 378 through which the shank of the torsion spring adjusting screw bolt 379 loosely passes. The retainer is provided with radial lug 380 which has a horizontal opening 381 in which is rotatably secured as by a nut, a shank 382, having a head 383 having an opening 384 through which the screw bolt 379 passes. The screw 379 has a nut 385 having a curved face which engages the curved face of a recess 386 in the bottom of the lug 376, and a nut 387 is threaded on the bolt below the nut 385 as shown. The arms 61 are fluted or toothed interiorly as at 388, to interfit the flutes 372, for nonrotatably securing the arm 61 to the tube 60. Each arm is split as at 389 and also has a clamping bolt 390. The inner surfaces of the arms are spaced outwardly as at 391, see Figs. 88 and 91, to allow for the proper amount of axial deflection of the rubber mass to absorb shocks incident to acceleration and deceleration of the vehicle. This space may be increased by moving the arm 61 outwardly, and reclamping it in the new position. The outer ends of the rubber mass or spring 59 and its cover 371 are, in this instance, flush with the forward and rearward surface retainers 57. Referring to Figs. 54 to 57, inclusive, one of the bolts 370 also passes through and clamps a horizontal top plate 392 of a bracket to the top surface of the upper flange 369. To the vertical portion 393 of the bracket is pivotally secured a level control valve link generally designated 394, and shown in detail in Fig. 89. These links are shown connected to a level control valve arm 333 in Figs. 88 and 91. This link and arm are generally designated 88 in Fig. 6. Referring to Fig. 54, the shock absorber links 79 have pivots 80 tapered and fitting openings of block 396. These pivots are held by nuts 397, and the blocks are held in channel 81 by crosspins 398. The channel is secured by rivets 399 to the bottom of the retainer 57.

It will be noted, see Fig. 88, that the vertical surfaces of the arms 61 of the torsion springs as viewed from the top, taper convergently in a direction toward the side of the body so that the space between the inner sides of the arms and the forward and rear sides of the spring retainers 57 is ample to permit axial motion to shear-load the rubber mass, during acceleration or deceleration of the vehicle, without the likelihood of contact between the inner sides of either arm with the retainer or with the outer periphery of the steel shell 371.

Referring to Figs. 89 and 90, the level control valve links for the front and rear controls are respectively generally designated 394 and 400. The structure of each level control valve linkage is substantially the same and most of the parts are interchangeable. Each link has two ball joint units in threaded connection with a bar threaded at opposite ends. The bar 401 of the link 394 is curved, and the bar 402 of the link 400 is straight. Each ball joint unit is substantilaly the same, and comprises a threaded stud 403, having a ball socket receiving a ball 404 of an interiorly threaded tubular connector 405. The threads of this connector receive the threads of one end of the bar 394 or 401. In Fig. 89 the elements of the links are shown in the same plane instead of being in planes at right angles to one another as they are when connected. Their connected positions are best shown in Fig. 91. Jam nuts 406 on the shank secure the parts against accidental movement after they have been adjusted for length. The axes of the stud 403 and the connector 405 are right angularly related and the stud 403 and tube 405 are connected by a curved shank 407.

Referring to Figs. 58 to 61, inclusive, and to Fig. 85, the torsion spring retainers 57 for the rear wheels or rear axle differ little structurally from those for the front wheels. Each is split at 368 and has flanges 369. The upper flange has a terminal upstanding lug 410 to which is bolted as at 411 a bracket having an outstanding portion 412 to which one end of a link 400 is secured as shown.

The rubber mass or spring 59 and its cover 371 project beyond the retainer at both sides as at 413 in Fig. 59, and the tubular core 60, in turn, projects beyond the rubber mass and has serrations or flutes 372 on both ends. To each projecting end a lever arm 61 is nonrotatably attached by flutes 388. To the outer surface of one of the tubular cylindrical cover segments 371 is suitably attached as by rivets 414 a curved plate 415 having a radial lug 416 having an opening 417 for the reception of a torsion spring adjusting screw bolt 418. The retainer has projecting radially from its cylindrical surface and at one side a lug 419. This lug 419 has a horizontal opening 420 in which is rotatably secured a shank 421 having a head 422 having an opening 423 traversed by the spring adjusting screw bolt 418. The bolt 418 has a curved end nut 424 fitting a recess 425 in lug 416. A nut 426 engages the bolt 418 below the nut 424. The level control valves for the air-springs, and the links 394, 400 connecting with the torsion spring supports, are adapted to so control the compressed air as to inflate or deflate the springs in a manner to maintain a predetermined road clearance of the body, whatever may be the loading factors or forces generated by road conditions. The body, fully loaded or lightly loaded, is made to stay at substantially the same height within the tolerance of the design. The road clearance is met indirectly by maintaining the vertical distance between the body and the axles. Each level control valve is herein mounted on the body and its actuating arm, or lever (289 or 333) is connected by linkage 400 or 394, with the axle, in this case through the torsion spring supports 57. The linkages are adjustable as to length to obtain the desired "set" of the trip-pins 290, 325. For this purpose the body is jacked up to the desired height with the links free, and the actuating or trip-pin of each level control valve is moved to its neutral position, see Figs. 37 and 40, by suitably moving its actuating arm 289 or 333. The linkage between the arm and axle (or torsion spring support) is then adjusted to its correct length and connected by studs 403, and the device is thus conditioned to control delivery of compressed air to or exhaustion of air from the air-springs to maintain the aforesaid leveling and clearance conditions.

The screws 379 and 418 and their associated elements serve to adjust the rubber spring after installation to its predetermined static load, and also to adjust in service to compensate for what is known as "creep" in the rubber. The bolts 370 are loosened to permit rotation of the shell 371, and its spring, in the retainer, and then the nuts 387, 426 are rotated to rotate the rubber mass 59 and its shell in the retainer. The bolts 370 are then retightened to clamp the spring in its retainer.

When we use the word "substantially" in relation to the maintenance of a "fixed" distance between the body and the axles, we mean that limited predetermined up and down variations only are permitted and that beyond these variations the control valves for the fluid springs are positioned to react to check such motions so that they remain relatively slight in either direction. Of course, some relative motion between body and axle, due to variations in the amount of load, etc., and sustained for a sufficient period of time, is necessary in order that our valving devices may perform their leveling and distance maintaining functions.

Rubber springs have been used as one component of our suspension system because of the possibility of designing such springs to act in more than one direction. Thus when used to obtain stability of the system as previously explained, the desired freedom and associated ride qualities need not be sacrificed. The rubber springs as herein used and applied have a low torsional spring rate and since the static load on those springs is constant, regardless of the amount of vehicle load, once selected, that rate is fairly constant under operating conditions. This low spring rate gives low natural frequency and thus promotes good riding qualities. The rubber spring is also instantaneously reacting to load changes since it has practically no friction damping and its inherent hysteresis damping is again a benefit on rebound. The rubber springs are of large diameter and are capable of yieldably resisting transverse and longitudinal loads, and are noiseless. They are effective isolators against high frequency vibrations. By having their axes extending lengthwise of the vehicle the springs are submitted to shear-loads when the vehicle is starting or stopping or when its speed is being accelerated or decelerated, and the springs are submitted to compression loads when the body or the axles move in a direction transversely to the direction of travel of the vehicle.

Truss-supporting and suspension beams

Referring to Figs. 64 to 74, inclusive, illustrating structures of the rear beam 17, and to Figs. 1, 5 and 7 which show important relations of this beam, to the body, to the rear axle, to the suspension levelling mechanism, and to the upper deck and to the rear aisle of the upper passenger compartment. The beam is centrally recessed to receive the rear aisle portion of the upper deck and at the same time permit the upper connections of the air-spring to be made as near as possible to that raised part of the upper deck on which the seats are placed. The rear beam, as well as the front beam 16, provides for the arrangement and connection of the two dual spring systems, symmetrically disposed at opposite sides of the vertical longitudinal center plane of the vehicle and near the lateral walls of the body. It is to be particularly noted that these beams support and rigidly cross-connect the lower chords of the foundation truss structure, and that the trusses bridge these beams 16 and 17 in a direction longitudinally of the bus. The trusses thus bridging and cross-connected by the suspension-connecting beams, provide a foundation structure for the remainder of the body-forming elements, including elements to which the radius rods are anchored.

Referring to Fig. 62, in which the rear elevation of only about one half of the rear beam is shown. Functionally both beams are substantially the same but they structurally differ in certain respects principally related to the requirements for strength. The rear beam 17 is heavier than the front beam 16, partly because of the weight of the engines and certain accessories that are arranged rearwardly of it and suspended from the cantilever extensions 15 of the foundation trusses 10 and 11. These elements are in part supported by element 40 shown in Fig. 2.

Referring to Figs. 63 and 69, the beam 17 is composed of aluminum alloy web plates 429 reinforced by inner and outer upper and lower marginally placed aluminum angles 430 and 431. The webs are also reinforced with vertical angles, some marginal, and all designated 432. Horizontal angles 433 are secured to the webs 429 and cross-connect vertical angles 432, at the outside of said webs. At each end of the beam at the outer side a horizontal channel 434 cross-connects vertical marginal angles 432, best shown in Fig. 68, and on the inner side of this channel are mounted the bumpers 66. The vertical side plate structures are also reinforced at opposite ends by the tubes 65 to which the arms of the torsion springs are shackled. The middle portion of the beam is formed to provide a recess which receives those portions of the upper deck 3 which form the rear portion 435, see also Figs. 2 and 3, of the aisle of the upper compartment 4. The rear of the laterally placed part 436 of the aisle ends at the forward side of the beam 17. The rear wheel wells 437 are attached to the outer ends of the beam.

Because of the provision of the central recess the outer end portions of the beams are of greater vertical height than that of the middle portion. The middle portion is reinforced as shown in Fig. 69 by a cross channel 440 and this channel is connected by channel gussets 441 to the inner upper and lower angles 430 and 431. Each side portion of the beam is cross-connected by a sheet metal hollow arched structure 442 secured as by bolts at 443 to the upper angles 430, and by rivets at 444, see Figs. 64 and 65, on which is mounted the bumper 100. Each arch also has attached therewithin at the top as by welding, see Figs. 65, 81, 82 and 83, two channel elements 445, to each of which elements is attached a retainer cup 446 (Figs. 73, 74 and 81) which is internally undercut circumferentially at 447 to secure a rubber socket element 448 for the connecting ball 235 of an air-spring. This connection has been previously generally designated 96. The axes of the arches, see Figs. 7 and 64, slant downwardly and inwardly to correspond with the upwardly outwardly slanting thrust axes of the air-spring.

Each steel end panel 107 extends above the top of the beam and has an inturned horizontal flange 449, to which is welded the lower surface of the lower chord 14 of the corresponding foundation truss 10 or 11. The opening of the panel is reinforced by a marginal flange 450. The bottom of each outer end of the beam, see Fig. 68, has secured thereto a tubular member 451 for the attachment of an iron 452, to the horizontal flange of which the wheel well structure 437 is attached.

Referring to Figs. 73 to 80, inclusive, the structure of the front beam is substantially the same as that of the rear beam and therefore the same reference numerals are here used to designate corresponding parts. The front beam has a recess at the middle to receive those elements of the upper deck which are in the forward compartment 6 and which form a central aisle 455, the floor level of which is below the floor on which the chairs are mounted. A lower member of the chair deck is supported as shown in Fig. 73 by angles 456 attached to the front curved part of the lower chord 14 of the truss, which chord is also shown in Fig. 1. The tread surface of the deck 5 is indicated at 457 and is supported at the outer side by channel 458 and at the inner side by elements 459, 460 and 461.

The bumper-carrying channel 464 is connected as at 465 to the inner surfaces of the plates 429. The rear and front sides of the beam near these ends are provided with openings 466 for the level control valve casings which rest on brackets 87. Each arch 467 is formed by a channel connected as by rivets to the plates 429. Each arch has two bumpers 74 therein and also has a retainer cup 446, attached centrally of the arch as shown. This cup also has a rubber socket member 448 therein. The rear plate 429 is extended upwardly as at 468, see Figs. 77 and 75, and has an angle 469 attached thereto on which the floor 470 of the center aisle is in part supported.

The use of the beam structure arranged transversely of and secured to the body is a valuable feature, because each beam provides and houses means by which the air springs are connected, and also provides means by which the torsion springs are linked with the body, and provides a mount and enclosure for auxiliary shock absorbers, and a mount for the air control valves for the air springs. Each beam lies above or over the corresponding axle or wheels, and is parallel with their axes and extends substantially to the outer vertical sides of the body, and at their extreme outer ends connects with the bottoms of the longitudinal foundation trusses, and each outer end of a beam overlies a wheel or wheels.

The structures of the front and rear crossbeams differ somewhat, although each functions as high placed intermediate means by which all springs, and shock absorbing elements are connected with the main or foundation truss elements of the body. In fact, the crossbeams are part of the body bracing means. The body is thus supported by crossbeams which the body foundation trusses bridge.

We believe it entirely new to use with our suspension, a bus of a two-deck type, and therefore we claim the combination of our suspension means with this particular type of bus, as well as with other types of busses to which our suspension means may be applicable.

The rear beam 17 is attached transversely of the body under part of the upper rear passenger deck, so that the connecting points of the suspension mechanism lie rearwardly of the lower passenger space and between that space and the engines, which engines are arranged rearwardly of the rear axle and are suspended from the high placed truss elements. The front beam 16 is attached to the high placed trusses and is arranged forwardly of the lower passenger space and under the upper forward passenger deck.

Column supports for torsion spring retainers

Referring to Figs. 6 and 7, it will be seen that in order to provide means for connecting the axles or wheels with the body, through the medium of the torsion springs, at or near the center of gravity of the vehicle, and for providing level control valve connections between the body and axles or wheels, and for providing high placed connections between the shock-absorbers and the axles or wheels, we provide rigid structures rigidly connected to the axles, or to a member bridging two axles, and these structures are sometimes called torsion spring supports, and are in the nature of hollow columns. These supports are designed for supporting the rubber torsion springs at or near the center of gravity of the body and in positions near the lateral sides of the body, and over the wheels. Two rigid hollow structures are provided for the front and two for the rear wheels, and each structure is composed of welded together plates and steel sheets and channel elements. These hollow structures are shown applied in Figs. 2, 6 and 7. The members of each pair are made in rights and lefts and each member is somewhat C-shaped as viewed in a direction lengthwise of the vehicle, and the concave side of each member faces outwardly and extends upwardly to a point near the corresponding lateral side of the vehicle. The contour of the inner side of each column is somewhat triangular, with the apex of the triangle pointing inwardly and bolted to the corresponding apical portion of the companion member. Each rear member comprises a base plate 473 (Fig. 7) which has openings through which bolts 475 pass to secure it to a saddle member 476 on the rear axle 19. Welded to and rising from this base plate 473 is a structure composed of suitably shaped and welded together channels and sheets. These channels and sheets comprise the two support elements 102 and 103 (Fig. 7) which preferably are of hollow construction and which have welded upon their upper outer ends vertical plates 482 through which the bolts 58 pass and are secured to the flanges of the torsion spring retainers 57. The adjacent apexes of the support elements 102 and 103 are provided with overlapping plates 484 which have aligned openings that receive a bolt 486 which secures the two upright support elements 102 and 103 together.

The upright support members 50 and 51 for the front axle are best shown in Figs. 6, 88 and 91 and are broadly similar to the rear upright elements 102 and 103 but differ therefrom in that they are adapted partially to enclose the air spring structures 70 and 71 (Figs. 6, 88 and 91) which are attached at their lower ends to base plates 493 of the supports 50 and 51. These base plates are, in turn, secured to the front axle 16. Like the rear upright elements, the front elements are provided on their upper outer ends with vertical plates 509 that are connected to the flanges of the front torsion spring retainers 57 by means of the bolts 58, and are also provided at their adjacent apexes with overlapping plates 511 (Fig. 6) by which the two front upright members are secured together in the same manner as the rear members.

*Auxiliary shock absorbers*

Shock absorbers are used to modify the actions of the rubber torsion springs. Referring to Figs. 5, 6, 7, 84, 87 and 88, the shock absorbers 76 are mounted on the body at the outer extremities and at the upper sides of and within the truss-connecting hollow crossbeams 16 and 17 of the body. There are two shock absorbers for each torsion spring, symmetrically arranged as shown in Figs. 6, 7 and 88. These shock absorbers are arranged near the upper floor or deck 3 of the vehicle, and at a level above the level control valve mechanisms 86 and 105. The control arms 77 can, in this embodiment, operate through a total range of about 57°, and each is connected to a retainer 57, and therefore to the axles and wheels, by the links 79. The structure of all shock absorbers may be the same, and any suitable type may be used provided that it is properly arranged and can properly act in our combination.

*Radius rods and connections therefor*

Referring to Figs. 2 and 4, it will be noted the arrangement of the radius rods 27 and 33, and how through the rigid continuity of lower deck stringers 32 and the beam 31 and crossmember 30 proper pivotal anchorage is provided for the rods. The rods are connected to the axles at levels below the wheel axes. It will be noted, see Figs. 4 and 7, how the lower deck 1 cross-connects the lateral walls 20, 21, which are, in turn, supported from the bottom chords 14 of the longitudinally continuous trusses 10 and 11, see also Figs. 1 and 5. The partition 25 has elements which act as cross-braces for the lateral walls 20, 21, and also has a floor-supporting function. The lower part of partition and brace 25 also carries the brackets to which the forward ends of the rear rods 27 are connected as at 26. The beam 31 is hollow and is made up principally of channels and plates riveted or welded together.

It is here to be noted, see Fig. 2, that the rubber torsion spring connections of the axles with the body are made above the wheel axes and the connections of the radius rods with the body are made below the wheel axes. Thus acceleration or deceleration shocks to the body are cushioned by the shear-loading of the rubber springs through couple actions about the wheel axes. Strong radius rod anchorage is accomplished by means of the through-running floor sills 32 (Fig. 4) and beam 31 and arm 30.

The manner in which the rear radius rods 27 are secured to the rear end of the lower deck 1 is best shown in Figs. 2 and 93. The longitudinal lower deck stringers 32 (Fig. 4) terminate at the rear of the deck at the base of the partition 25 (Fig. 2) where a strong transversely extending mounting angle assembly 561, 563 is secured to the stringers and also to additional longitudinal stringers 560 (Fig. 4). Brackets 569, for pivotally securing the front ends of the radius rods 27 are bolted or otherwise secured to this mounting assembly. Thus, the forward ends of the radius rods 27, as well as the front radius rods 33, are connected to the same longitudinally continuous structure which includes the stringers 32 and the forwardly extending beam structure 30, 31.

Referring to Figs. 7 and 93, the pivoting brackets 574 for the rear ends of the rear rods 27 are attached to saddles 575 secured to the lower side of the rear axle 19. These saddles as well as the upper saddles 476 are clamped rigidly to the axle by bolts 475. The rods 27 are tublular and the rear end of each is detachably but securely connected as at 576 to a pivoting eye element 577, rubber-bushed as at 578 for pivot bolt 28. A forward eye member is similarly rubber-bushed for pivot 26.

The brackets by which the front radius rods 33 are mounted are best seen in Figs. 2, 6 and 96. The front bracket is indicated at 585 and the front eye of the rod 33, is shown at 586. The bracket is connected to the underside crossmember 30 by bolts 587. The rear bracket 588 is connected to the front axle 18 by a pair of screw bolts 589 threaded into base plate 493 of a torsion spring support column and by a pair of bolts 590. The bolts 590 pass through the bracket 588, a flange of the axle 18, and base plate 493. Additional bolts 591 secure the base plate 493 to the front axle. The rear pivoting eye for rod 33 is detachably secured as at 593 to the tubular element. Both the front and rear pivoting eyes are rubber-bushed as at 594, see Fig. 6. The rods 33 are placed as closely as possible to the front wheels. The relations of rods 33 and the bottom of the air springs to the steering arm 595 are shown in Fig. 6.

Although no brakes have been shown in the drawings, it will be understood that when they are applied or released or when the speed of the vehicle is suddenly increased or decreased by the engine, forces will be set up which will act through the radius rods and about the radius rod connecting pin on the axle as pivotal points, and through the spring supports and spring retainers, to shear-load the rubber torsion springs 59 in an axial direction, which springs then act as shock absorbers, while continuing to act as resilient body supporting elements. The rubber springs and the body-lifting action of the shackles also serve to absorb shocks incident on short transverse motions of the body or axles. Excessive transverse motions of the body are cushioned by the bumpers 66, and excessive vertical motions of the body are cushioned by bumpers 74.

We believe it entirely new to have the forward ends of pairs of radius rods for the front and rear axles anchored to a floor structure supported by through-running foundation elements, and which floor structure is connected to foundation trusses which are near the center of gravity of the vehicle, and to provide combined cushioning and body suspension means which are connected to means which cross-connect and are bridged by said trusses, and which cushion shocks incident on acceleration and deceleration, as transmitted through said radius rods.

*Foundation trusses*

We believe it is entirely new to connect any body suspension means, to suspension connecting members such as our crossbeams, which are associated with or bridged by foundation trusses which are at a level below upper windows and above lower windows, and on or from which trusses the other elements of the body are supported. Moreover, we believe it entirely new in such a structure, to have the base suspension connecting members located at or very near the center of gravity of the vehicle, whatever may be the character of the suspension elements. Insofar as we are aware, no two-decked automobile body has ever been so constructed as to permit of connection of any kind of suspension elements at or near the center of gravity of the vehicle, nor any body which would permit such high placement, and at the same time permit aisle structures of passenger compartments to traverse the suspension crossbeams medially.

Insofar as we are aware, the structures by which this new bus body is made practicable are not only entirely new in many details, but are particularly new as providing for new arrangements of the seats, aisles, etc., as herein disclosed, in relation to the suspension and radius rod arrangement. Also, insofar as we are aware, the foundation truss structures by which suspension connections can be widely spaced at a level substantially above the axles, are unique in the automobile art as well as in the bus art.

It is believed that the structure of the body per se is new, and that the specific structure of the body is closely related to the specific suspension means provided herein. On the other hand, it is believed new per se to locate the connections for the resilient suspension elements at a substantial distance above the axle or wheels, and to make such connections at points near the outer sides of the vehicle.

Insofar as we are aware, no one has conceived of any bus structure in which suspension connections between the body and the axles or wheels could be made at or near the height of the center of gravity of the body, and in which high placed longitudinally extending body-side-defining truss elements allow for high placed cushioning connections in such manner as to permit part of a passenger compartment to extend rearwardly of the rear connections, or to permit a passenger compartment to be disposed between the suspensions for the front and rear axles, with the floor below the level of the axles.

In the somewhat diagrammatic view of Fig. 97 are shown the loci of movement of the spring axes of the right and left rubber springs, in relation to the linkage and bumpers and shock absorbers 76. The normal position of the arms 61 and links 62 are shown in full lines, and the extreme position of the spring centers is shown in dot-and-dash lines. The lines representing the loci are also made full, and fine full lines are used to indicate the longitudinal center lines of the links 62 and arm 61, and also for the operating arm 77 of the shock absorber 76 and for the link 79 which connects the arm 77 to the torsion spring support 57. This support has been simplified for clarity.

The short locus of movement for the spring center 710, when the pivotal centers of the arms 61 and links 62 are aligned as at 715, is indicated at 711 at the left of the normal position of the center of the spring. The long locus of movement of the center 710, when the outer end of arms are engaged with the bumpers, is indicated at 712. The uppermost position of the shock absorber arm 77 is indicated at 713 and its lowermost position at 714. The upward excursion of the torsion spring is limited by engagement of the surface 101 with the rubber bumper 100, and engagement of these elements occurs before the arm and link centers are fully aligned on line 715. The left-hand spring center is not shown in this figure, but its short locus of movement is indicated at 716; and its long locus of movement is indicated at 717. The upper limit of movement of the center 710 is indicated by line 718, and the lower limit by line 719.

*Engine suspension*

Referring to Figs. 2 and 4, the frameworks connected at the rear portion of the body below and to the lower chords 14 are generally indicated at 722. The engine or engines may be suspended from the cantilevers 15 in various ways. In this case the two engines are supported in part from a suspension beam 40 which is aligned with and cross-connects struts of the foundation trusses. The beam 40 has connected thereto a horizontal channel beam 723, which forms the main part of the suspension system for the engines. The engines 340 are suspended on this channel beam by four bolts 724 each of which is supported by a cushion element 725 placed on the upper side of the channel beam 723. The bolts pass through hanger plates 726 attached to various parts of the engine casings. Other engine suspension elements, not shown, are used and these are placed forwardly of the channel 723, and are connected by suitable means to parts 727 of the side frames 722. The accessory drive unit 341 is supported on framing 728 in part connected to the lower chord 14 and in part cross-connected to parts of framing 722. Framing 728 is also connected to the under side of channel 723. The rear wall of the body is hinged to open like a door to give access to and facilitate removal of the engines. These structures have not been shown.

Only sufficient illustration has been provided to show means by which the engines are connected with the cantilever portions of the trusses, which connection is believed to be entirely new in the bus art.

*Wheel hop action*

Referring to Fig. 92, in which only the two extreme positions are shown. To explain wheel hop action, let it be assumed, for the sake of simplification, that one wheel moves up and down on one side only. The axle assembly will then pivot about the contact point between the tire and the road on the opposite side, and all parts rigidly connected to the axle will move on an arc which has its center substantially at the point of contact of the tire of the non-jumping wheel with the road. Under these conditions we obtain for each point of the suspension rigidly connected to the axle, not only a vertical displacement but also a lateral displacement. In this discussion it is assumed that, because of the great inertia of the body and the short duration of wheel hop action, the body remains in a fixed position. Due to these movements the rubber torsion springs are subjected to change in their torsional load because of the vertical component of the axle displacement, and at the same time they are exposed to a transverse load due to the lateral component of the axial displacement. Load change on the torsion springs is accompanied by angular change in position of their actuating arms, which in turn causes angular change in position of their connecting links or shackles.

The air springs assist but to a small degree in caring for the load fluctuations such as are described above, because the air cylinders are connected by means of spherical joints which are substantially unable to transmit longitudinal or transverse loads. Their influence is therefore limited to the extent that relative body and axle movement will change the air pressure in the air springs, either due to compression or expansion on rapid movement, or due to level control valve action when the movement is of sufficient duration.

Our suspension scheme substantially eliminates harsh transmission of lateral or of vertical jolts to the body, due to wheel hop, by reducing and cushioning the forces imposed on the body. The geometry of the arrangement and the action of the suspension elements promotes low frequency damped body movements. In the drawings the extreme upper somewhat exaggerated position is shown in full lines and the extreme lower position is shown in dot-and-dash lines. Such extreme movements rarely occur during normal operation, as can be readily observed.

In the extreme upper position the left-hand arms 61 and their links 62 assume the axially aligned position shown and the upper surface 101 of the torsion spring support is engaged with the bumper 100. This engagement occurs before the links are fully aligned or reach their limit position, so that the spring support is "eased to" the extreme position. As the linkage at the left side straightens out, the linkage at the right side is moved laterally so that the end of the arms 61 engage the bumpers 66 substantially as shown. As the left-hand wheels rise to the position shown, the air springs are correspondingly shortened, and since wheel hop is generally momentary in nature the air in the springs is temporarily compressed. Unless this raised position of the wheels is maintained unduly, no other change in air pressure occurs. The corresponding action occurs when the right wheel hops instead of the left. When both wheels hop simultaneously in the same degree, rubber spring torsional action occurs without lateral motion of the spring supports, and the air springs are equally compressed on both sides.

When the left wheel falls to the extreme position shown, the suspension elements and axle assume the dot-and-dash line position. In this case the left hand torsion spring moves toward the left and downwardly until the ends of the arms 61 engage the left hand bumper 66. At the same time the right hand torsion spring also moves to the left and downwardly. The torsion spring movements are such that the left hand spring is subjected to a load decrease, while the right hand spring is subjected to a load increase. When the left wheel rises or when either wheel rises, or when both wheels rise together to the same height, the torsion springs wind up. When the left wheel falls or when either wheel falls, the spring on the same side as the falling wheel unwinds while the spring on the opposite side winds up. When both wheels fall together an equal distance the torsion springs unwind. The air springs are always compressed at wheel rise and expand on wheel drop.

*Supporting action of spring system*

Referring to the graphs of Figs. 94 and 95 illustrating the method herein as applied to the rear and front axles. Important features to be noted are that the rubber torsion springs, or their equivalent, are adapted to carry a constant static load, whatever the weight of body and its load may be, and that the static and dynamic stresses on the torsion springs, as well as the spring rate variations, remain substantially the same, whatever may be the load factor at which the vehicle operates. This is also true for the rubber bumpers which are engaged beyond a reasonable deflection range. It is further noted that it is only the fluid or air springs that vary in capacity with the varying amounts of loading, and this variation is in direct proportion to the load. Although the spring rate of the air springs, with the vehicle lightly loaded and heavily loaded, varies considerably, yet the spring rate of the combined spring system varies hardly at all as between light loaded and heavy loaded conditions, within the operating range, in this embodiment, of plus or minus two-inch deflection. The graphs of Figs. 94 and 95 are only given to facilitate an understanding of our method, and of the above statements as to the actions of the spring systems separately, but coordinately. The graphs illustrate the amount of deflection of the body under various load conditions, but it is to be understood that these graphs are only intended to facilitate an understanding of principles, and that no limitation of the broader aspects of the invention is intended. The ability of the rubber springs and means connecting them to yieldably resist transverse and longitudinal loads as demanded for stability of our suspension, under various load and road conditions, are not illustrated in the graphs of Figs. 94 and 95.

It is to be noted that if the natural frequency of the air springs for any and all vehicle load factors is substantially less than that of the rubber springs, for example, in a range of from fifteen to twenty-five per cent less from light to fully loaded vehicle, then the vibration phases of the two spring systems, as expressed in a wave graph, are so related as to obtain a decided damping effect, due to energy dissipation caused by mutual disturbance between the two parallel spring systems. In our dual-spring system and method, such damping occurs in considerable degree, and we believe it new in conception to so relate these systems as to obtain such damping.

As a result of this energy dissipation due to out of phase vibrations of the two spring systems, the vehicle body disturbances are greatly reduced and thus greatly improved ride comfort is obtained. Especially is this true at low energy vertical impacts such as are experienced, for instance, under normal operation on concrete roads, because for small spring deflections the out of phase condition is even more pronounced than at larger but less frequently occurring spring deflections.

*Recapitulation of functions and structures*

In our method and device, as disclosed herein, the suspension points are just below the center of gravity of the body and close to the sides thereof. Thus the larger part of the suspension is located above the wheels. The torsion springs in addition to supporting their share of the vertical loads, also act to maintain the stability of the spring suspension, since they are able to resist loads not only vertically, but also laterally and longitudinally. The air springs resist only vertical loads.

Resistance to transverse loads, such as experienced when negotiating curves, is offered by means of the shackles which connect the body to the torsion spring arms. The length and degree inclination of these shackles are so proportioned that reasonable normal operating loads are compensated for by the lift of the body as the vehicle swings laterally out of its normal position. Excessive horizontal loads are taken up by the rubber bumpers. The torsion springs themselves transfer these horizontal loads over the axles' superstructure to the axles and ultimately to the contact point between the tires and road. A combination of the two aforementioned load conditions, that is, individual vertical wheel movement and transverse loading may be imposed at the same time, and our suspension means will readily take care of such conditions. Since the spring suspension is so wide and so high over the axle, the design must be such as to obtain adequate resistance to transverse forces, as when negotiating curves, but so as not to have excessive transverse forces imposed on the body during individual wheel structures at points above the front and rear axles, a deck suspended from said truss structures and having an extension thereon projecting forwardly of the front axle, radius rods connecting the rear axles with said deck forwardly of the rear axle, and radius rods connecting said front axle with said extension forwardly of the front axle and plural body cushioning and supporting means connecting each beam with a corresponding axle, including elements which resiliently resist longitudinal movements between the axles and the body.

5. A wheeled vehicle having front and rear axles and a body, the structure of the body including two longitudinally extending lateral foundation truss elements having upper and lower chords, the lower chords being cross-connected and bridged by beams which respectively overlie the front and rear axles, a floor structure suspended from the bottoms of said lower chords and having a beam thereon extending forwardly of and above the front axle, a crossarm ahead of said front axle on the forward extremity and said forwardly extending beam, radius rods connecting said front axle to said crossarm, radius rods connecting said rear axle with the rear end of said floor structure, and body supporting and suspension means connecting said body with said crossbeams and axles.

6. A vehicle having axles and wheels and a body, first cushioning means for each wheel adapted to support a part of the body load, second cushioning means for each wheel adapted to assist the first means in supporting the body load, and third means for each second means automatically responsive to forces which act to change the distance between the body and the axles to cause said second means to resist said forces in a manner substantially to prevent such change, means for adjusting each third means only to permit preventing action of the second means when said forces have persisted for a predetermined time interval, said second means comprising compressed air cylinders and said third means comprising valves which control entry of air into said cylinders, each cylinder having shock absorbing means therein which acts independently of the action of the third means.

7. A vehicle having axles and wheels and a body, first cushioning means for each wheel adapted to support a part of the body load, second cushioning means for each wheel adapted to assist the first means in supporting the body load, and third means for each second means automatically responsive to forces which act to change the distance between the body and the axles to cause said second means to resist said forces in a manner substantially to prevent such change, means for adjusting each third means only to permit preventing action of the second means when said forces have persisted for a predetermined time interval, said second means comprising compressed air cylinders, and said third means comprising valves which control entry of air into said cylinders, each cylinder having shock absorbing means therein which acts independently of the action of the third means, and a fourth means having shock absorbing action for modifying the recoil action of each first cushioning means.

8. In an automotive vehicle having wheels, axles, and a body, a pair of columns fixed to and rising from each axle each having its top at a level near the center of gravity of the vehicle, a torsion spring on the top of each column, each having its torsion axis extending lengthwise of the body and each spring being capable of being axially, transversely and torsionally loaded, two torsion arms for each spring extending outwardly toward the sides of the body, pairs of links pivoted to and extending outwardly and downwardly from the outer end of each arm and pivoted to the body, and pairs of radius rods for each axle each pivoted thereto below the wheel axes, and pivoted at their forward ends to said body forwardly of the axles.

9. In an automotive vehicle having wheels, axles, and a body, a pair of columns fixed to and rising from each axle each having its top at a level near the center of gravity of the vehicle, a spring on the top of each column connected to the body and each capable of being axially, transversely and torsionally loaded, an air spring for each first mentioned spring disposed inwardly therefrom and having a cylinder having its bottom pivoted to the axle and having a piston having its top pivoted to the body near the center of gravity of the vehicle, and means automatically responsive to regional level changes in the body for supplying compressed air to each air spring to increase or decrease the body-supporting thrust of its piston, in a manner to substantially maintain a fixed distance between the body and the axles, and each piston having a valve mechanism therein adapted to act as a shock absorber during wheel hop.

10. In an automotive vehicle having wheels, axles, and a body, a pair of columns fixed to and rising from each axle each having its top at a level near the center of gravity of the vehicle, a torsion spring on the top of each column, each having its torsion axis extending lengthwise of the body and capable of being axially, transversely and torsionally loaded, two arms for each spring extending outwardly toward the sides of the body, links pivoted to and extending outwardly and downwardly from the outer end of each arm and pivoted to the body, an air spring for each first mentioned spring disposed inwardly therefrom and having a cylinder having its bottom pivoted to the axle and having a piston having its top pivoted to the body near the center of gravity of the vehicle, each air spring being slanted upwardly and outwardly, and means automatically responsive to regional level changes in the body for supplying compressed air to each air spring to increase or decrease the body-supporting thrust of its piston, in a manner to substantially maintain a fixed distance between the body and the axles, and each piston having a valve mechanism therein adapted to act as a shock absorber during wheel hop, and pairs of radius rods for each axle each pivoted thereto below the wheel axes and near the pivotal point of the corresponding cylinder with the axle, and pivoted at their forward ends to said body forwardly of the axles.

References Cited in the file of this patent

UNITED STATES PATENTS

| | | |
|---|---|---|
| 1,655,210 | Stevens | Jan. 3, 1928 |
| 1,980,832 | Saforcada | Nov. 13, 1934 |
| 2,001,029 | Kulick et al. | May 14, 1935 |
| 2,011,235 | Trott | Aug. 13, 1935 |
| 2,150,073 | Malott | Mar. 7, 1939 |
| 2,150,576 | Bell | Mar. 14, 1939 |
| 2,226,406 | Krotz | Dec. 24, 1940 |
| 2,275,462 | Parilla | Mar. 10, 1942 |
| 2,361,575 | Thompson | Oct. 31, 1944 |
| 2,517,272 | Baghuis | Aug. 1, 1950 |

OTHER REFERENCES

Product Engineering Publication, August 1948, pages 92, 93 and 94. (Copy in Patent Office Library.)